(12) United States Patent
Shahar et al.

(10) Patent No.: US 6,466,352 B1
(45) Date of Patent: Oct. 15, 2002

(54) HIGH-RESOLUTION READING AND WRITING SCAN SYSTEM FOR PLANAR AND CYLINDRICAL SURFACES

(76) Inventors: Arie Shahar, 2800-Plaza Del Amo, Unit 187, Torrance, CA (US) 90503-9363; Nira Schwartz, 2800-Plaza Del Amo, Unit 187, Torrance, CA (US) 90503-9363

(*) Notice: Subject to any disclaimer, the term of this patent is extended or adjusted under 35 U.S.C. 154(b) by 0 days.

(21) Appl. No.: 09/595,343

(22) Filed: Jun. 15, 2000

Related U.S. Application Data

(63) Continuation-in-part of application No. 09/506,072, filed on Feb. 17, 2000.
(60) Provisional application No. 60/130,868, filed on Apr. 23, 1999.

(51) Int. Cl.[7] .............................................. G02B 26/08
(52) U.S. Cl. ....................... 359/212; 359/201; 359/203; 359/204; 359/210; 359/216; 359/223; 347/243; 347/261; 250/236
(58) Field of Search ................................. 359/198–205, 359/209–212, 216–219; 347/233, 241–244, 256–261; 358/296; 250/234–236

(56) References Cited

U.S. PATENT DOCUMENTS

| | | | |
|---|---|---|---|
| 5,298,976 A | 3/1994 | Schwartz et al. ........... 356/375 |
| 5,557,438 A | 9/1996 | Shahar et al. ............... 359/204 |
| 5,828,483 A | 10/1998 | Shahar et al. ............... 359/216 |
| 6,310,710 B1 * | 10/2001 | Shahar et al. ............... 359/210 |

OTHER PUBLICATIONS

"Prisms Frequently Used In Optical systems" by Bruce Walker, Kollmorgen Corp., pp. H–344 to H–345 of The Photonics Design and Application Handbook 1991. (No month).

* cited by examiner

Primary Examiner—James Phan
(74) Attorney, Agent, or Firm—David Pressman

(57) ABSTRACT

Scan systems include at least one radiation source for directing at least one beam toward a scan-device system. The scan device system includes at least one scan device that reflects these beams as rotating scan beams which point to the optical aperture of a rotating optical system. The rotating optical system has at least one optical component selected from a group of reflectors and lenses, focuses the scan beams into radiation spots, and projects them onto a scanned surface as moving scan spots. Linear relative movement between the scanned surface and the rotating optical system produces an area scan of inner drum or planar surface.

22 Claims, 51 Drawing Sheets

HIGH-RESOLUTION READING AND WRITING SCAN SYSTEM FOR PLANAR AND CYLINDRICAL SURFACES

BACKGROUND—Cross-Reference to Related Application

This application is a continuation-in-part of U.S. patent application Ser. No. 09/506,072, filed Feb. 17, 2000, now U.S. Pat. No. 6,310,710, granted Oct. 30, 2001. The latter application claims the benefit of Provisional Patent Application Ser. No. 60/130,868, filed Apr. 23, 1999 by the present inventors.

BACKGROUND—Field of Invention

The invention relates to the field of reading, writing, inspecting, printing, engraving, plotting, and vision. In the reading aspect it particularly relates to the fields of machine vision and inspection machines, such as those used to read and/or inspect industrial products such as compact disks (CDs), computer disks, video disks, digital video disks (DVDs), Printed Circuit Boards (PCBs) and silicon wafers used in the integrated circuits (IC) industry. In the printing aspect it relates to the field of writing, engraving, and printing machines, such as those used in the industrial fields of digital printing, internal drum scanning, preprinting and pre-press industry, laser beam writing, and photolithography.

BACKGROUND—Prior Art

Conventional scanners which use external drum scanning, such as scanner 1 of FIG. 1, includes a rotating drum 2, which carries a flexible plate 4 on its circumference and a read-write head 6 having a focusing lens 7 that emits and collects multiple beams 8 onto and from plate 4. While drum 2 rotates around its axis 10, head 6 moves parallel to axis 10 and along arrows 12 and 14 and thus the whole area of plate 4 is scanned.

FIG. 2 illustrate an internal drum scanner 19 including a flexible plate 20 bent into cylinder-like shape, a spinning tilted mirror 22, and a head 24 having a focusing lens 25 that emits and collects a single beam 26 onto and from plate 20. The optical path between plate 20 and head 24 includes mirror 22. Mirror 22 spins around its axis 28, along which beam 26 propagates between mirror 22 and head 24. Mirror 22 and head 24 both move along and parallel to axis 28 along a rail 30 and thus scan the whole area of plate 20.

External scanner 1 of FIG. 1 has the advantages of using multiple beams 8 and head 6 with its focusing lens 7 that is close to plate 4. These advantages allow multiple scans at high resolution. The disadvantage is the mechanical instability of its large rotating drum 2 that carries plate 4. This disadvantage forces the use of a low rotational speed.

The advantage of internal scanner 19 of FIG. 2 is the compact size of its spinning mirror 22 that allows it to spin at a very high rotational speed. The disadvantage is the relatively long optical path between its head 24 and its plate 20 via mirror 22. This requires that lens 25 have a long focal length that provides only limited resolution.

The scan speed V of the scanner is proportional to the product of the number N of beams used, times the rotational speed, $\omega$, i.e., $$V \sim N \cdot \omega$$

The typical values of the above parameters for external scanning are N=30 and $\omega$=500 rpm. Thus V is proportional to 15,000. The typical values of the above parameters for internal scanning are N=1 and $\omega$=15,000 rpm. Thus V is also proportional to 15,000.

It can be seen that both scanner 1 and scanner 19 have a similar scan speed V, but scanner 1 is superior to scanner 19 due to its high resolution.

U.S. Pat. No. 5,557,438 to N. Schwartz and A. Shahar, entitled "Scanning And Tracking Using Rotating Polygons", Sep. 17, 1996, discloses a unique scan system using polygonal mirrors. This system teaches how to convert a scanner 19 into an internal scanner that is capable of scanning multiple beams while maintaining the high performance of scanner 19. In this scanner, if the typical number N of beams is 10, then the scan speed V is proportional to $2 \cdot 10 \cdot 15,000 = 300,000$, which is 20 times faster than scanner 1. While the scan speed is much faster, its resolution is still similar to the resolution of scanner 19, which is inferior to the resolution of scanner 1.

U.S. Pat. No. 5,828,483 to A. Shahar and N. Schwartz, entitled "Printing And Inspection System Using Rotating Polygon And Optical Fibers", Oct. 27, 1998, teaches how to convert internal scanning into wide planar scanning. In this system radiation is projected and collected onto and from a planar region by the outputs of the optical fibers. This system also suffers from the disadvantage of limited resolution.

Objects and Advantages

Accordingly several objects and advantages of the invention are as follows:

(1) To provide an improved scan system.

(2) To provide writing and reading scanners for internal drum scanning which are capable of maintaining all the high performance of the system of the above '438 patent, with the additional advantage of high scan resolution.

(3) To provide writing and reading scanners for planar scanning which maintain all the high performance of the scanner of the above '483 patent, with the additional advantage of high scan resolution.

Other objects and advantages are:

(4) To provide disk drivers using multiple beams for fast reading of CDs, computer disks, video disks and DVDs.

(5) To provide inspection systems using multiple beams for fast inspection of CDs, computer disks, videodisks and DVDs.

(6) To provide writing machines using multiple beams, such as writing machines for fast writing and engraving of CDs, computer disks, videodisks, and DVDs.

(7) To provide writing, laser writing, photolithography, and reading or inspecting systems using multiple beams, especially such systems for reading or inspecting PCBs.

(8) To provide writing, laser writing, photolithography, and reading or inspecting systems using multiple beams, especially for reading or inspecting wafers, such as silicon wafers used in the IC industry.

(9) To provide an internal drum scanner and planar scanner using at least one radiation beam for fast reading and writing with high resolution and for inspection by imaging and laser scattering.

(10) To provide internal drum and planar scanning at angular velocities that are equal to or twice the rotational speed of the scan device.

(11) To provide a rotating confocal microscope for reading, inspecting, and writing by inner drum scanning and planar scanning.

(12) To provide scanning systems having a scan system that includes at least one scan device.

(13) To provide scanning systems having a rotatable optical system including at least one optical component from the group containing reflectors and lenses.

(14) To provide scanning systems that preserve the orientation of their scanning spots relative to the direction of a linear scan movement between the scanning system and the scanned region.

(15) To provide scanning systems that are capable of producing a complete area scan that is formed by joining the scanned segments without overlap or with uniform overlap.

(16) To produce a scan format that enables the volume of the digital information written or read on or from optical storage to be increased.

(17) To produce a scan format that enables the scan speed in which the digital information is written or is read on or from optical storage to be increased.

(18) To produce fast scan systems for image setters.

(19) To produce fast scan systems for inspecting flat panels.

Still further objects and advantages will become apparent from a consideration of the ensuing description and accompanying drawings.

DRAWINGS

FIGS. 3a, 3b, 3c, and 3d illustrate spinning and scan-devices, some of whose optical properties are implemented in the system of the invention.

Figure 4:
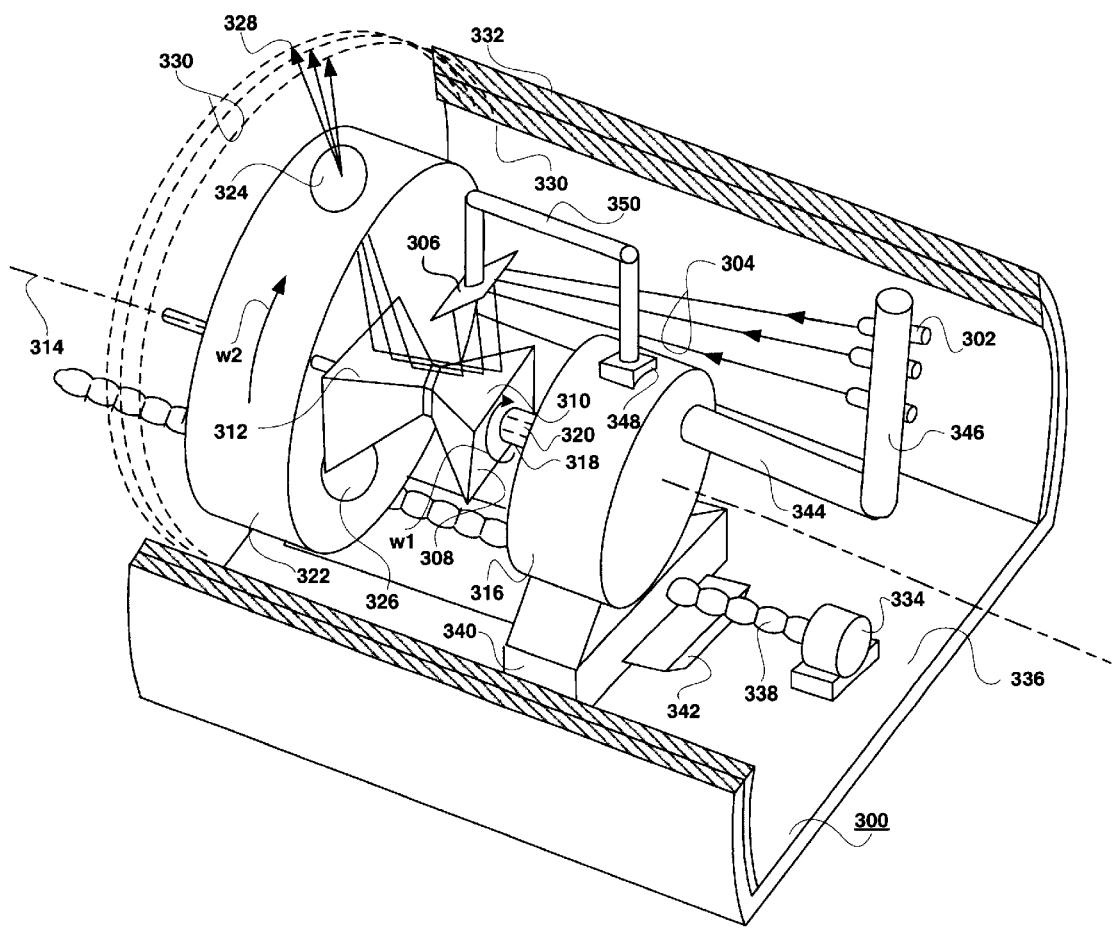

FIG. 4 illustrates a scan system according to the invention.

Figure 5:
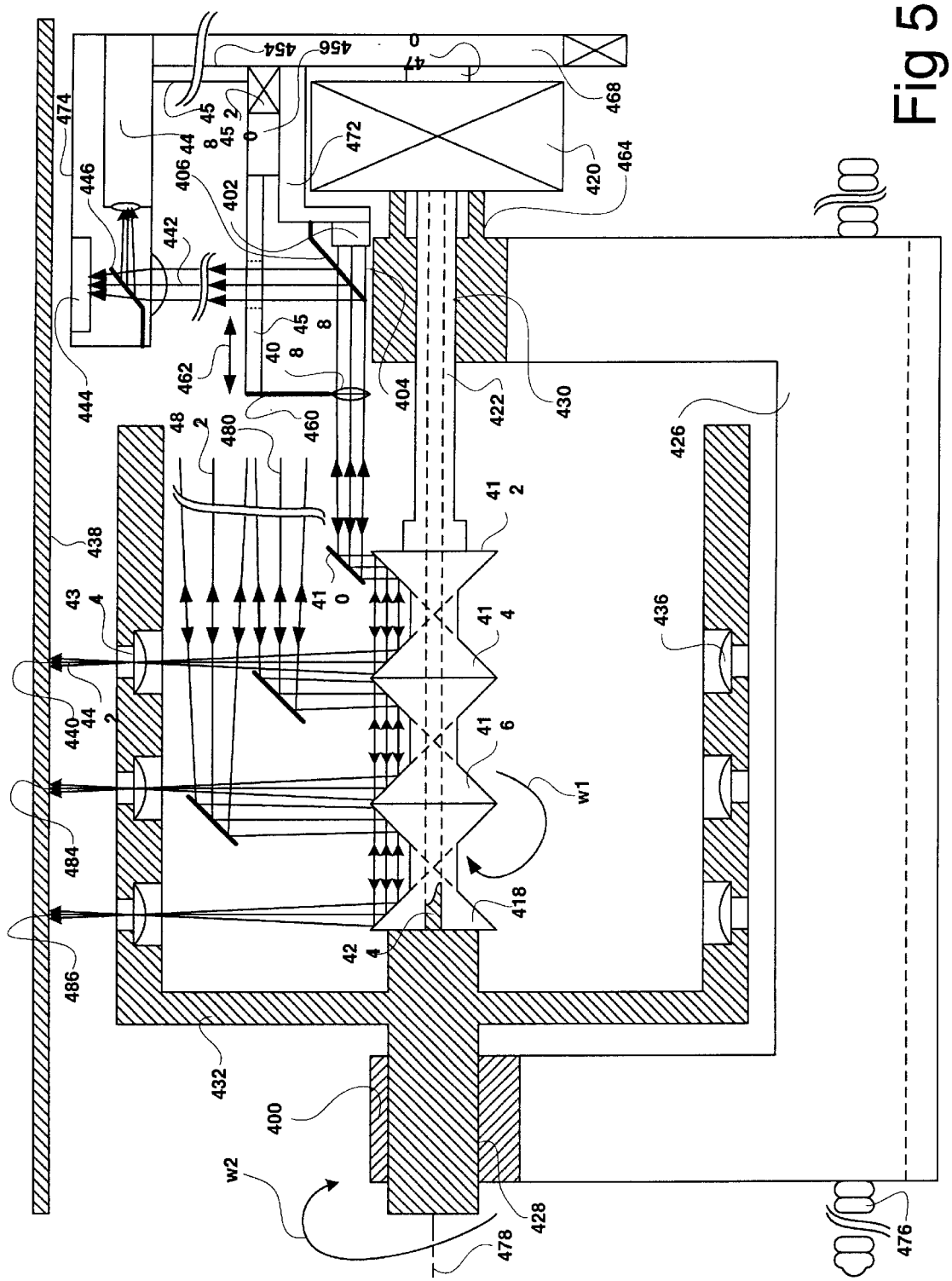

FIG. 5 illustrates reading and writing system according to the invention.

Figure 6:
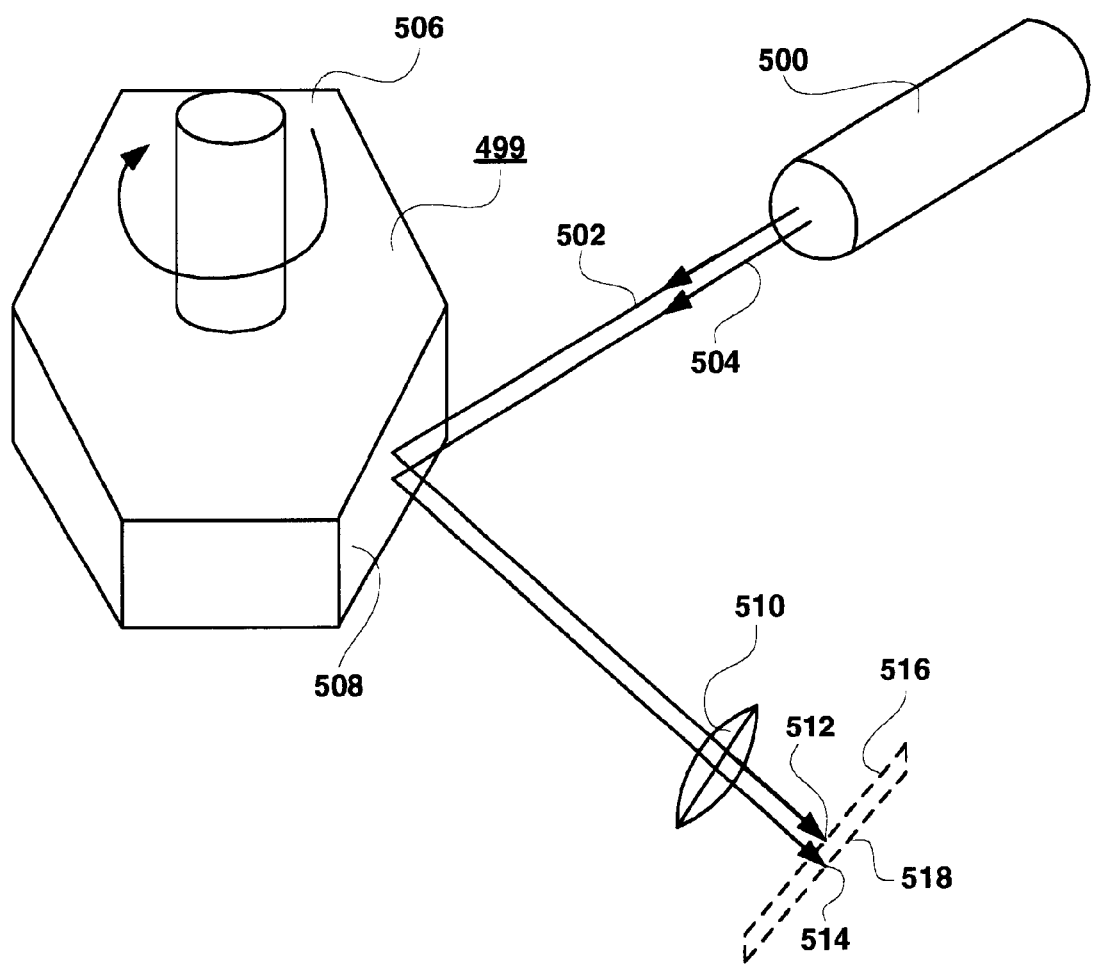

FIG. 6 shows a prior-art system for planar scanning.

Figure 7:
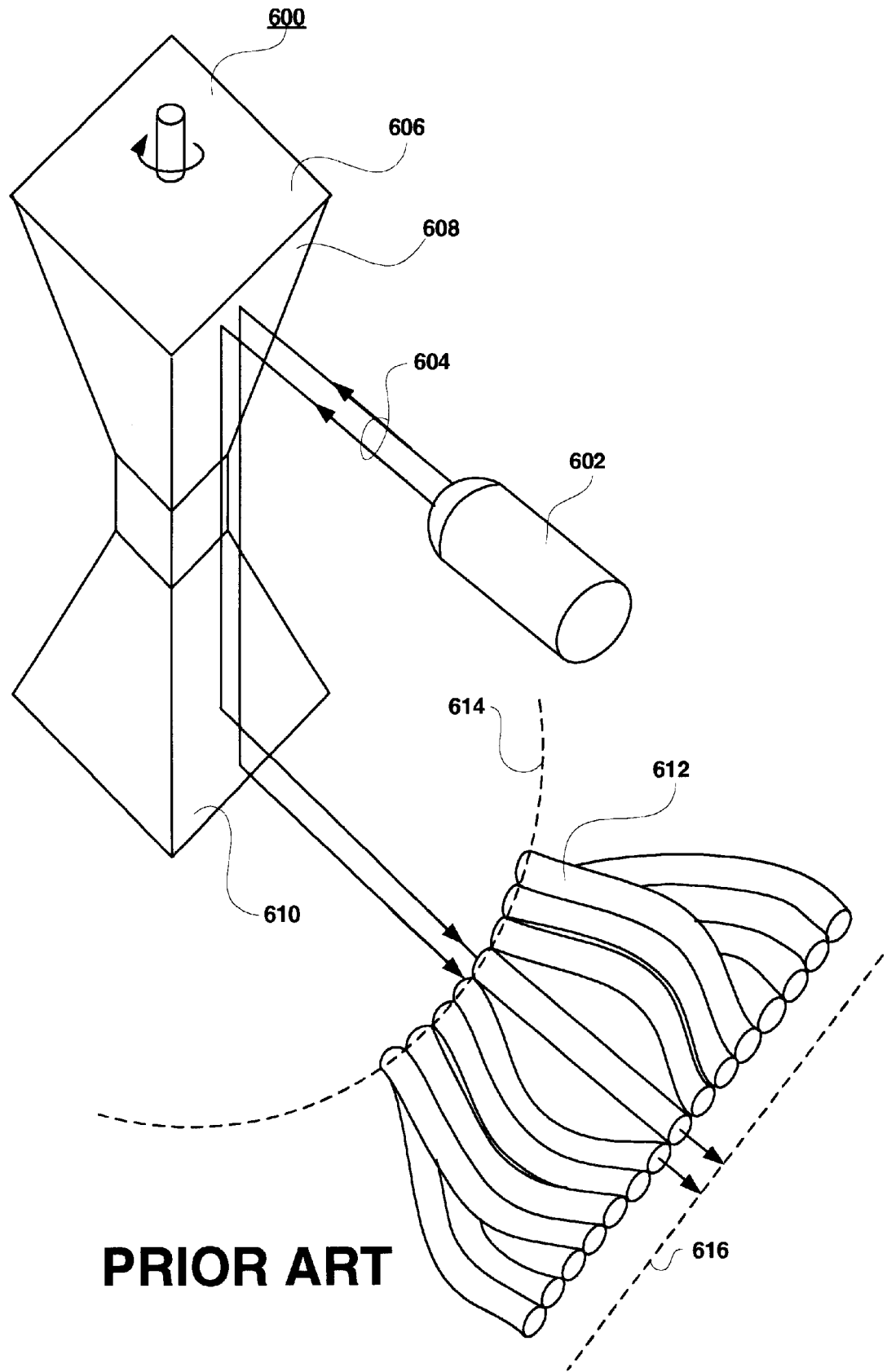

FIG. 7 illustrates another prior-art system for planar scanning.

Figure 8:
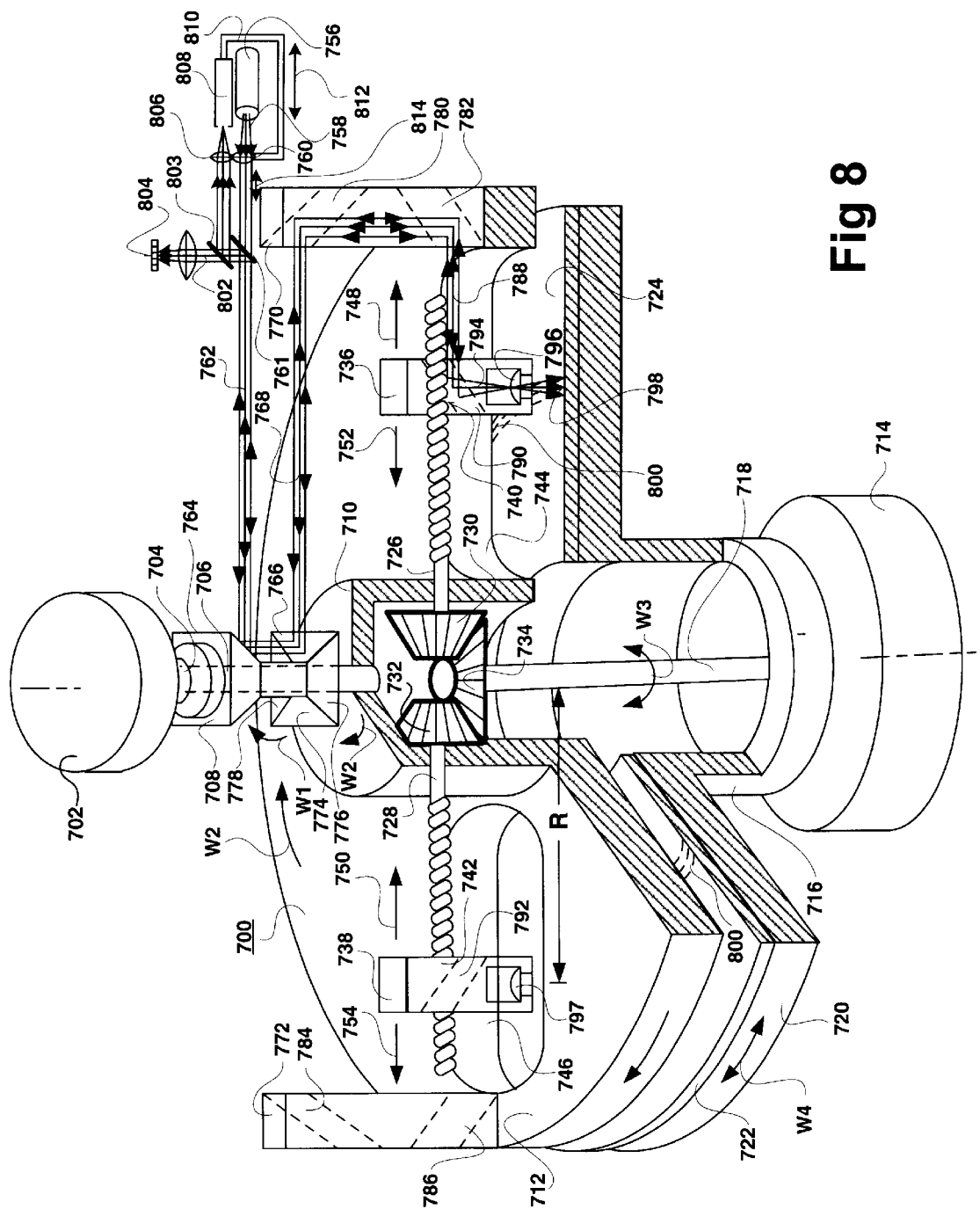

FIG. 8 illustrates a planar scanner according to the invention.

Figure 9:
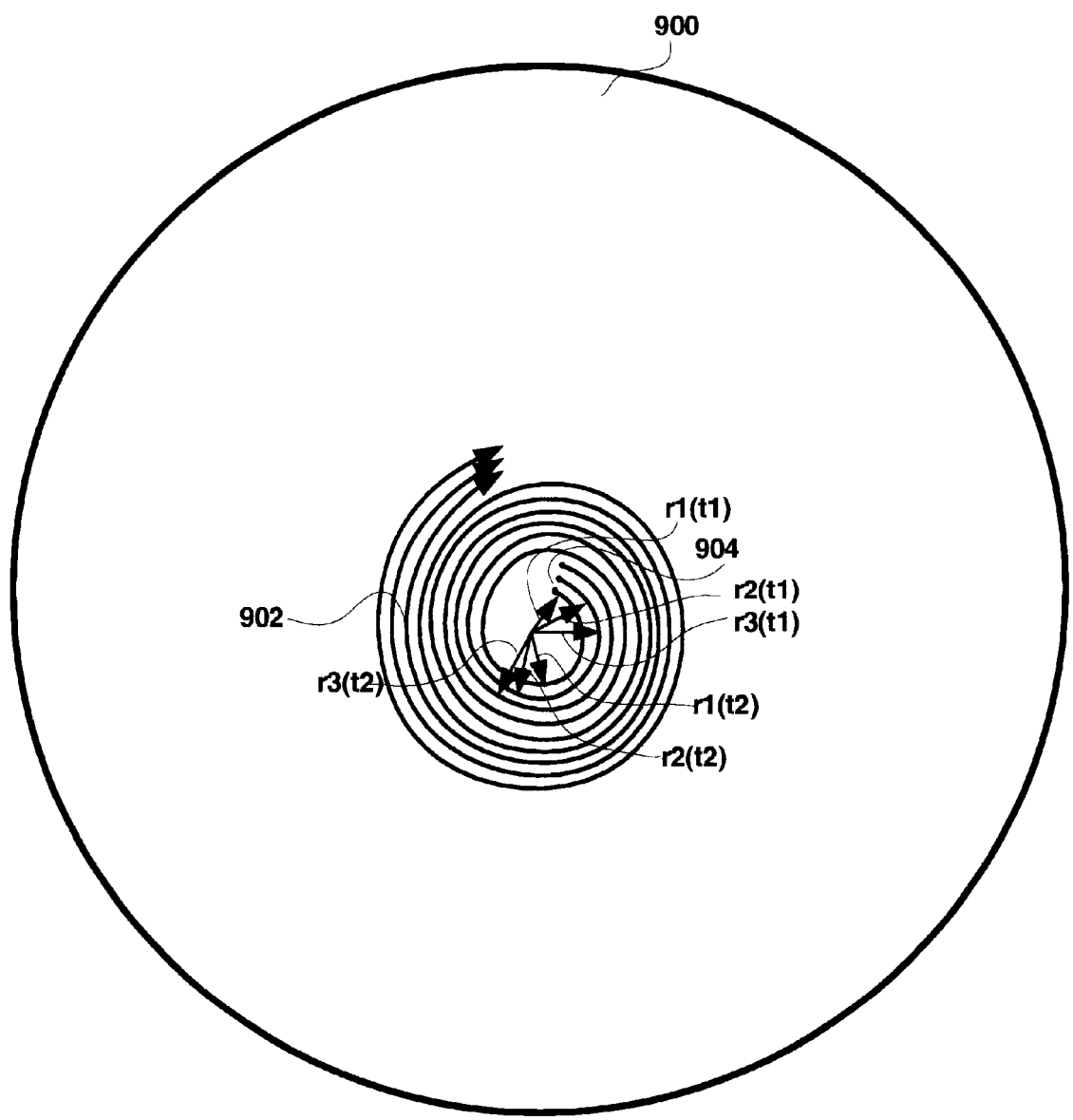

FIG. 9 illustrates the scan path of a planar scan system according to the invention.

Figure 10:
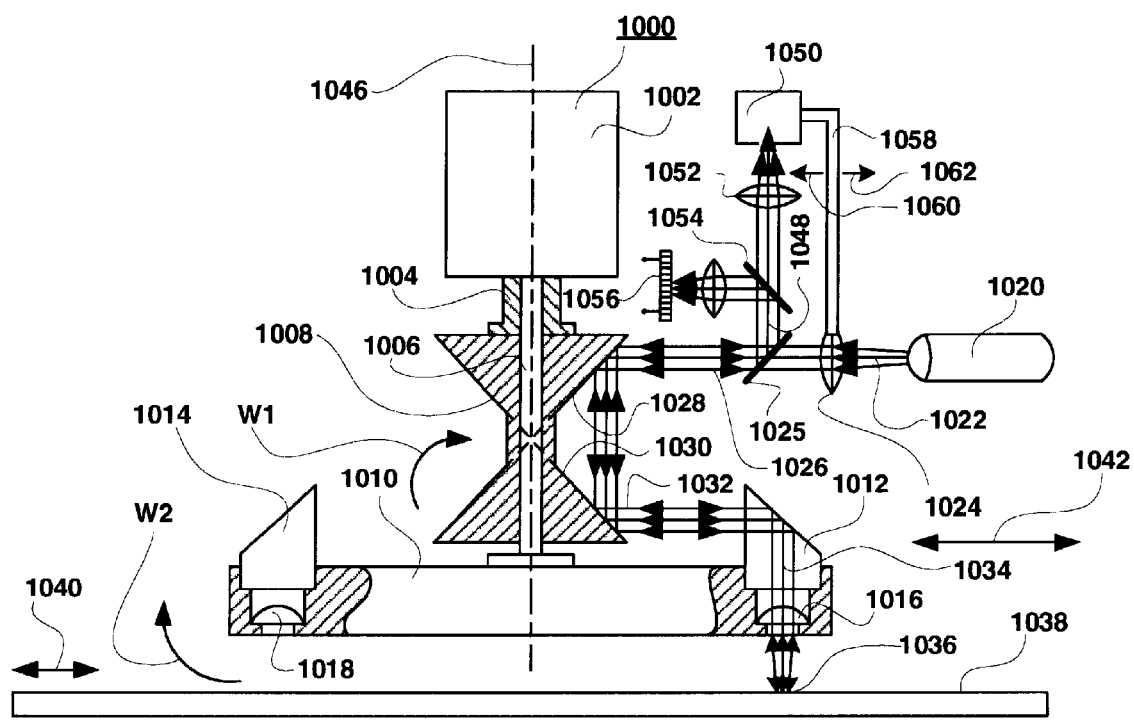

FIG. 10 illustrates another planar scanner system according to the invention.

Figure 11:
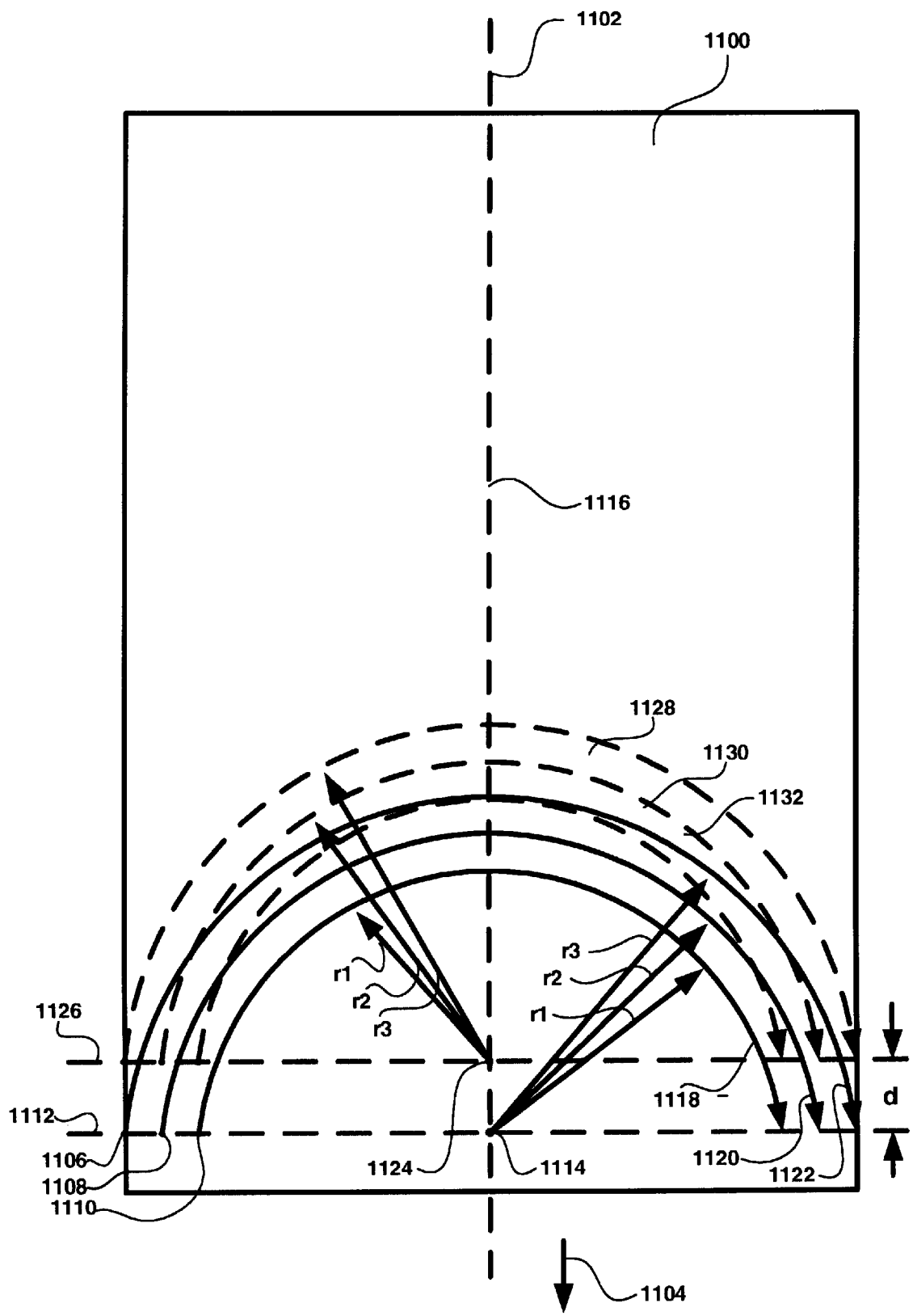

FIG. 11 shows another scan path of the planar scan system.

FIGS. 12a to 12d show an additional version of a planar scanner according to the invention.

Figure 13:
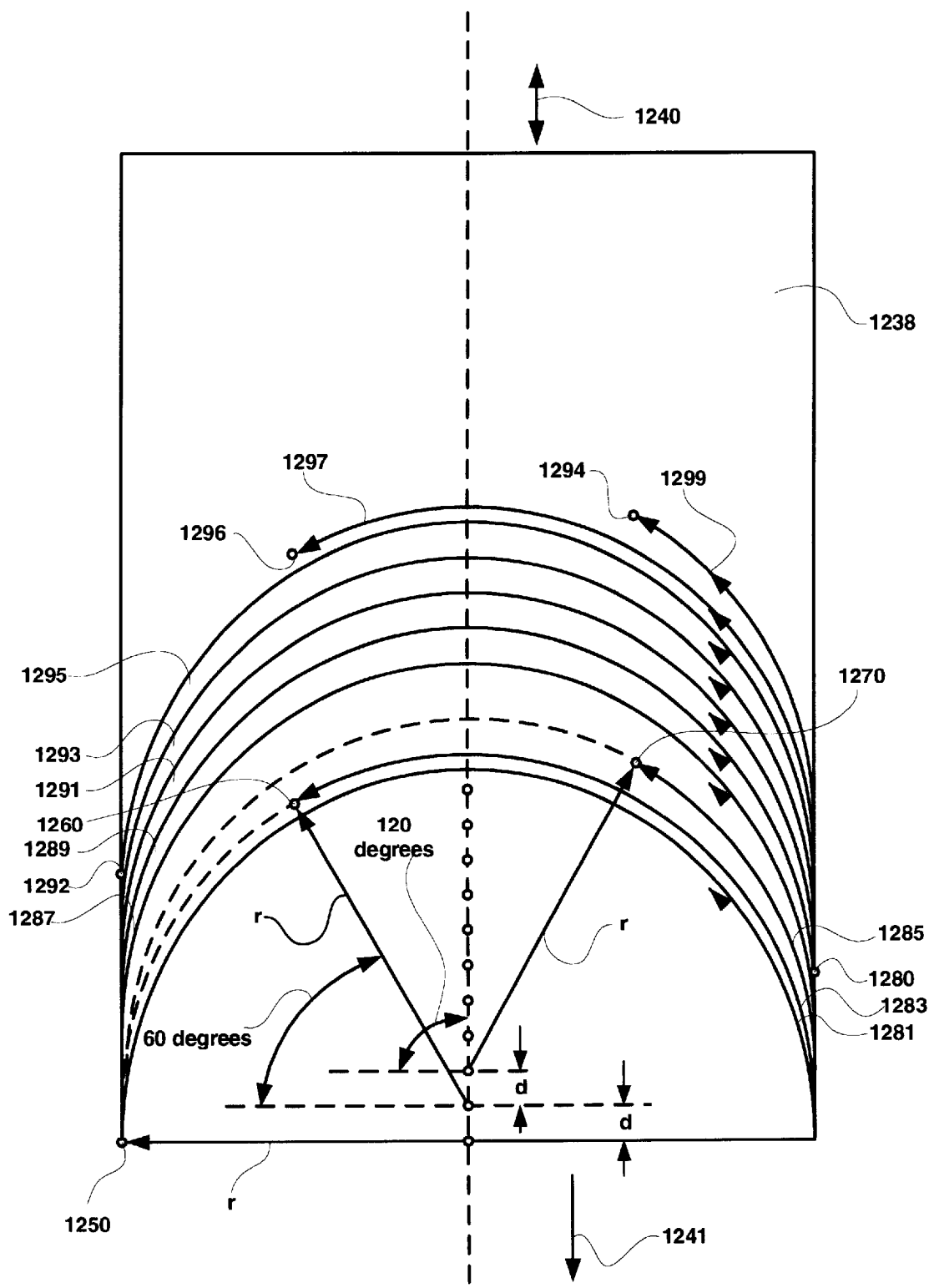

FIG. 13 illustrates a scan path on a planar surface according to the invention.

Figure 14:
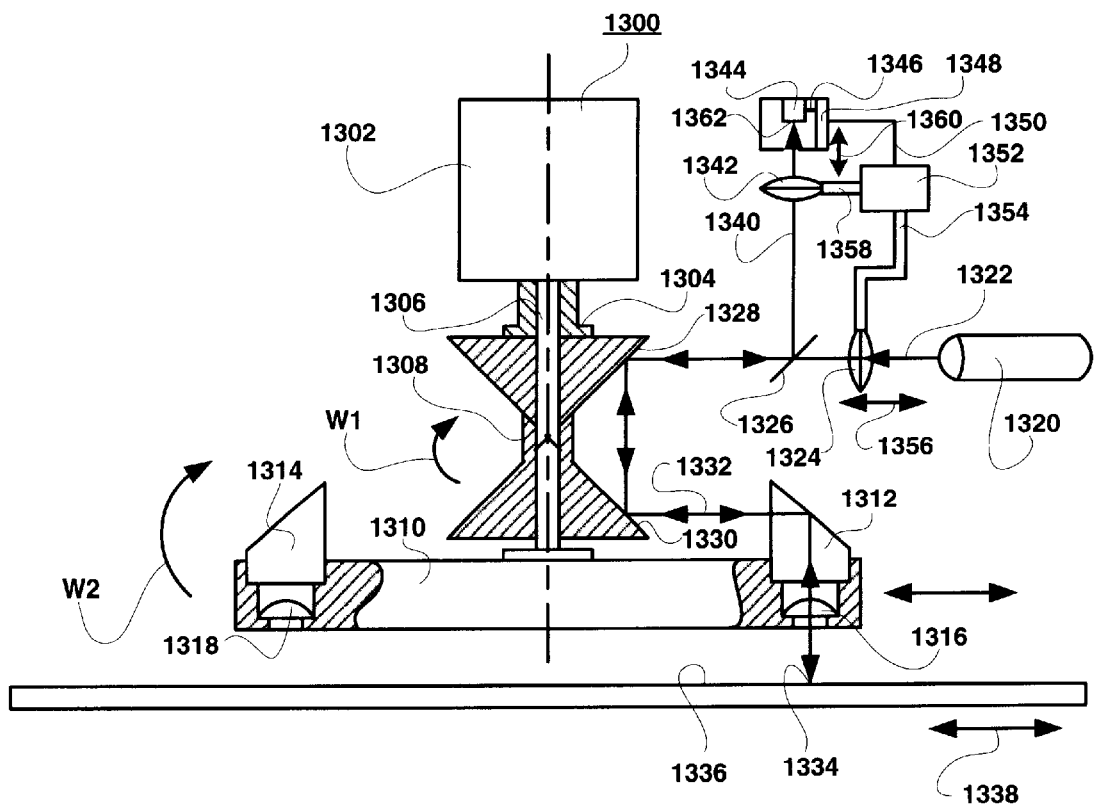

FIG. 14 shows the optical path of a scanner according to the invention.

Figure 15:
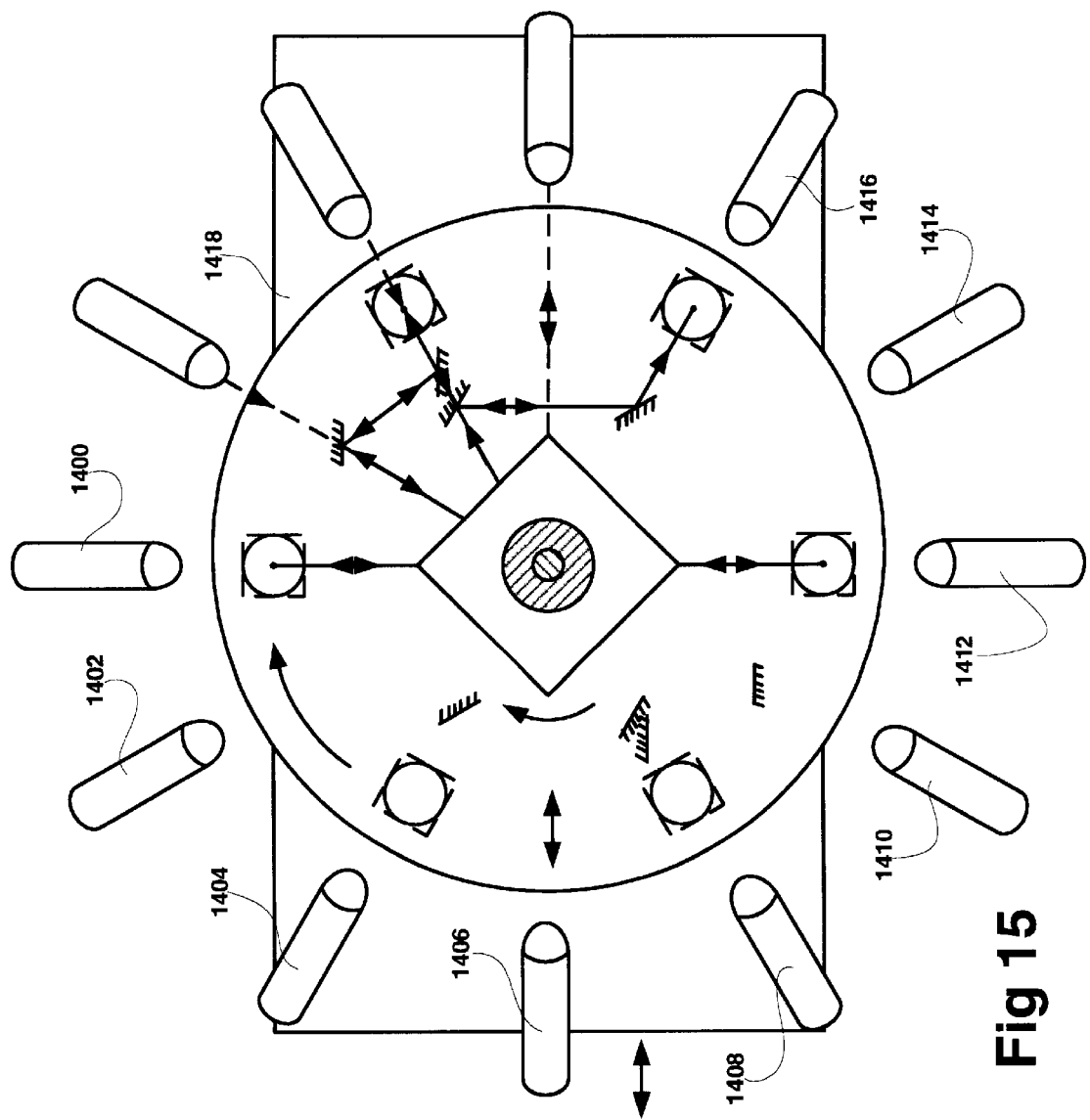

FIG. 15 illustrates a scanner with multiple illuminating facets according to the invention.

Figure 16:
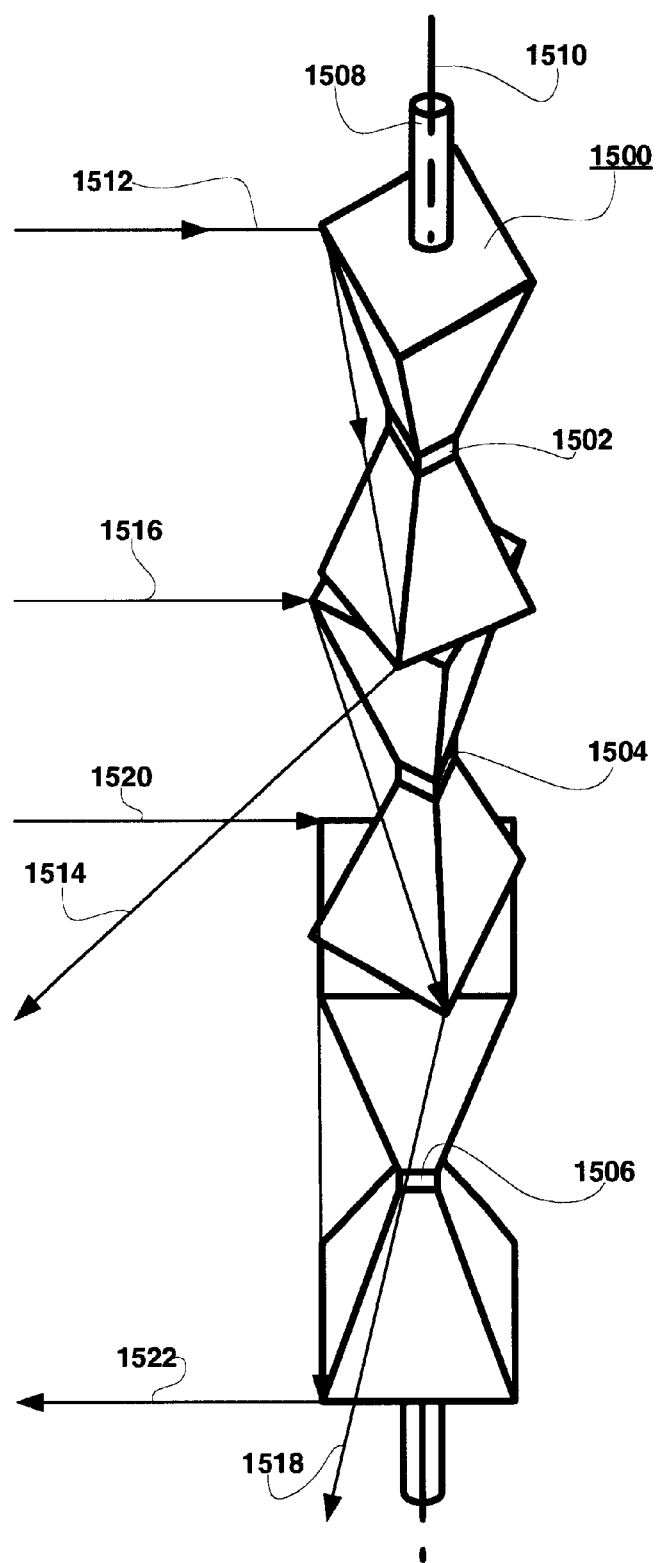

FIG. 16 shows a spinning scan device according to the invention.

Figure 17A:
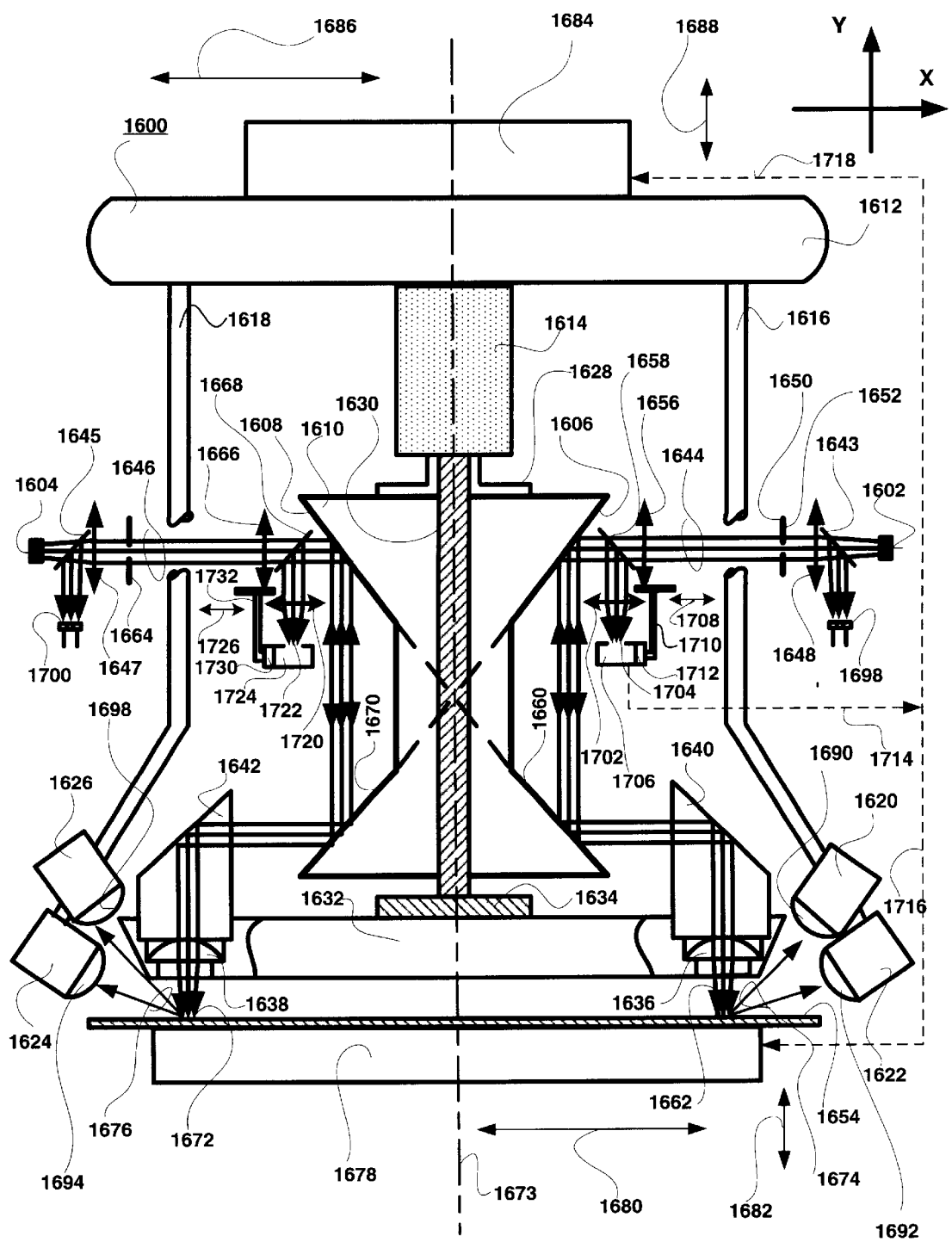
Figure 17B:
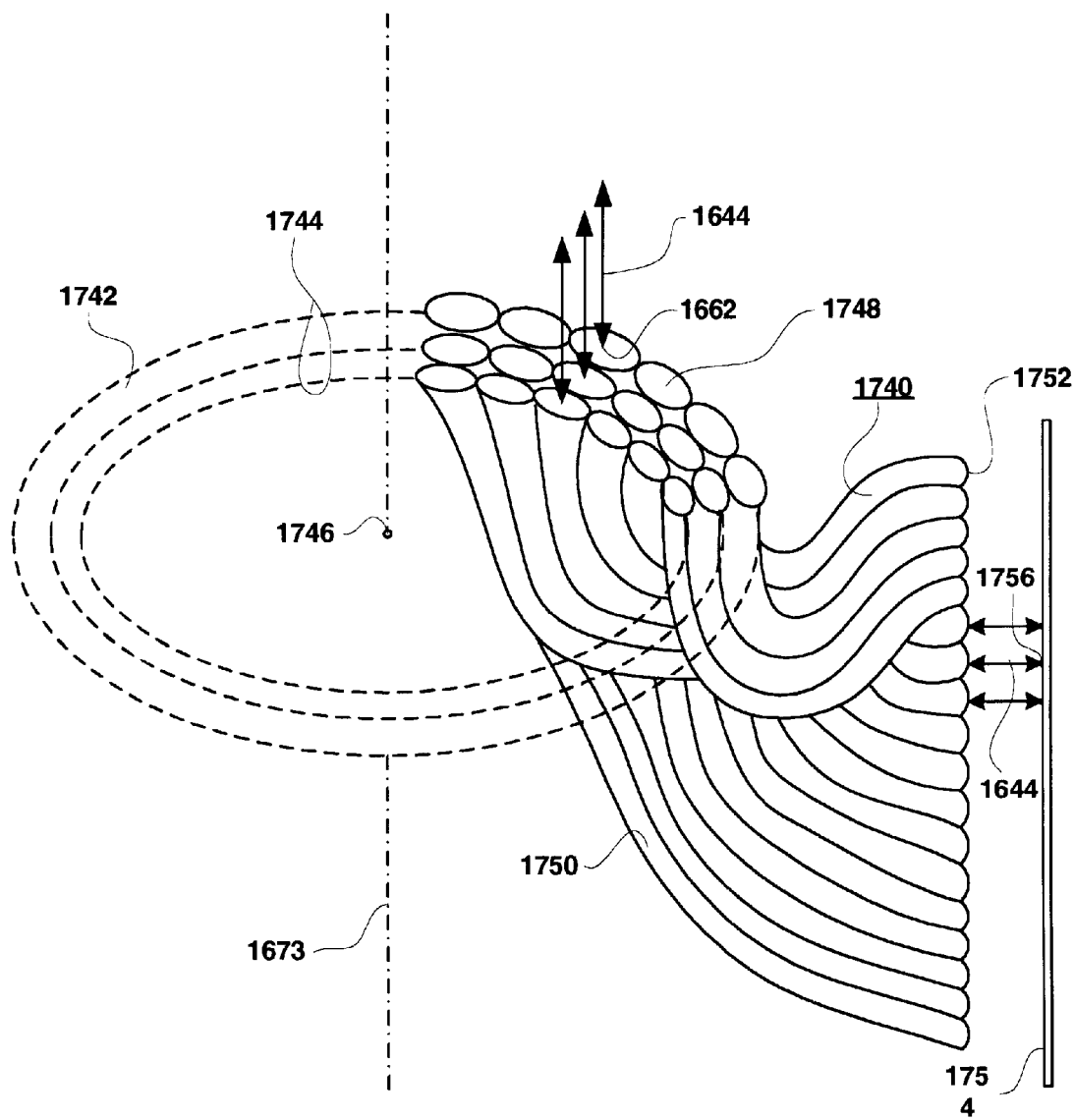

FIGS. 17a and 17b illustrate a side view of planar scan system according to the invention and a scanned region in the form of a bundle of radiation guides, respectively.

Figure 18:
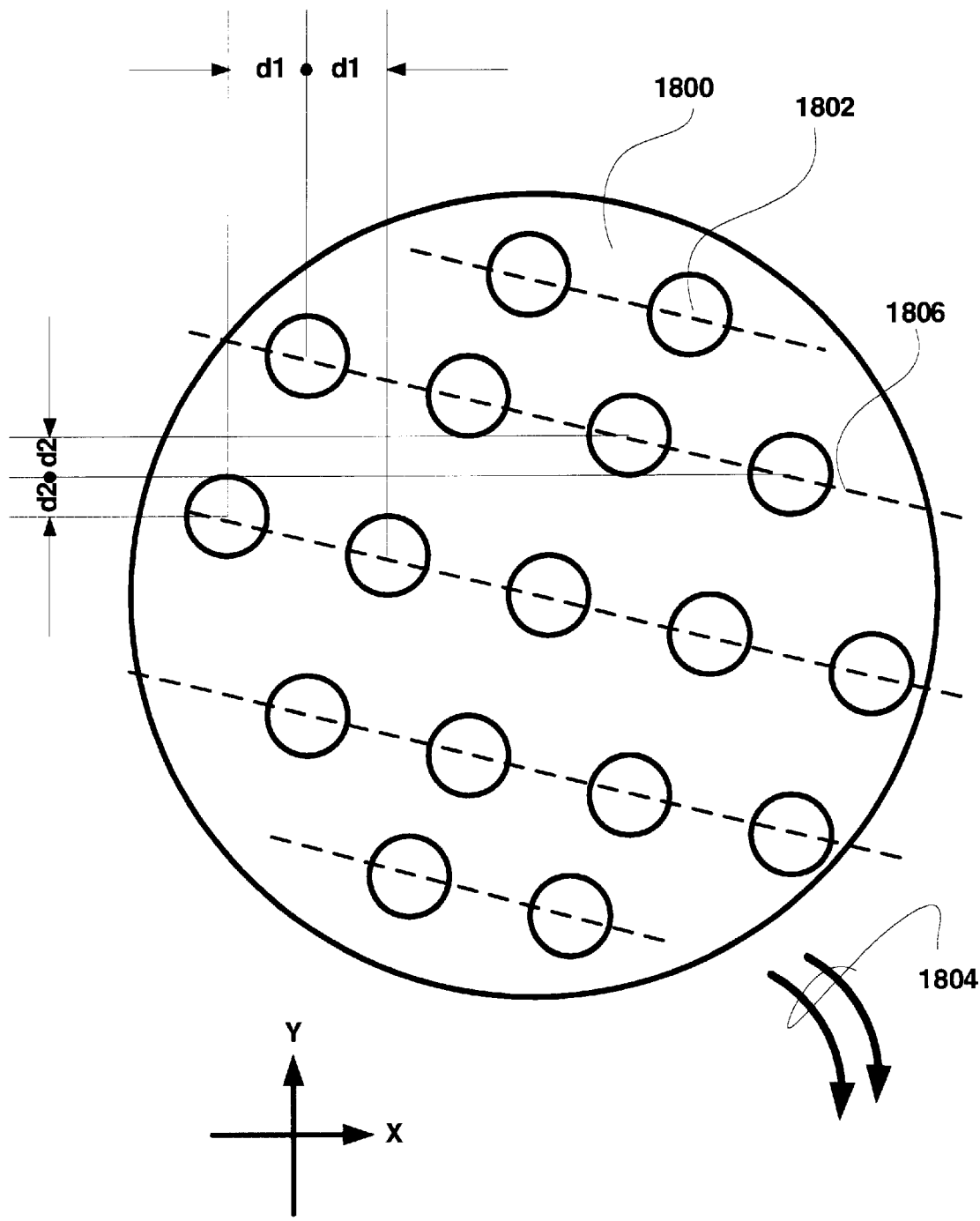

FIG. 18 shows a schematic top view of a pinhole array used in the field of scanning confocal microscopes, designed according to the invention.

Figure 19A:
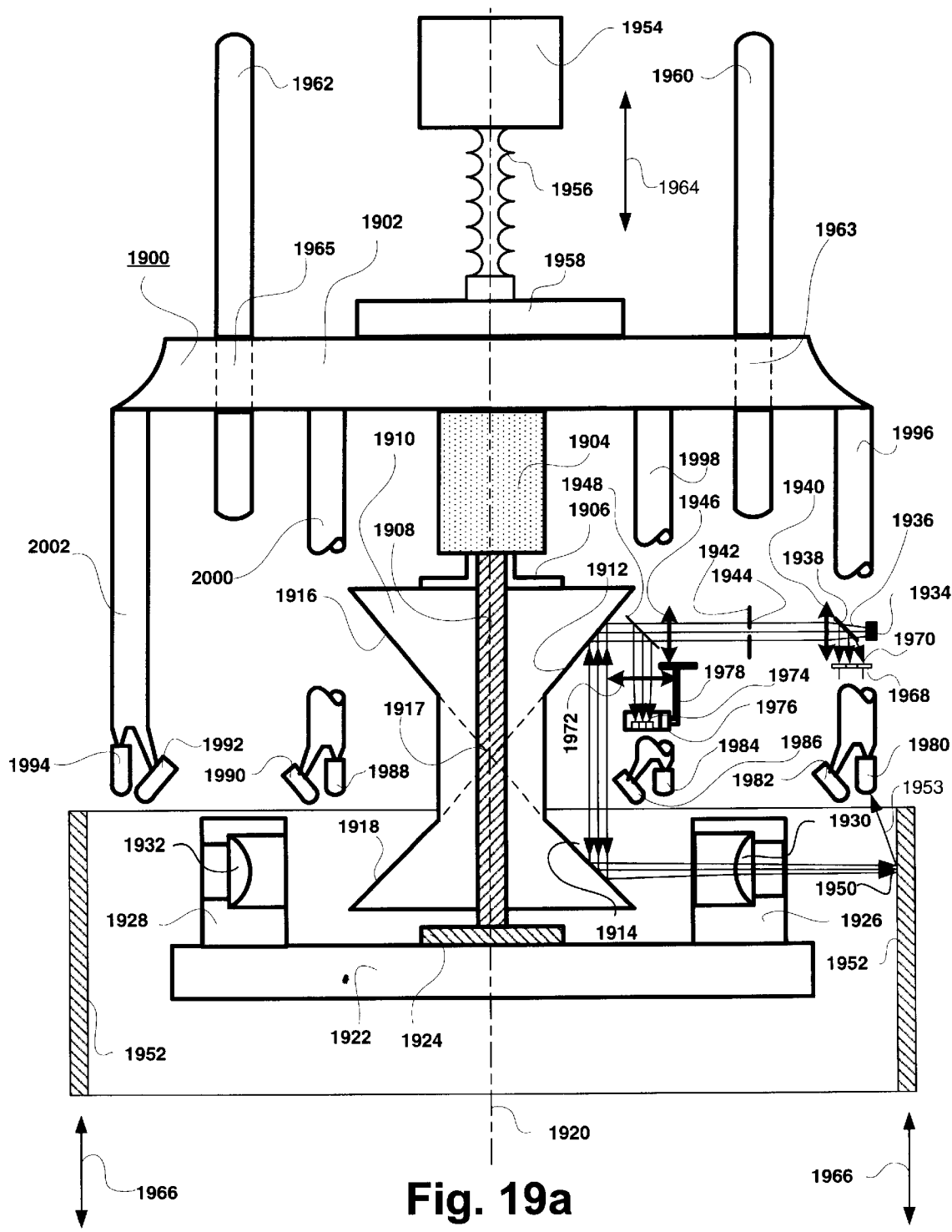
Figure 19B:
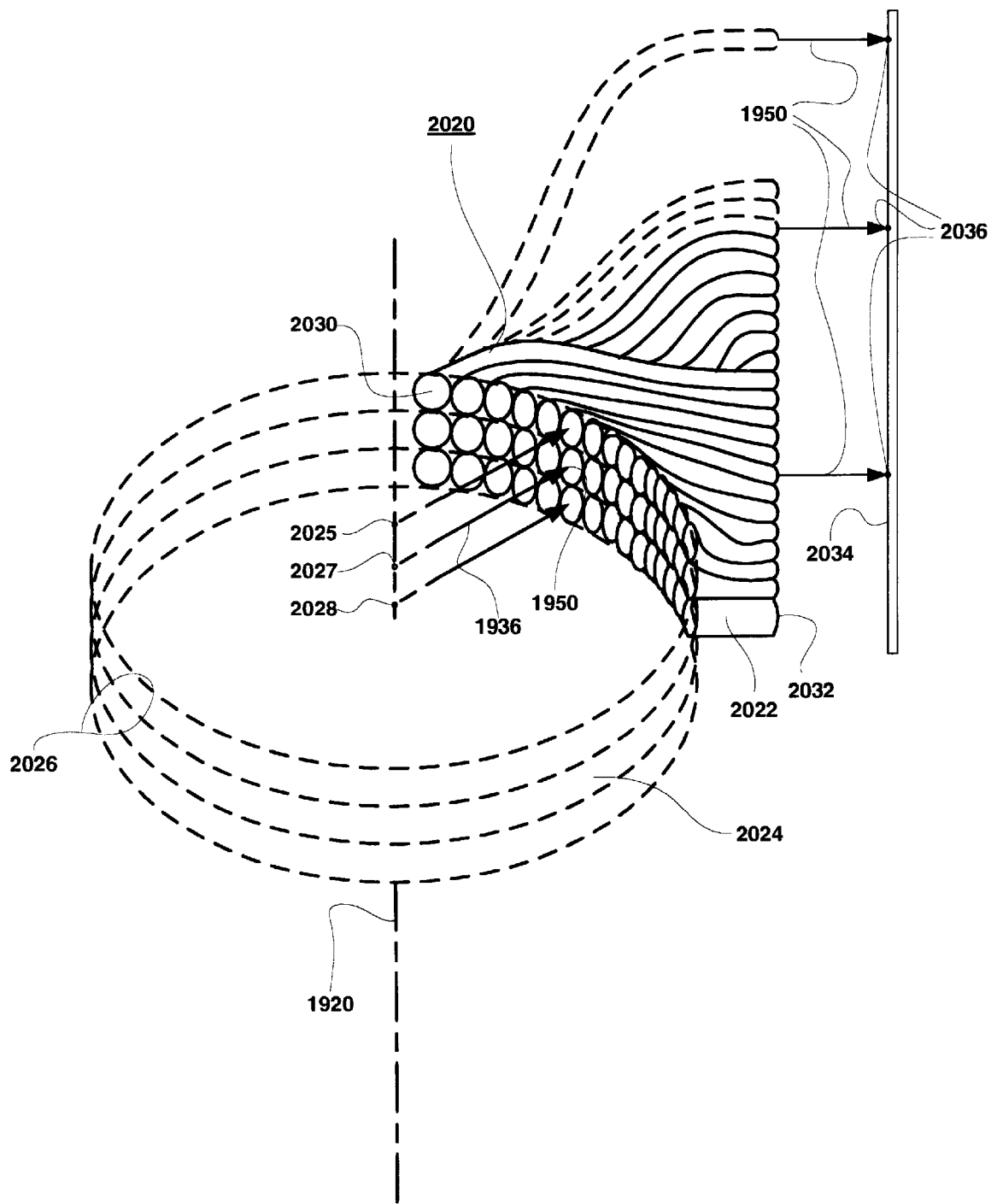

FIGS. 19a and 19b illustrate a side view of inner drum scan system according to the invention and a scanned region in a form of a bundle of radiation guides, respectively.

Figure 20:
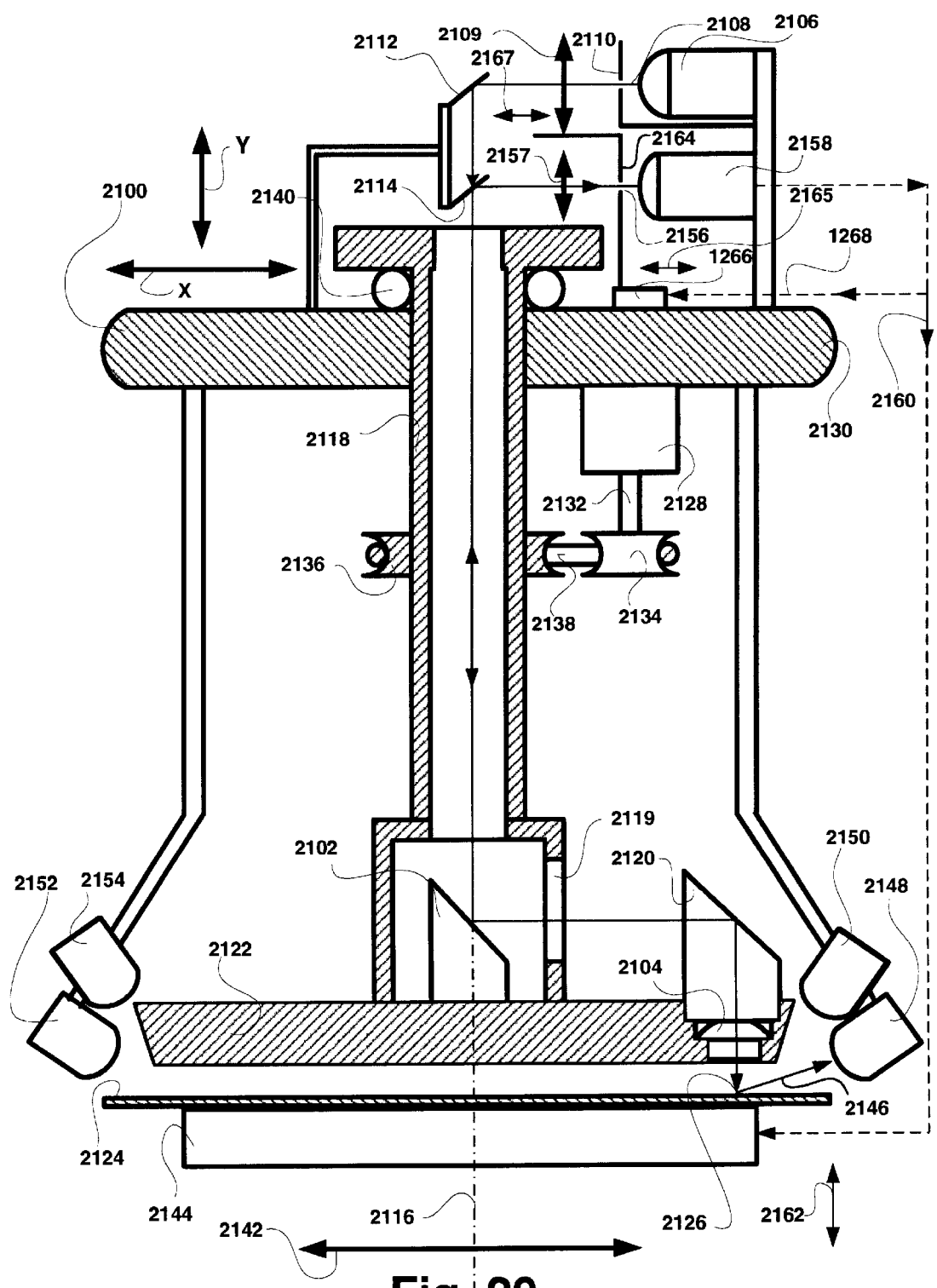

FIG. 20 shows a planar scan system according to the invention for a single scan beam rotating at the same angular velocity as the scan device.

Figure 21:
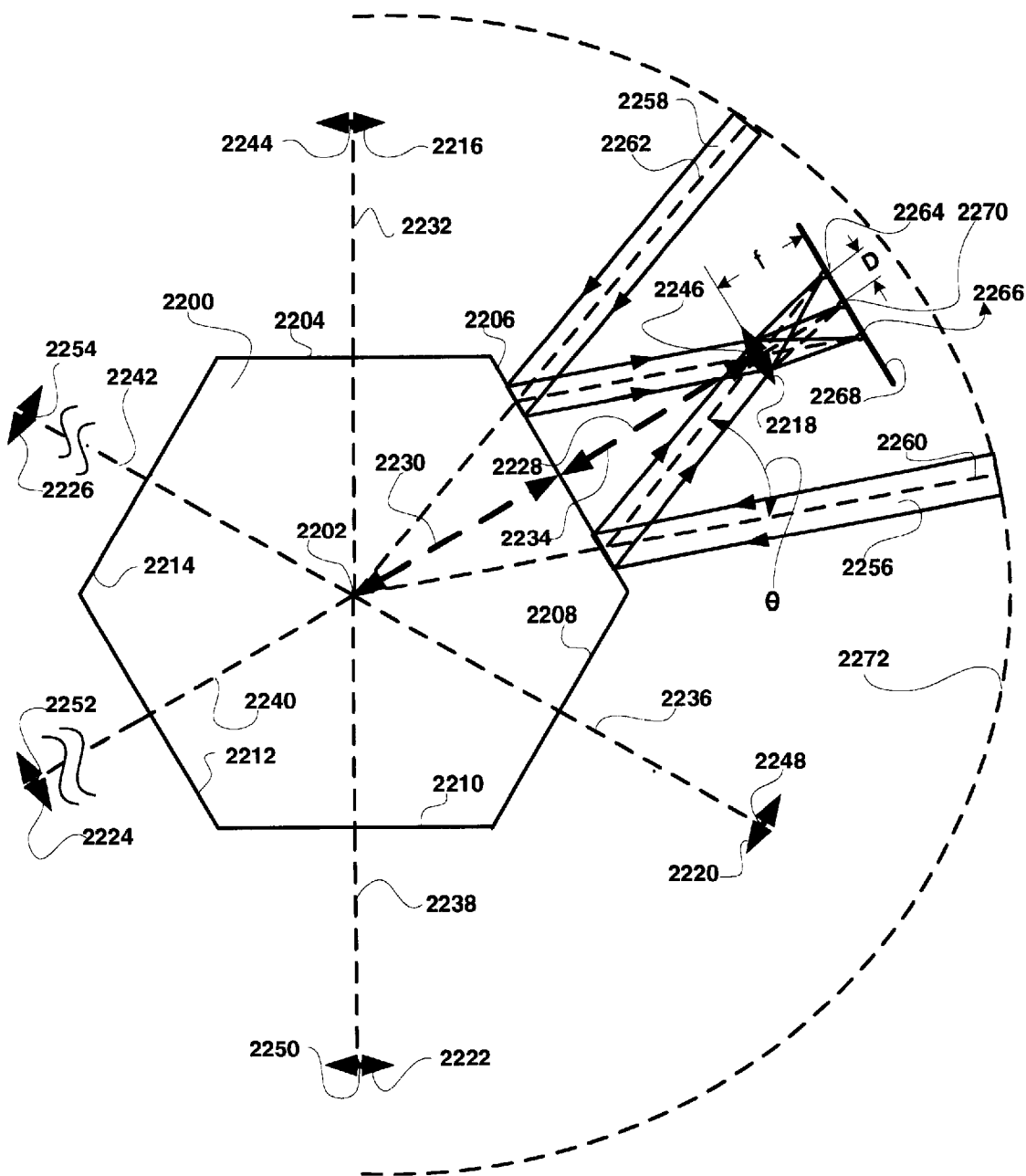

FIG. 21 illustrates the optical properties of scan polygons used in the system of the invention.

Figure 22A:
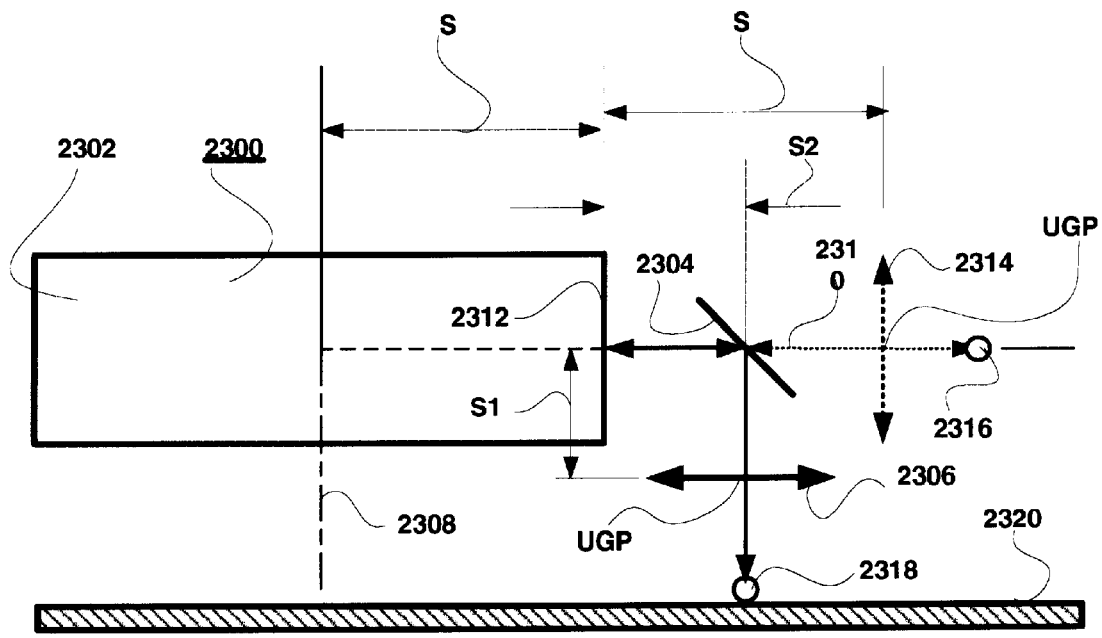
Figure 22B:
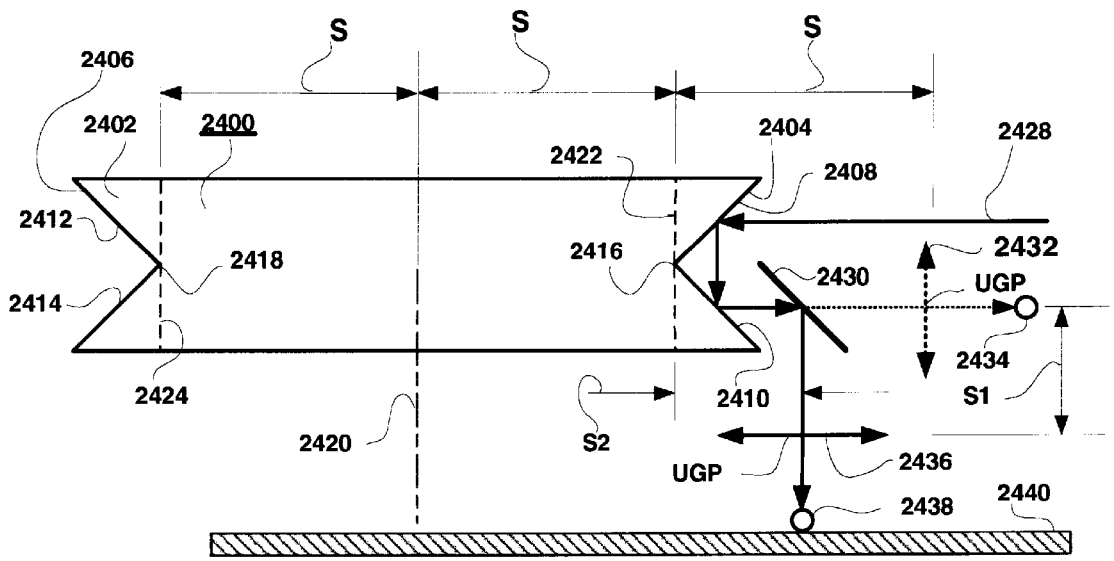

FIGS. 22a and 22b illustrate scan configurations according to the invention.

Figure 23:
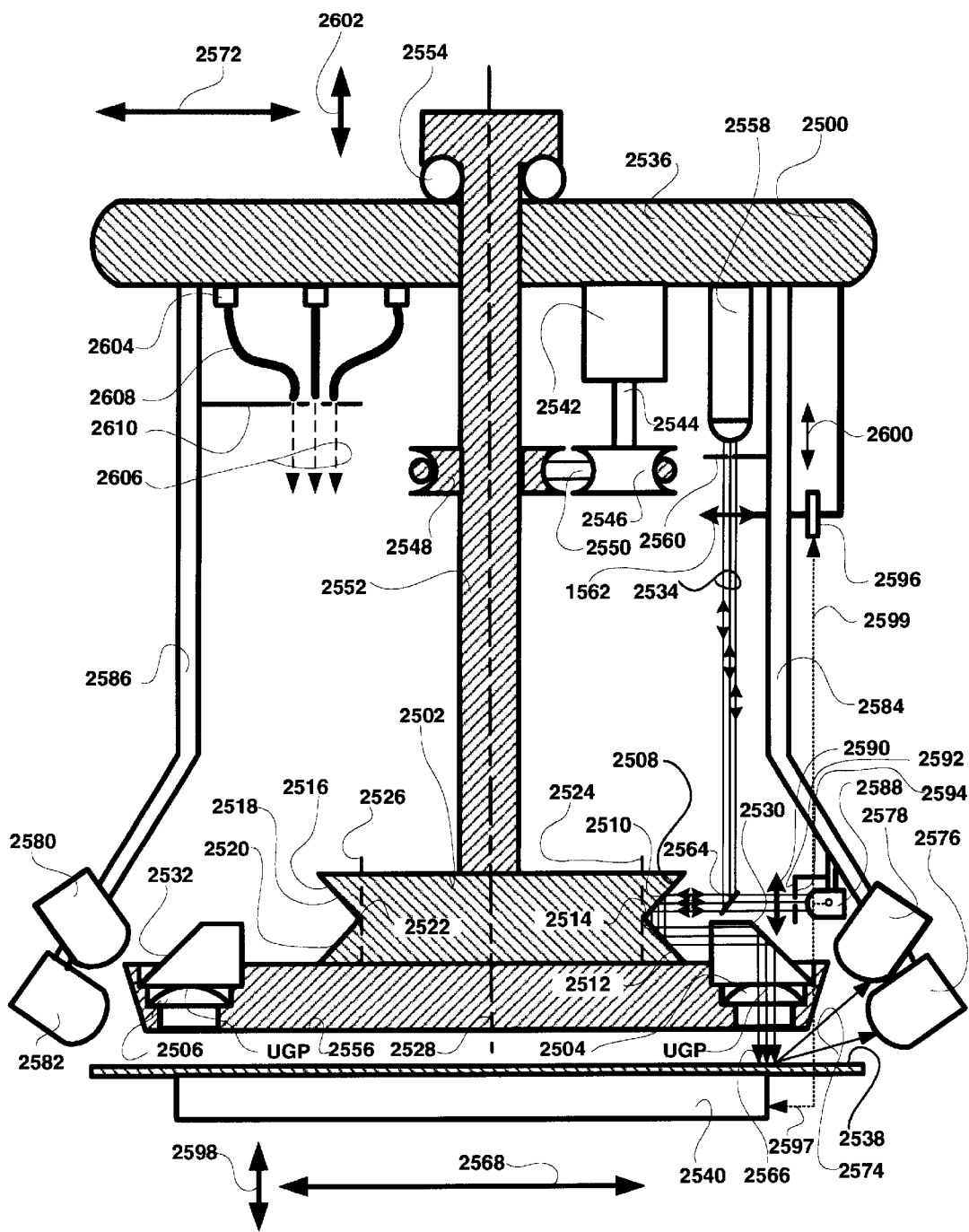

FIG. 23 illustrates a planar scan system according to the invention using a scan device and scan lenses rotating at the same speed.

Figure 24A:
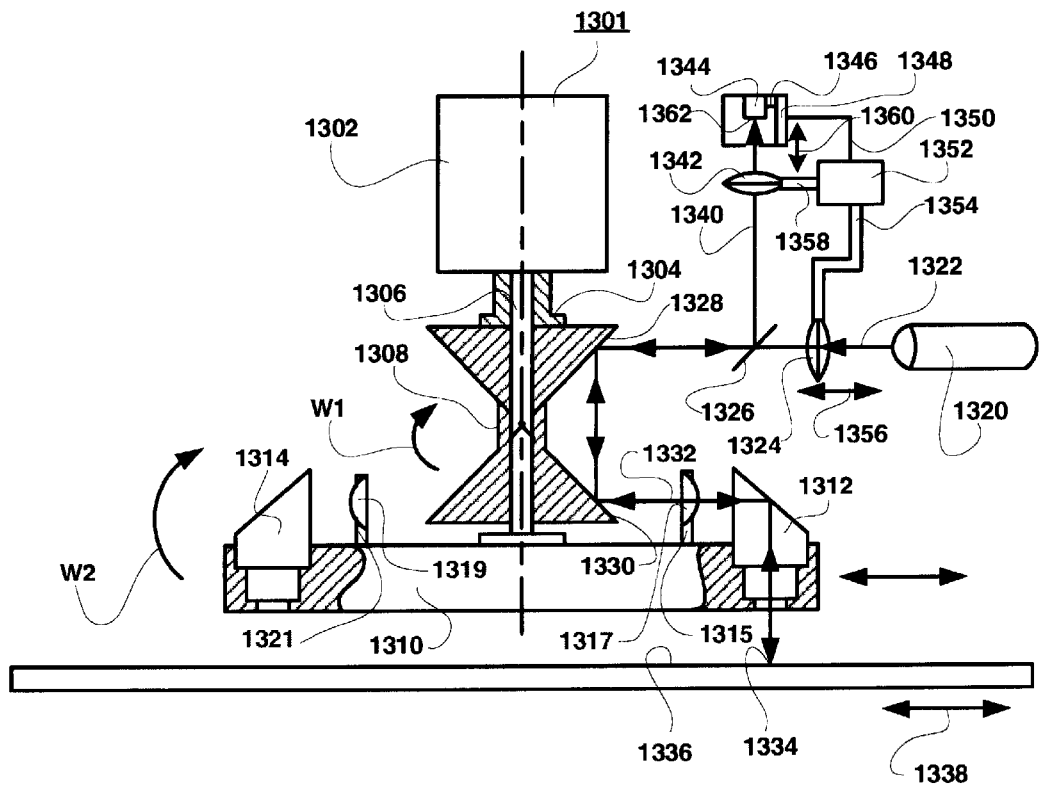
Figure 24B:
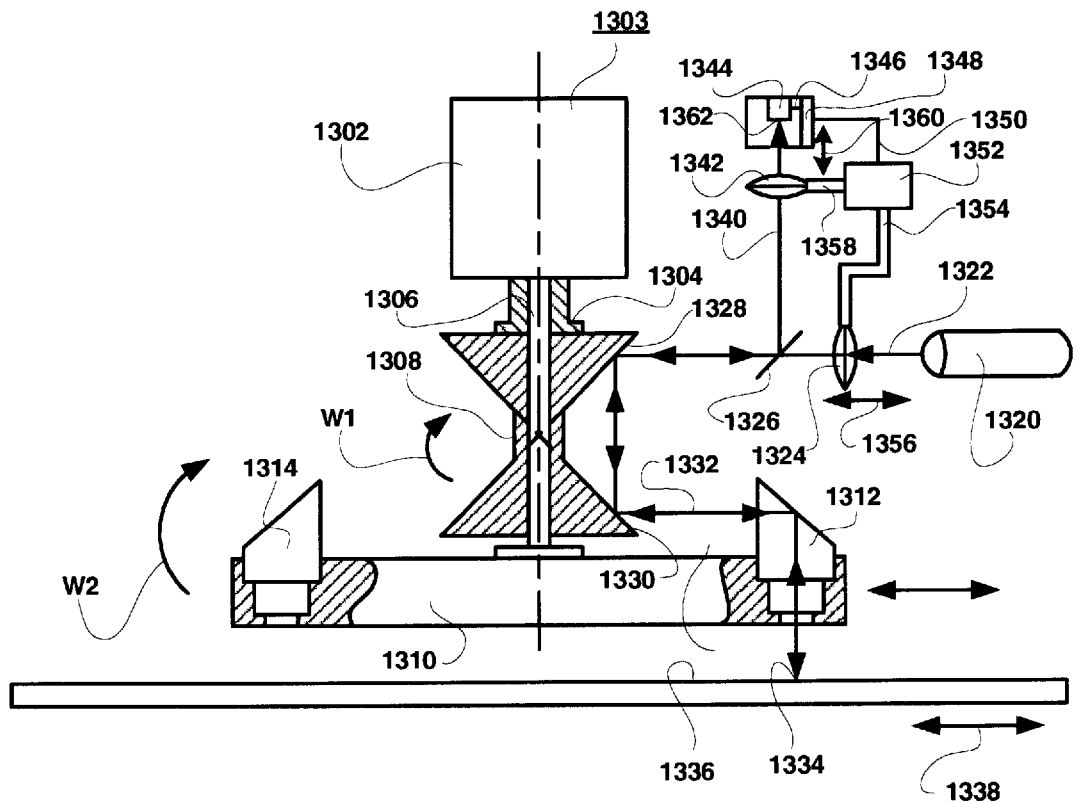

FIGS. 24a and 24b illustrate scanning systems having rotating optical systems according to the invention.

Figure 25:
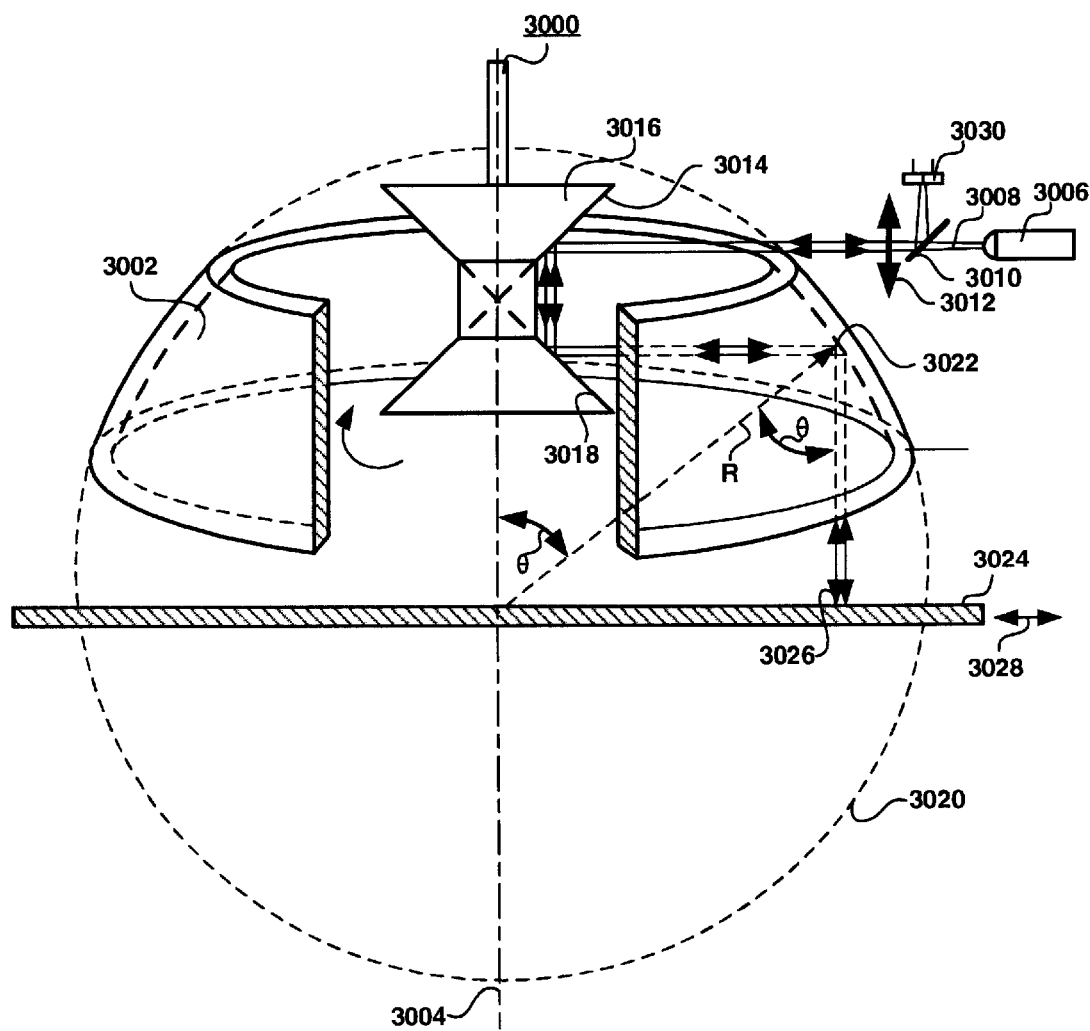

FIG. 25 shows scanning system with a rotatable optical system in the form of a static reflector.

Figure 26:
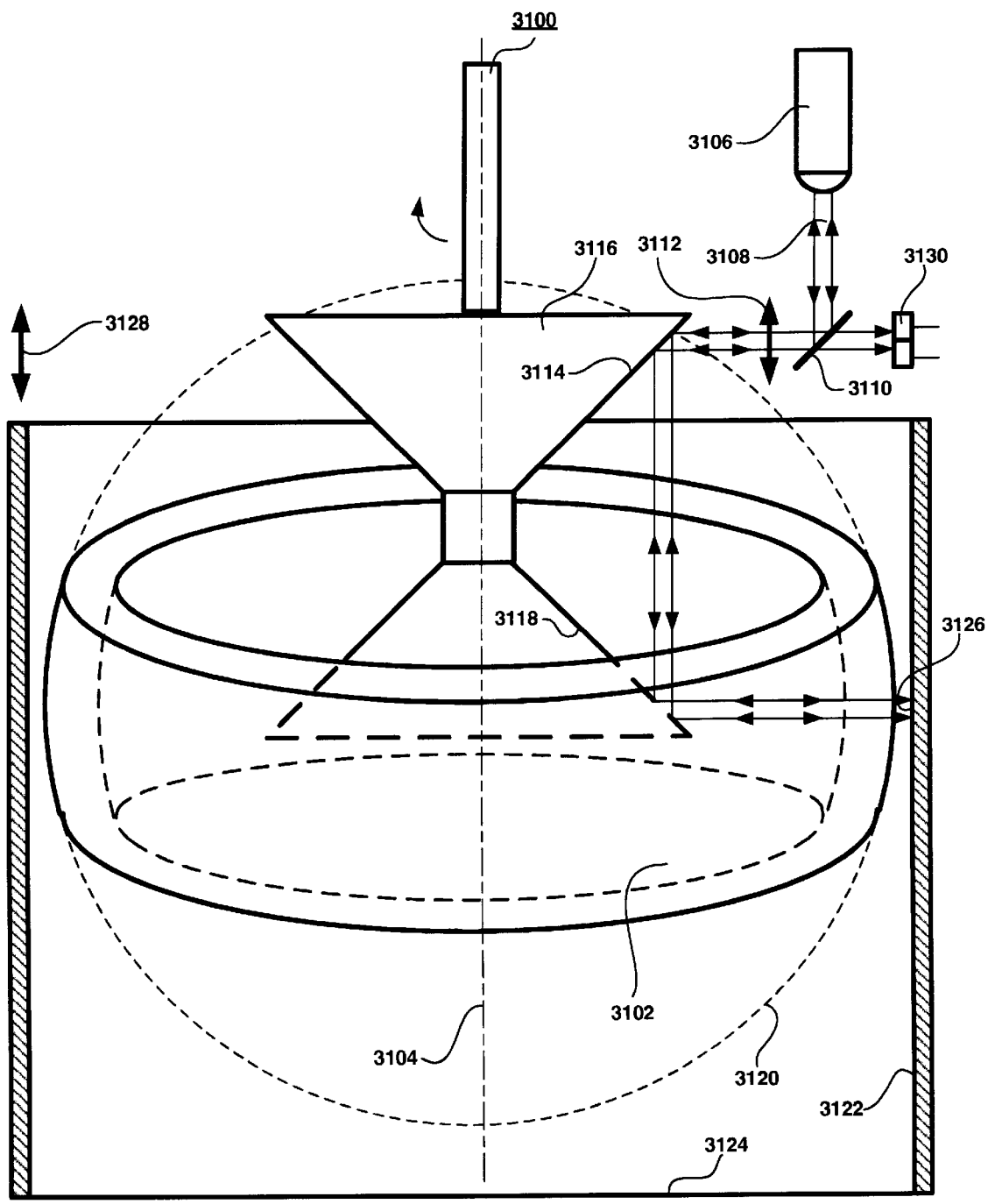

FIG. 26 shows a scanning system with a rotatable optical system in the form of a static lens.

Figure 27:
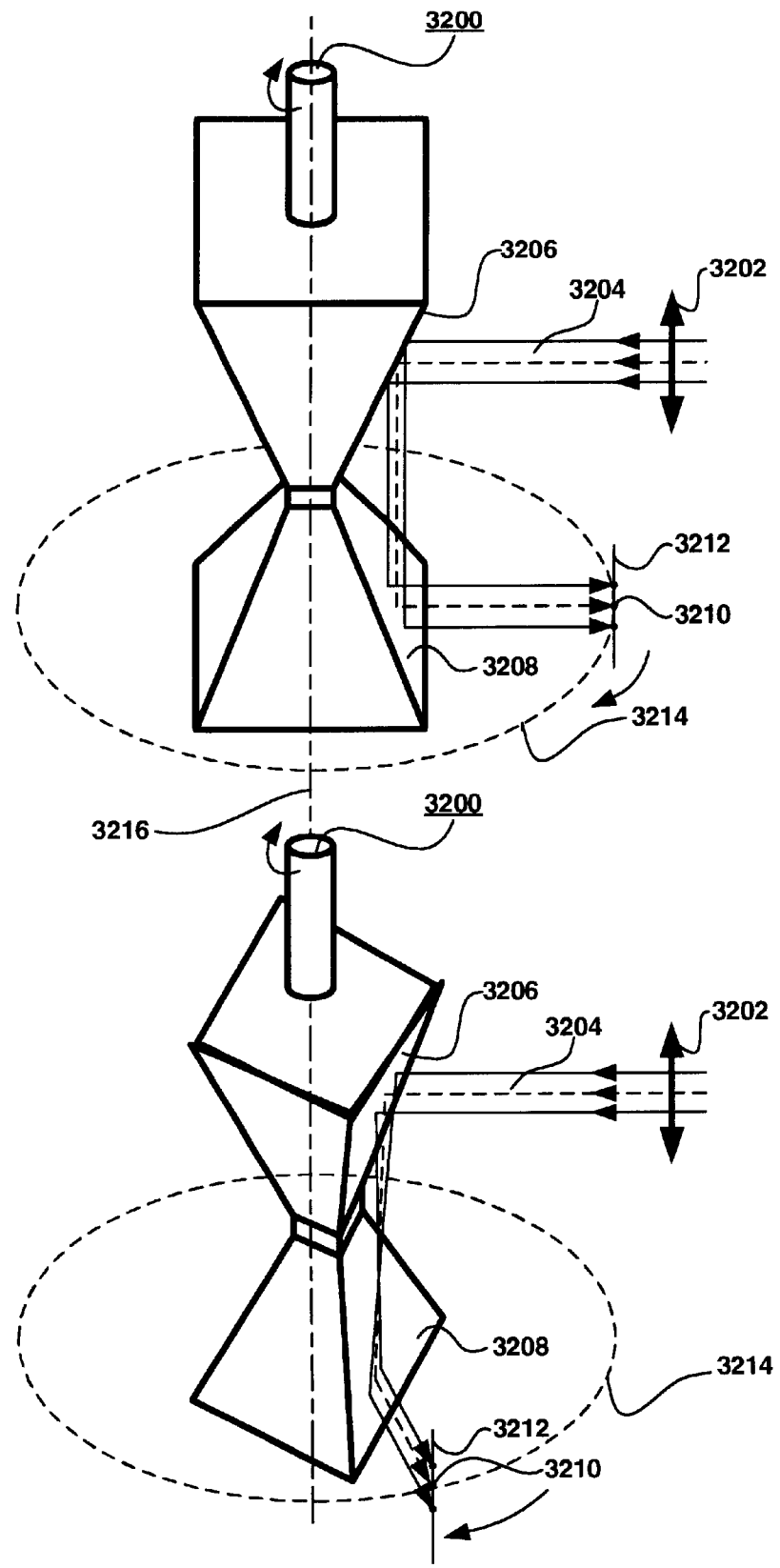

FIG. 27 shows the orientation of the scanning beams in FIG. 19a as a function of the scan rotation.

Figure 28:
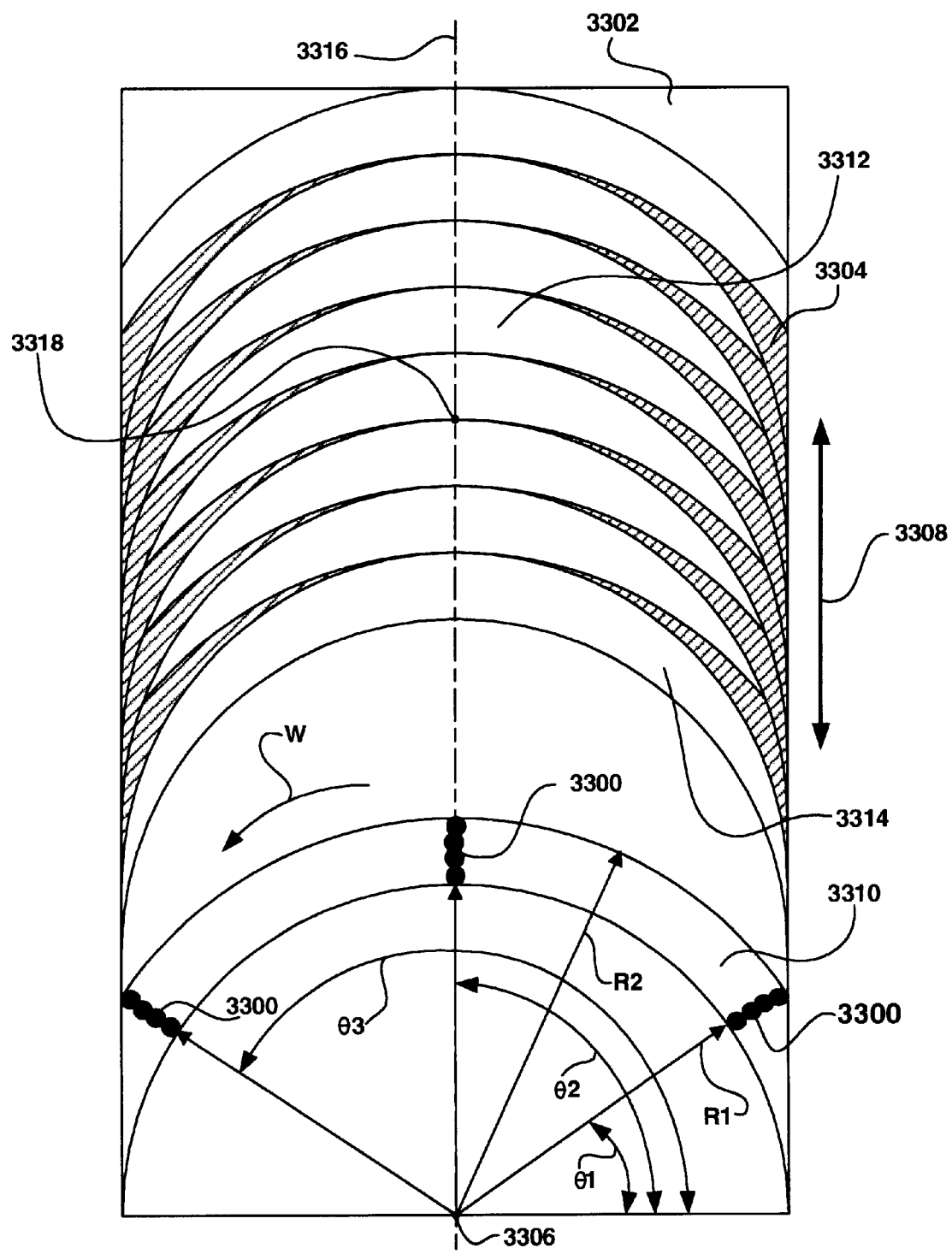

FIG. 28 illustrates an area scan according to the invention.

Figure 29A:
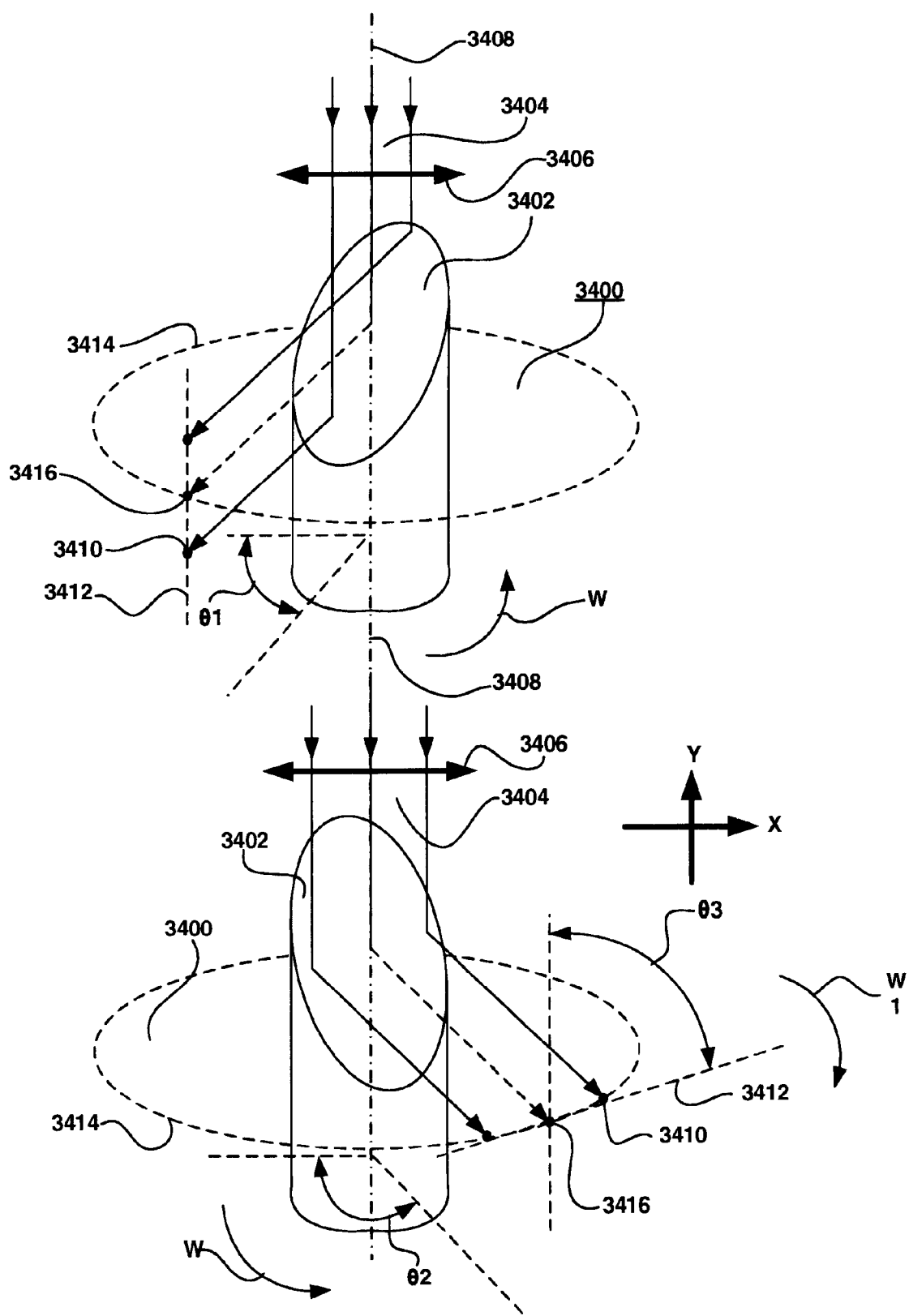
Figure 29B:
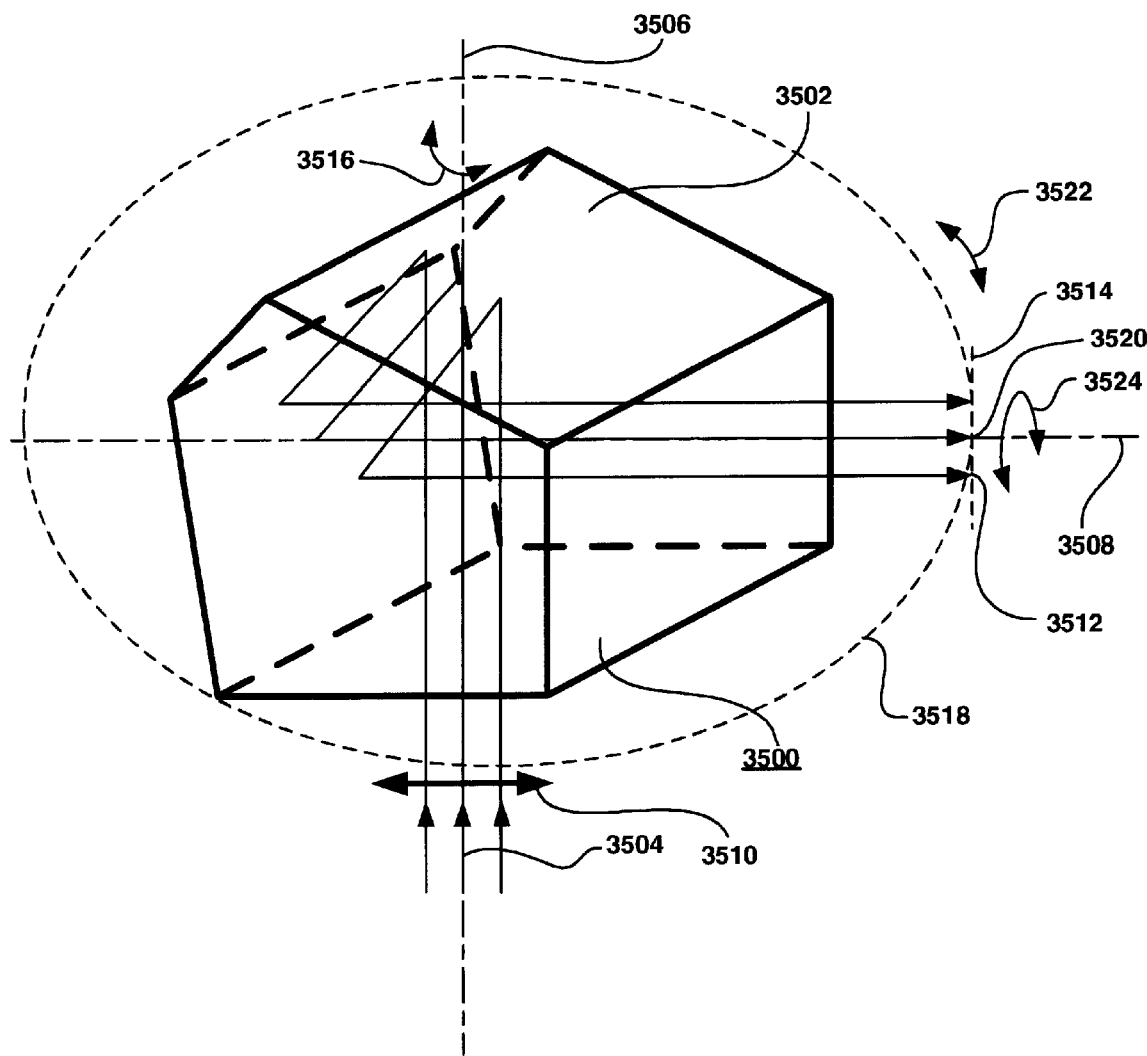

FIGS. 29a and 29b are illustrations of the orientations of the scanning beams as a function of the scan rotation of a tilted mirror and a pentaprism, respectively.

Figure 30:
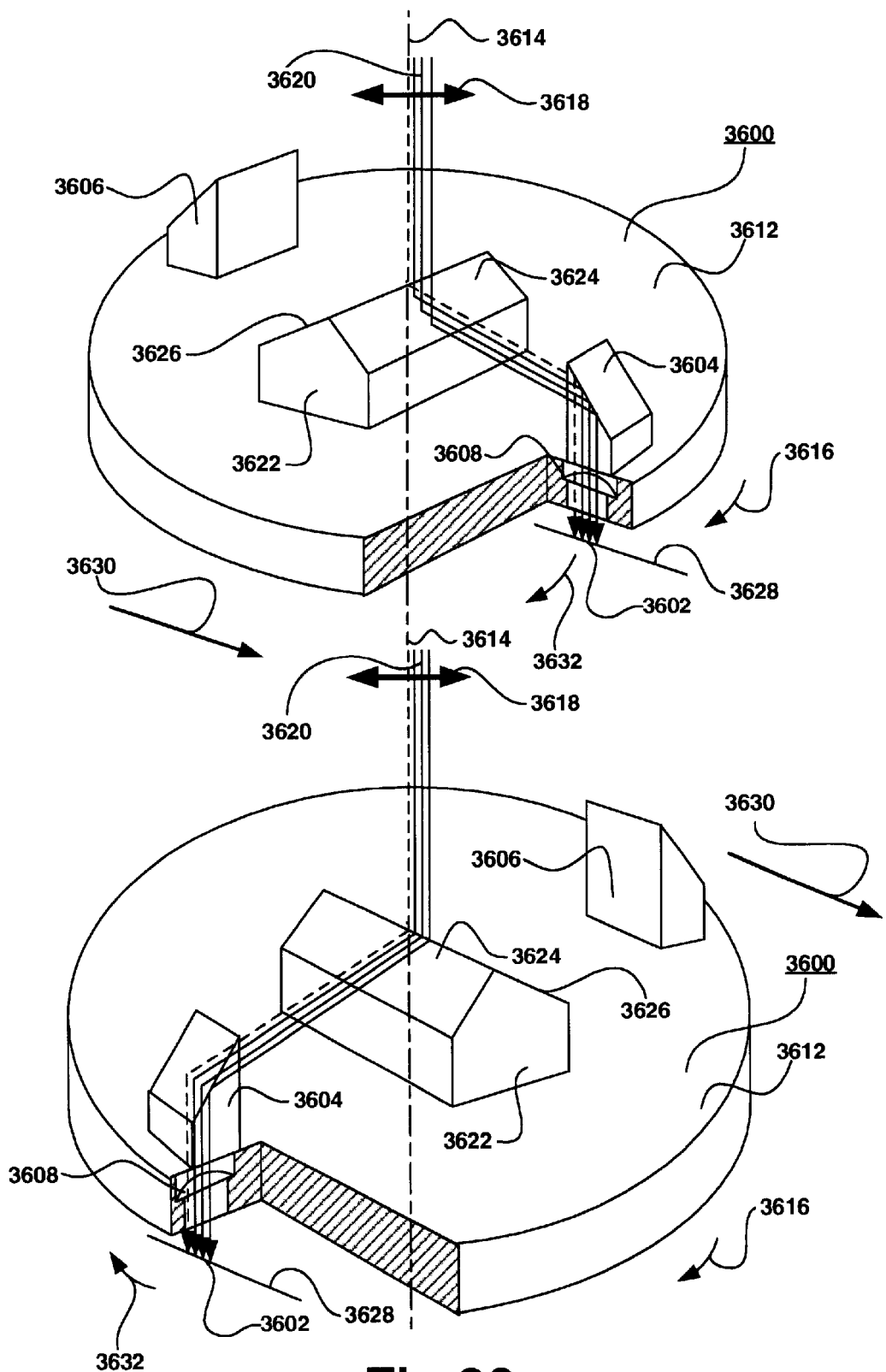

FIG. 30 is an illustration of the orientations of the scanning beams as a function of the scan rotation in a planar scan.

Figure 31:
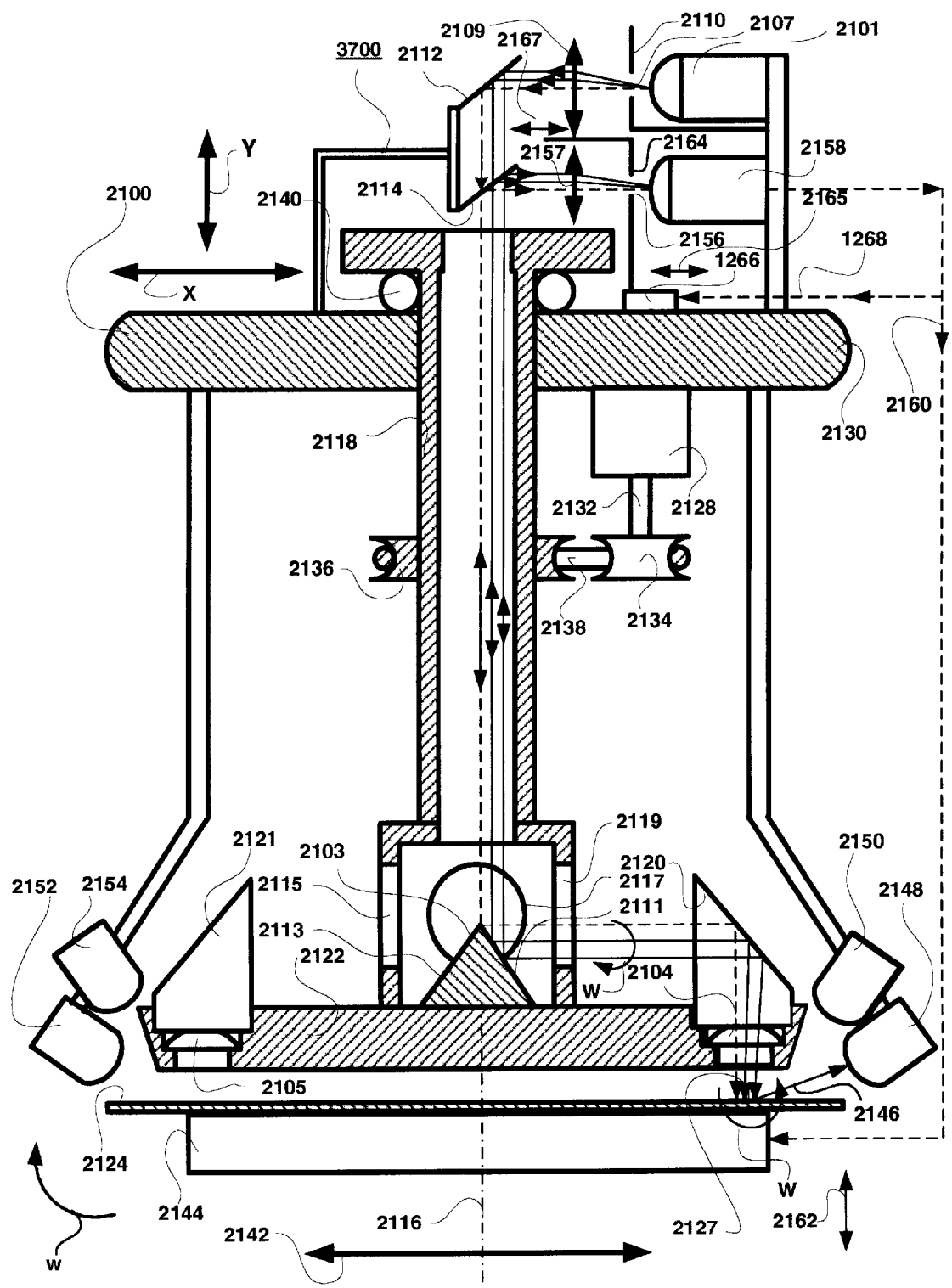

FIG. 31 shows planar scan with multiple beams, according to the invention.

Figure 32:
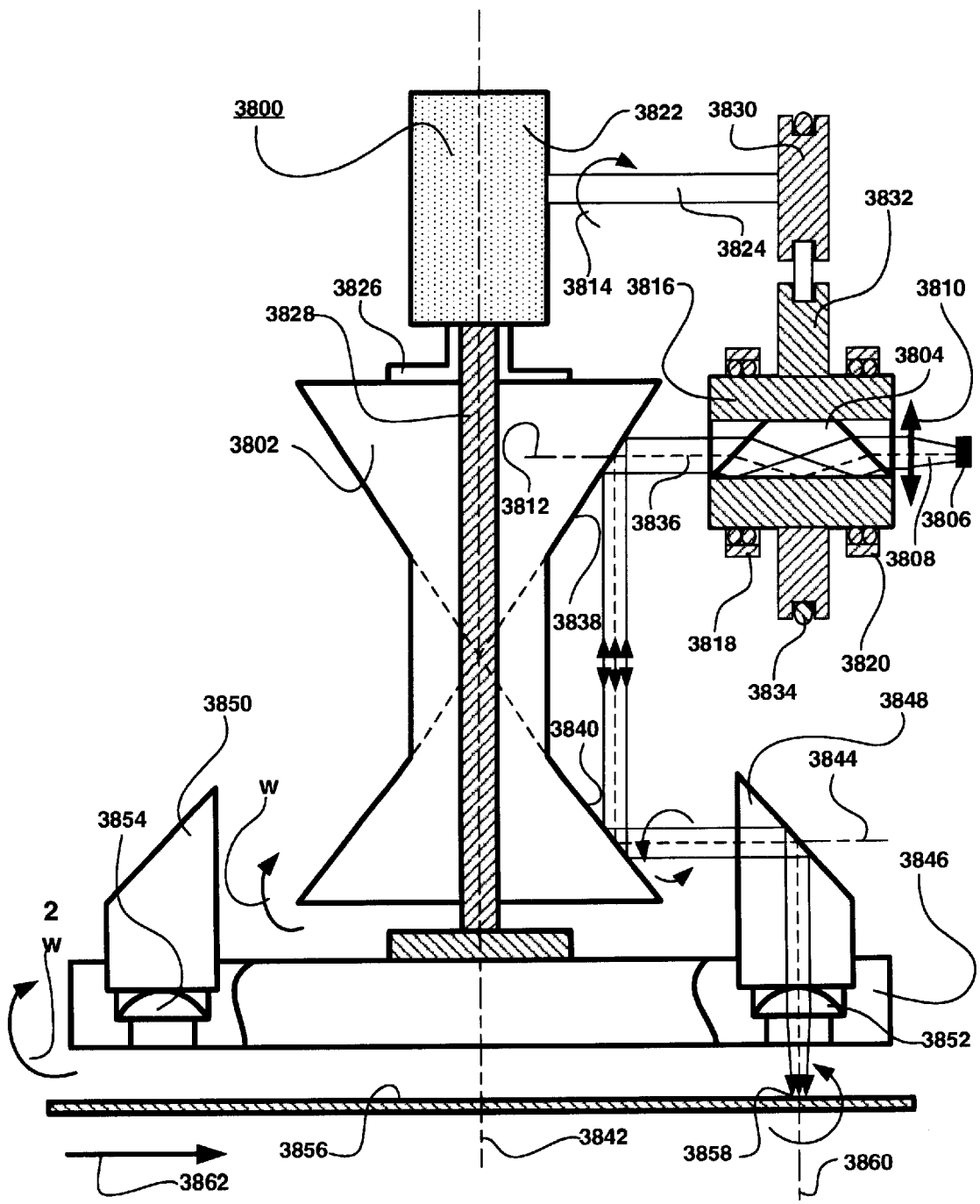

FIG. 32 illustrates additional configuration of a planar scan according to the invention.

Figure 33:
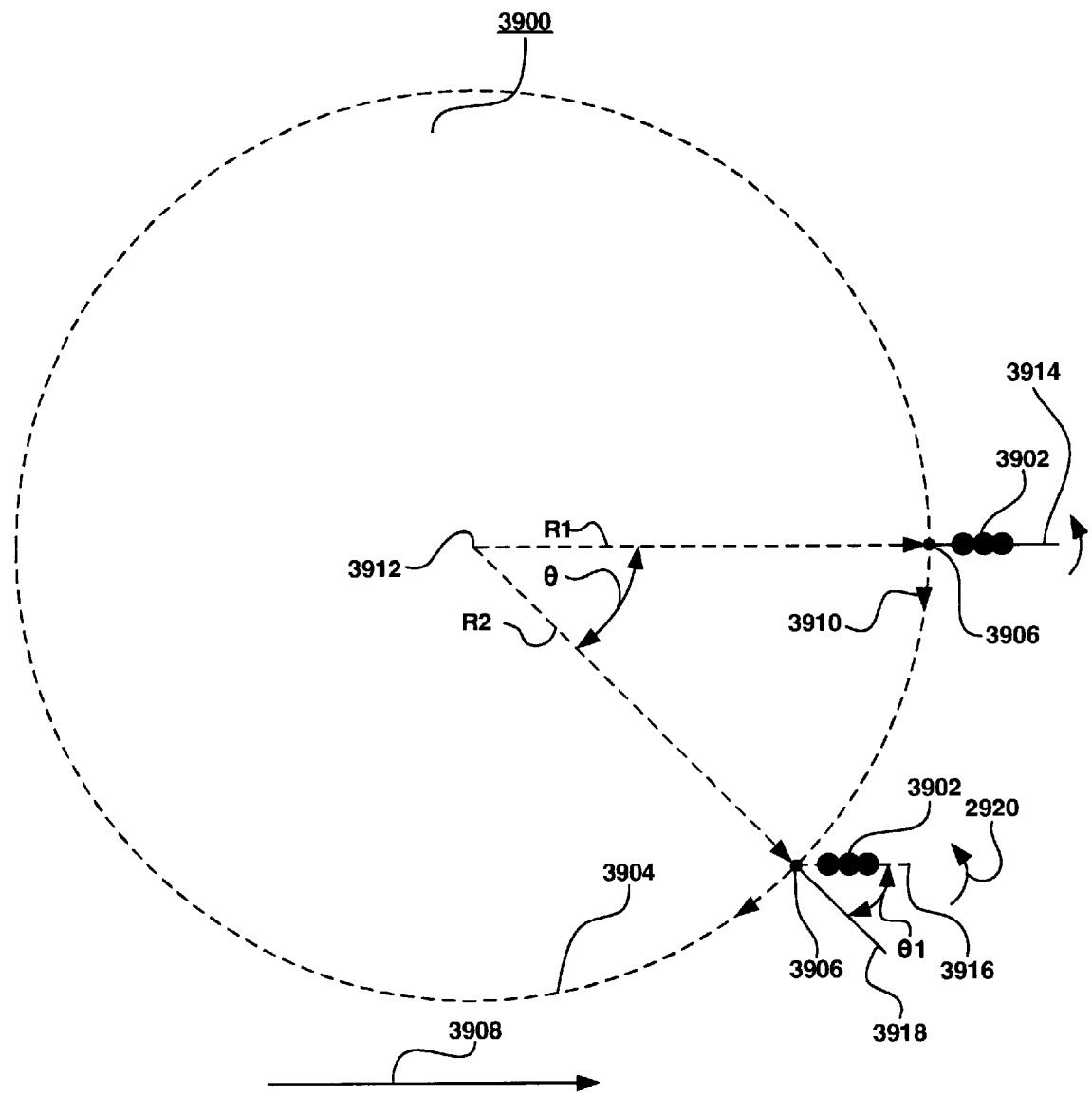

FIG. 33 shows the orientation of the scanning spots of the systems of FIGS. 31 and 32 as a function of the scan rotation.

Figure 34:
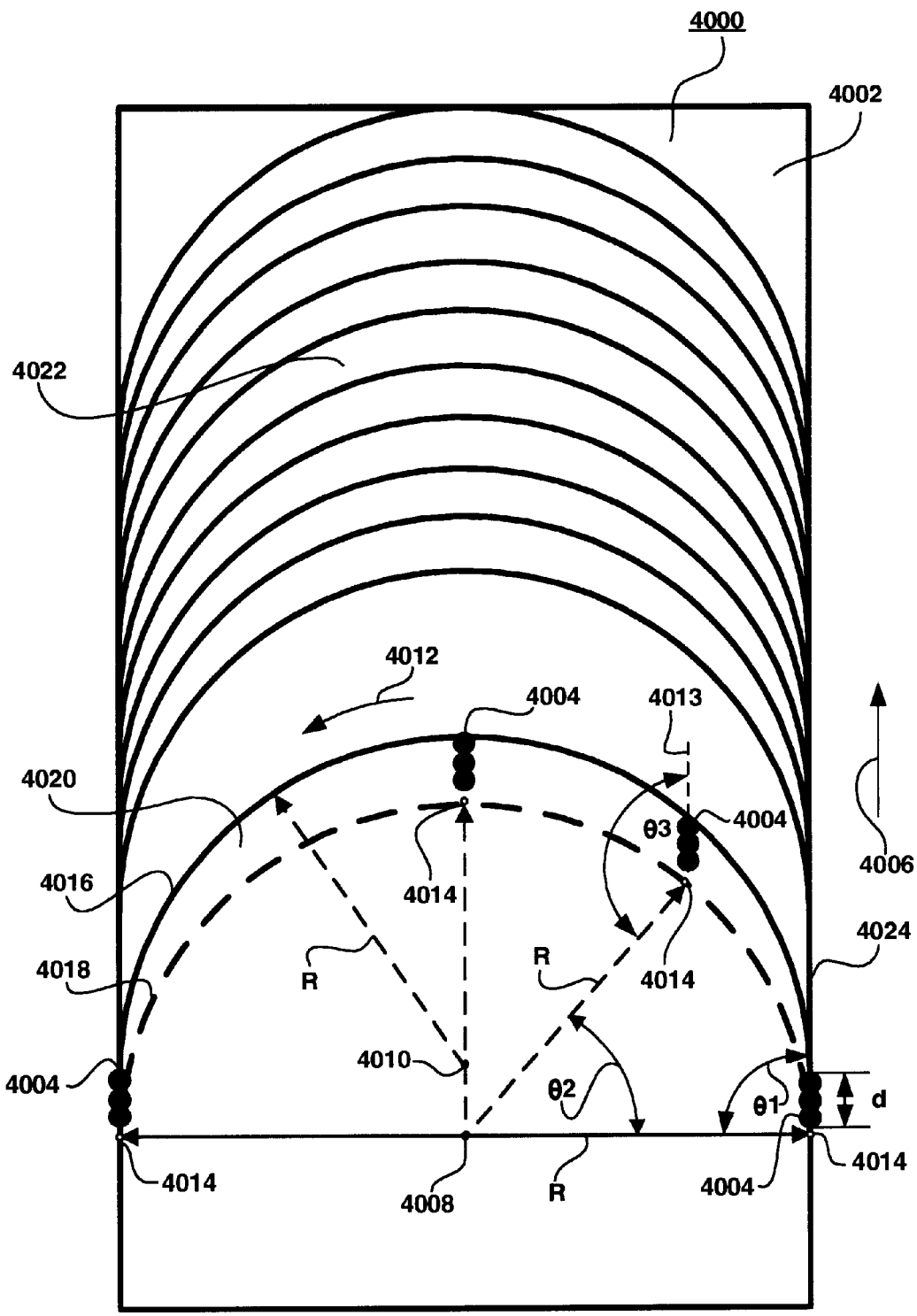

FIG. 34 illustrates another planar scan with multiple beams according to the invention.

Figure 35A:
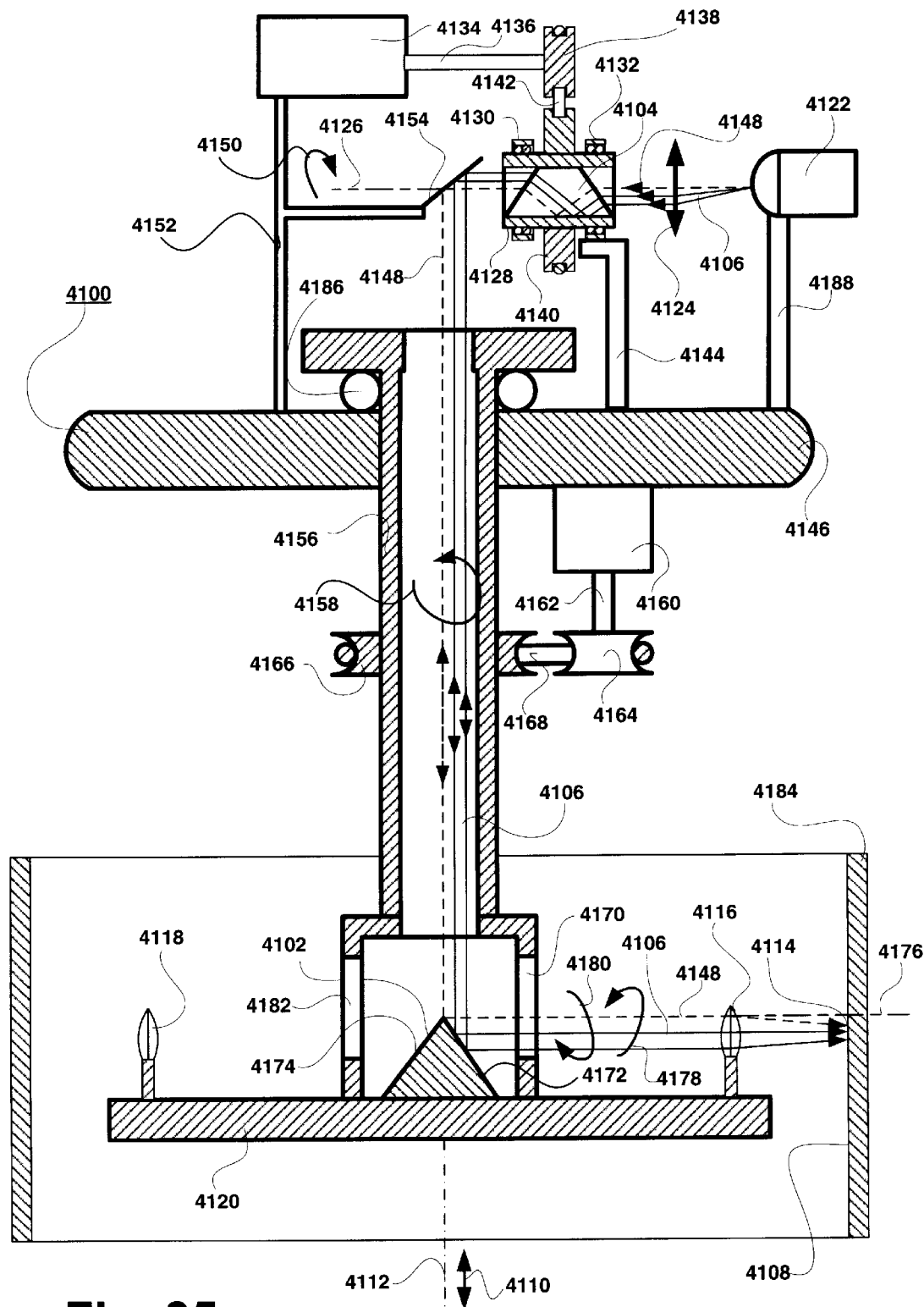
Figure 35B:
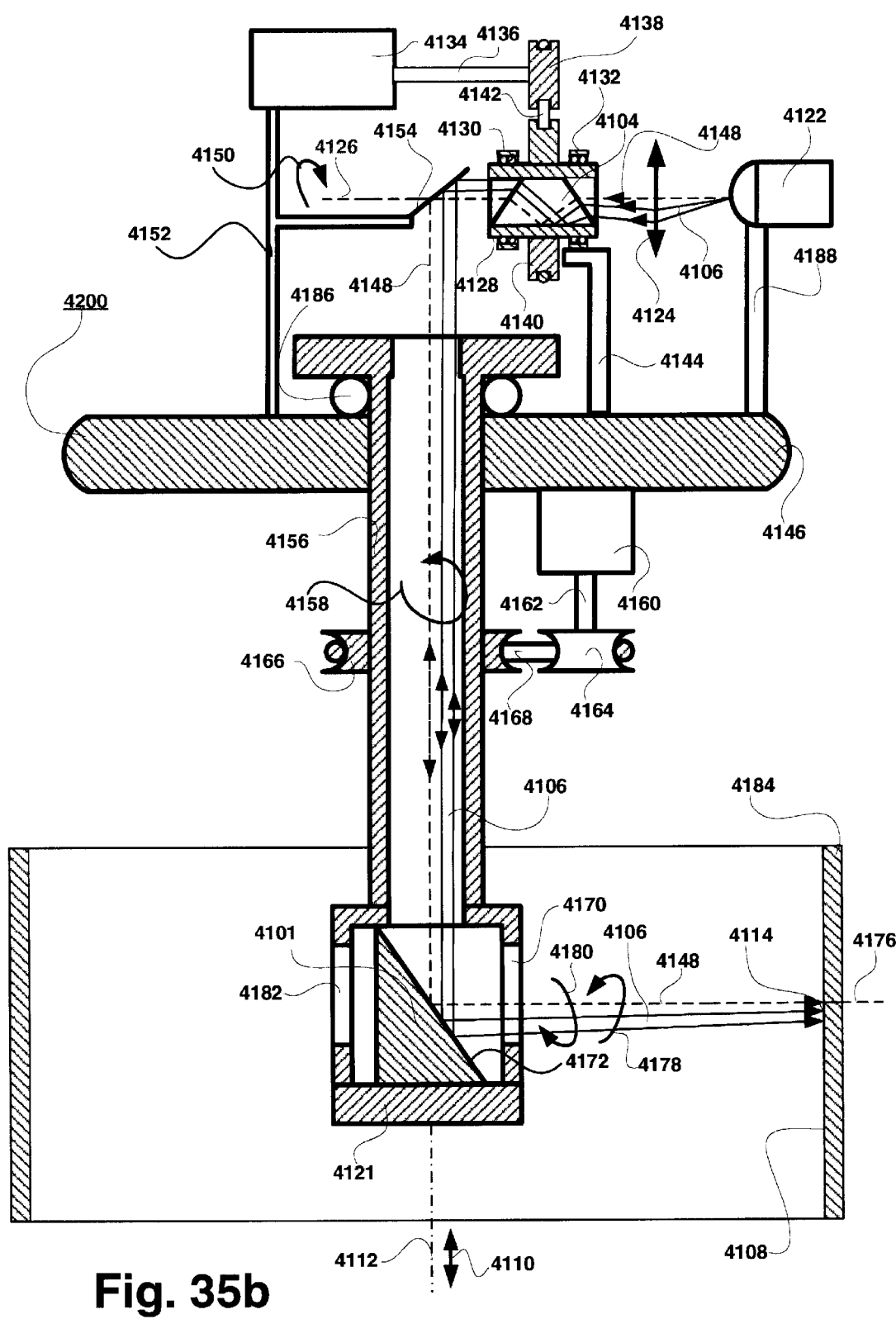

FIGS. 35a and 35b show inner drum scanners, each of which has scan-device system that includes multiple scan devices.

Figure 36:
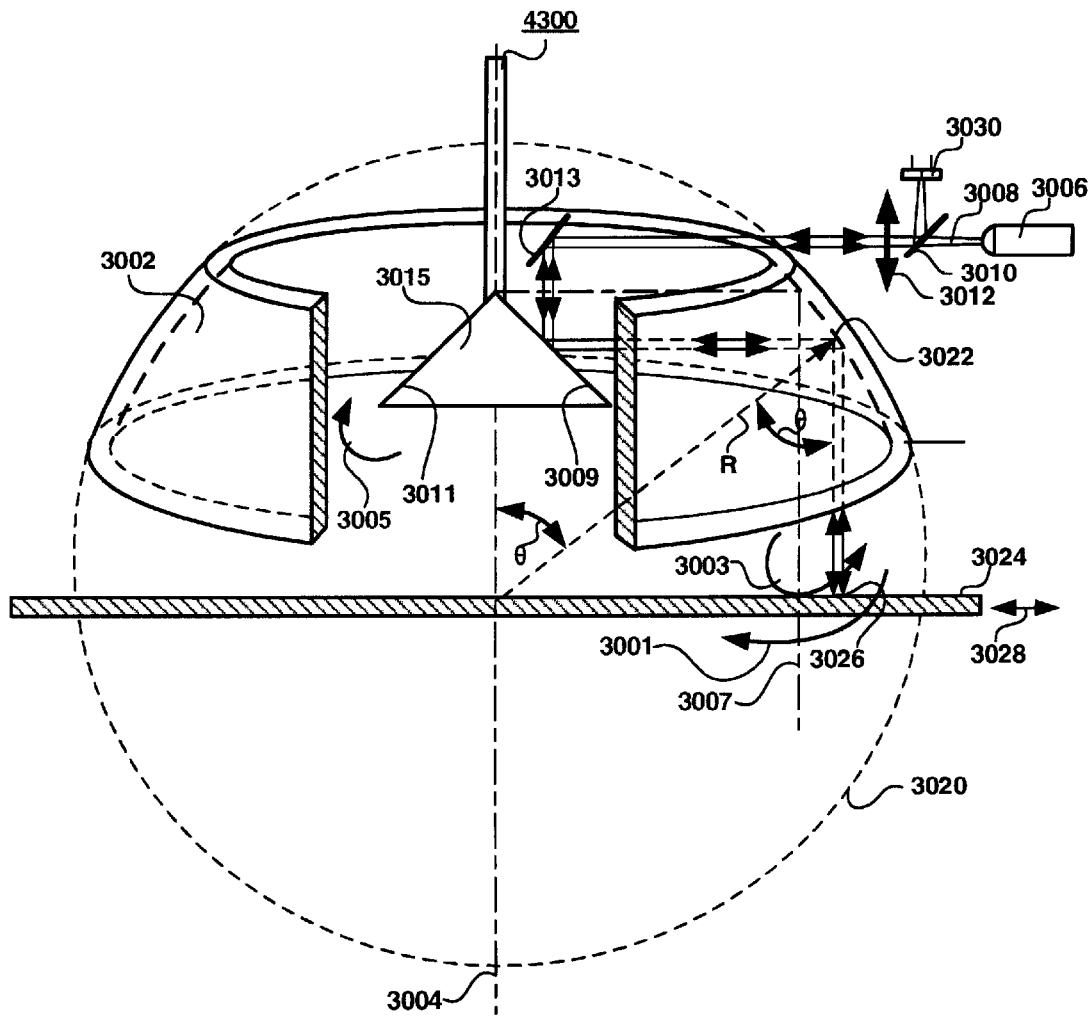

FIG. 36 shows additional scanning systems with a rotatable optical system in the form of a static reflector.

Figure 37:
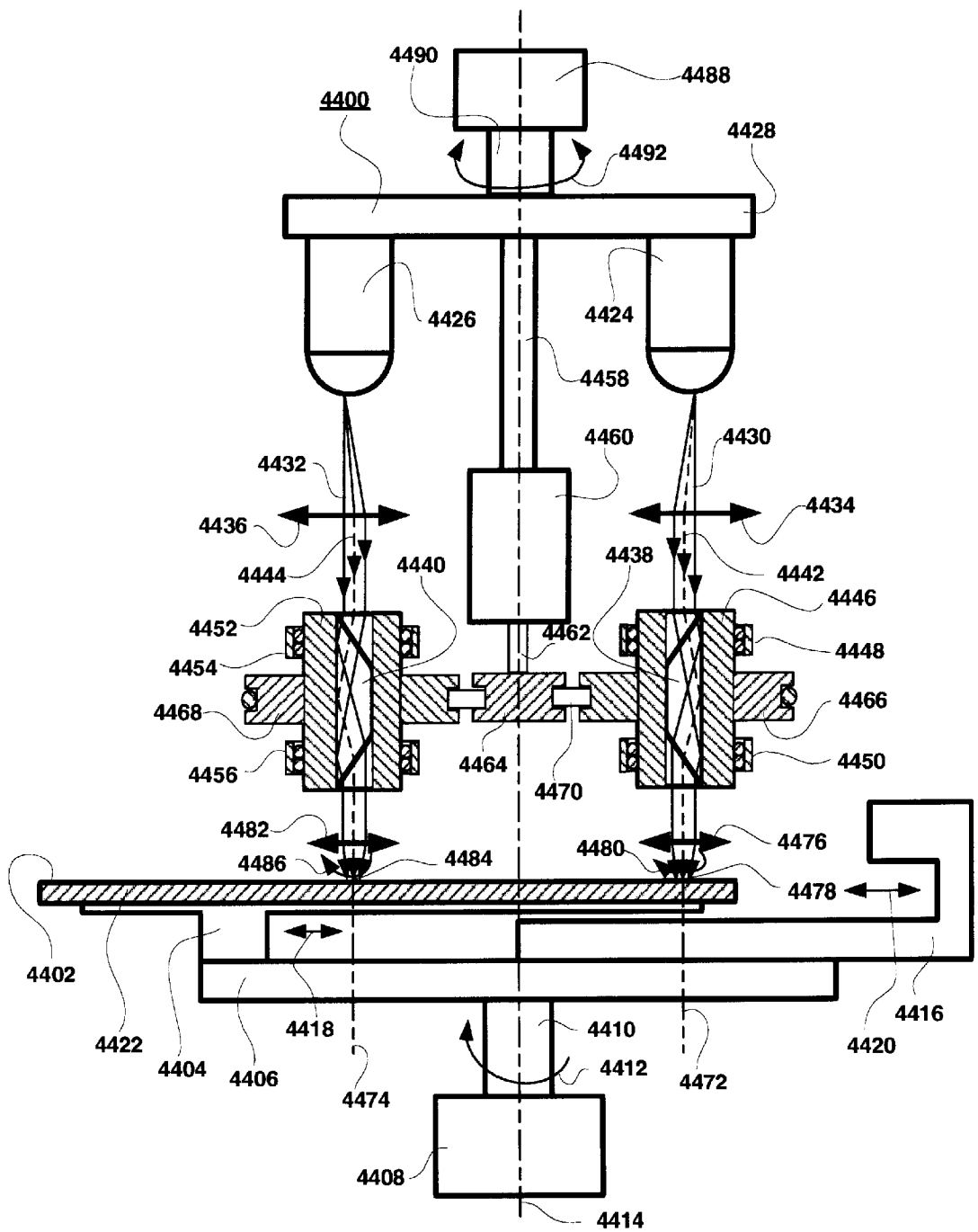

FIG. 37 illustrates an area scan produced by the rotation of the scanned surface.

Figure 38:
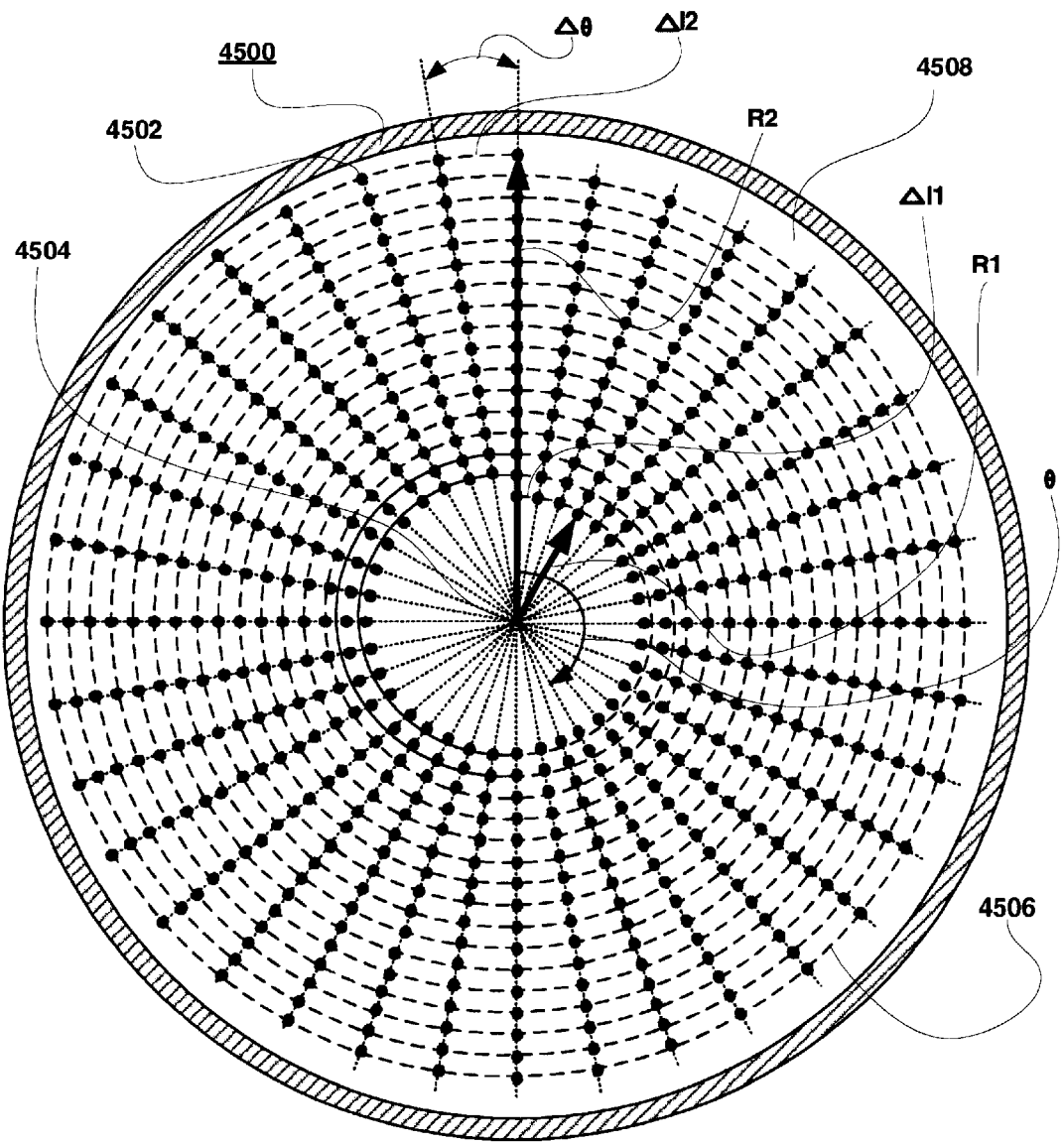

FIG. 38 is a illustration of a prior art conventional laser disk.

Figure 39:
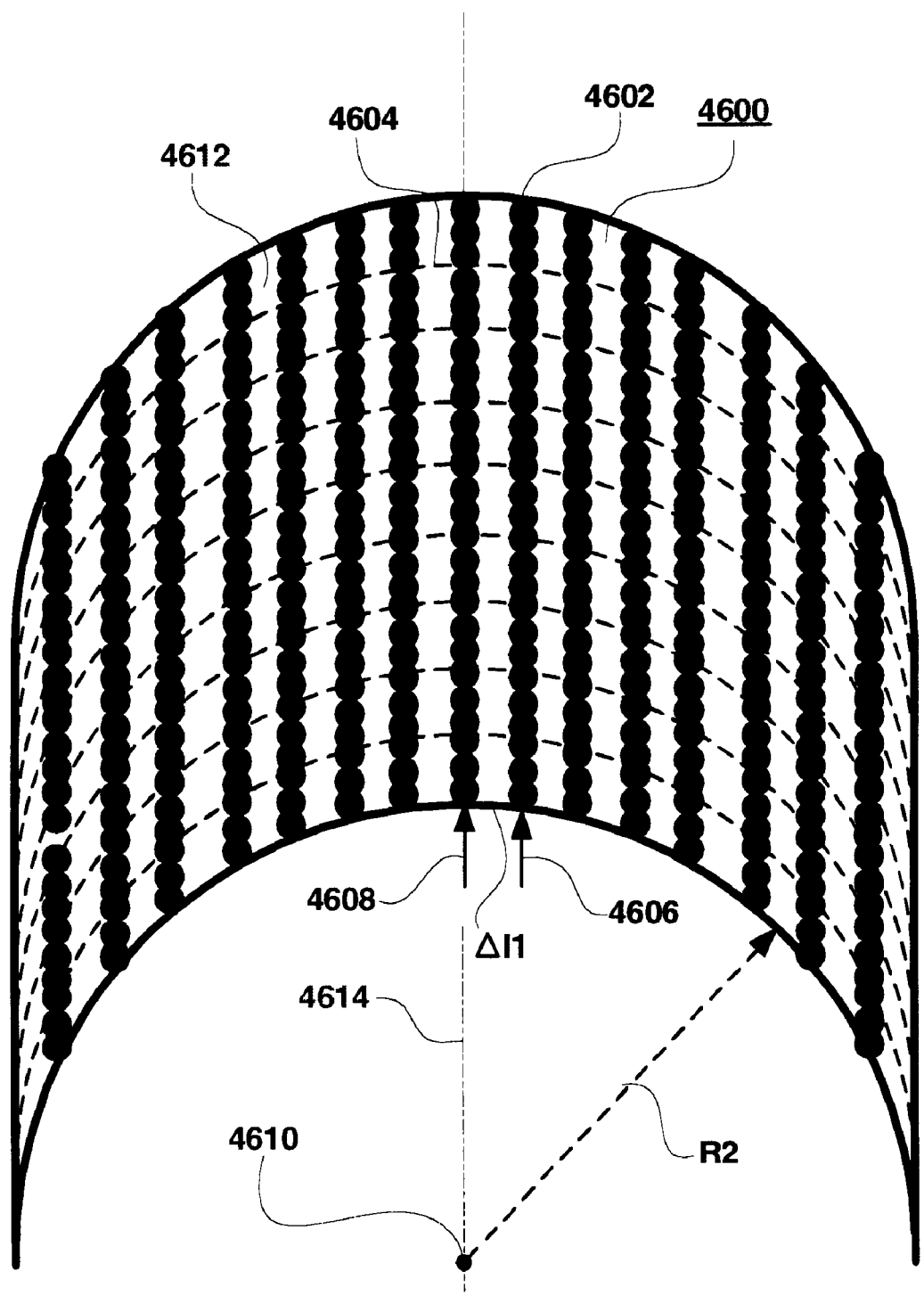

FIG. 39 illustrates an optical storage plate with digital information written on it according to the invention.

SUMMARY

A scan system for writing, plotting, engraving, printing, photolithography includes a plurality of radiation sources, a lens system, an autofocus system, a rotating scan device, a rotating medium support, a rotating scan lens system, and a region. The radiation sources emit at least one radiation beam. The lens system includes at least one lens for receiving and collecting the radiation beam from the radiation source and for converting the beam into a directed beam. A rotating scan device has a rotational axis for receiving the directed beam from the lens of the lens system and for reflecting the directed beam as a rotating scan beam. The latter beam rotates about the rotational axis of the rotating scan device and is directed along lines that pass through its rotational axis. A rotating medium support rotates about the rotational axis of the rotating scan device for carrying the rotating lens system. The lens of the rotating lens system is arranged to receive from the rotating scan device the rotating scan beam with substantially no relative movement between the lens and the beam for producing at least one focusing beam. A region is arranged to receive at least one focused radiation spot formed on it by the focusing beam. The focused radiation spot moves on the region at a rotational velocity equal to the rotational velocity of the rotating lens system and along lines that appear substantially circular and have a center point located on the rotational axis of the rotating scan device. An autofocus system for controlling the distance between the radiation source and the lens of the lens system maintains the size of the focused radiation spot on the scanned region to be minimal all over the scan range. The system has six versions:

(1) The rotating medium support carries the one lens of the rotating lens system in a position such that when the optical axis of the lens of the rotating lens system is directed along lines which pass through the rotational axis of the rotating scan device, the lens directly receives, from the rotating device, the rotating scan beam. In this version the region has a cylinder-like shape.

(2) The rotating medium support carries the lens of the rotating lens system in a position such that when the optical axis of the lens is directed along lines that are parallel to the axis of the rotating scan device, the lens receives, from the scan device, the rotating scan beam. The beam is received either directly or via at least one folding mirror (shifting mirror). In this version the region has a plane-like shape.

(3) A scan system for reading and inspecting includes a region, a rotating medium support, a rotating scan lens system, a rotating scan device, autofocus systems, a lens system, and at least one radiation sink. The design of the system is similar to the design of the above two versions, except for the radiation sources. These are replaced by radiation sinks for the direction of propagation of the beams. The propagation direction of the beams is inverted, so that instead of being from the radiation source to the region (along the optical path as described above) they travel from the region to the radiation sinks via the same optical path.

(4) A scan system for writing and/or reading, inspecting and/or engraving, plotting, and photolithography includes radiation sources, radiation sinks, beam-splitters, a lens system, autofocus systems, a rotating scan device, a rotating medium support, a rotating scan lens system, and a region. This version combines the first two versions with the third version. At least one directed beam that propagates from at least one lens of the lens system passes through at least one beam splitter and continues to propagate toward the region along the same optical path as in the first two versions. At least one radiation beam reflected from the region propagates in the inverted direction toward at least one beam splitter along the optical path of the third version of the invention. From at least one beam splitter the radiation is reflected toward at least one radiation sink and is collected there.

(5) The fifth version is any of the above versions when the single scan device is replaced by a scan-device system that includes multiple scan devices.

(6) The sixth version is any of the above versions when the rotating optical system is replaced by a rotatable optical system in a static position. The rotatable optical system has at least one component from a group including reflectors and lenses.

In all versions with a region having a cylinder-like shape an area scan is produced by introducing relative movement between the scan system and the region and along or parallel to the rotational axis. Also where a region has a plane-like shape an area scan is produced by introducing relative movement between the scan system and the region and along the region. Alternatively an area scan can be achieved by introducing additional movement to at least one lens of the rotating scan lens system and along the radial direction of the rotational axis of the rotating scan device.

FIGS. 3a, 3b, 3c, and 3d—Properties of Spinning Scan Devices Used in Systems

FIGS. 3a, 3b, 3c, and 3d illustrate spinning and scan-devices; some of their optical properties are used in the present systems.

Figure 1:
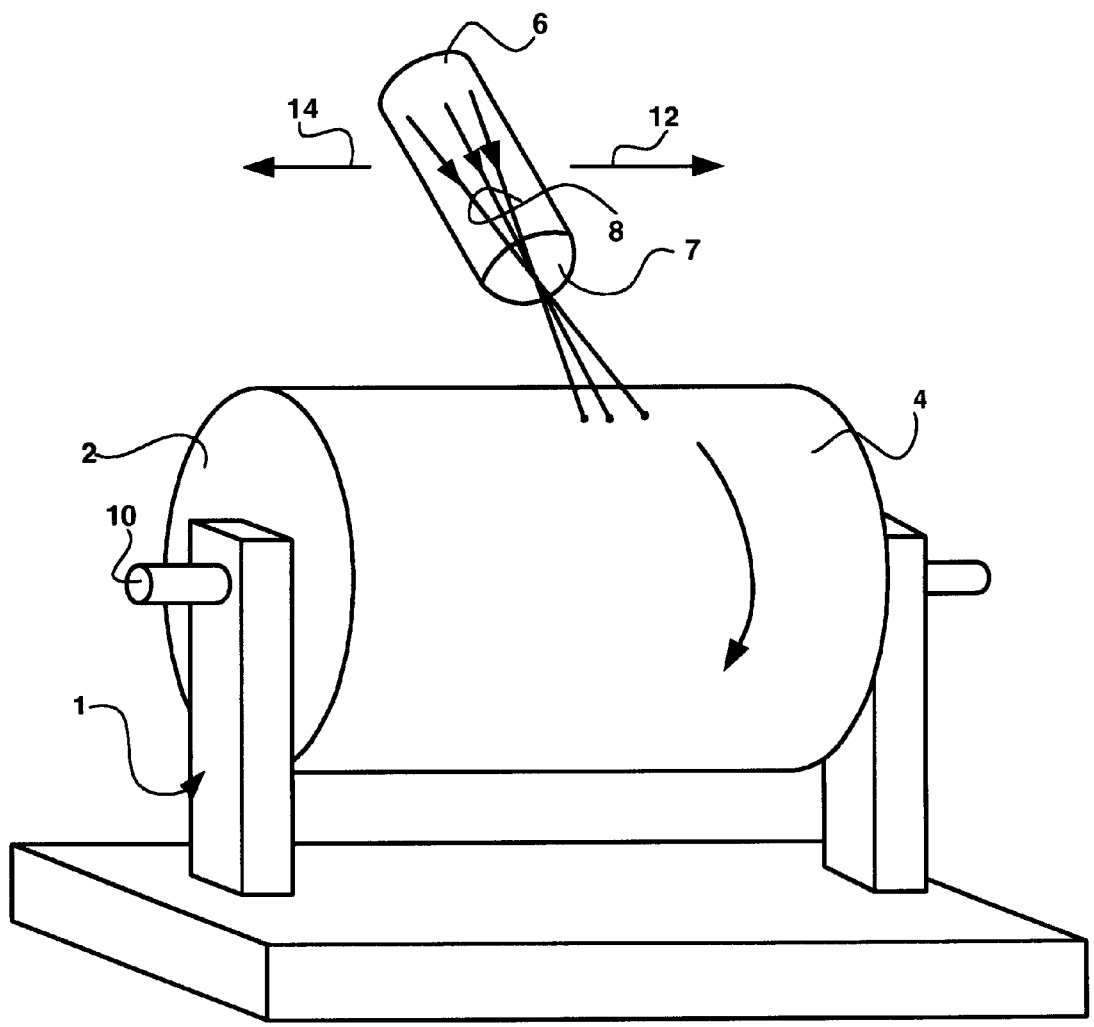
FIG. 1 illustrates a prior-art external scan system.
Figure 2:
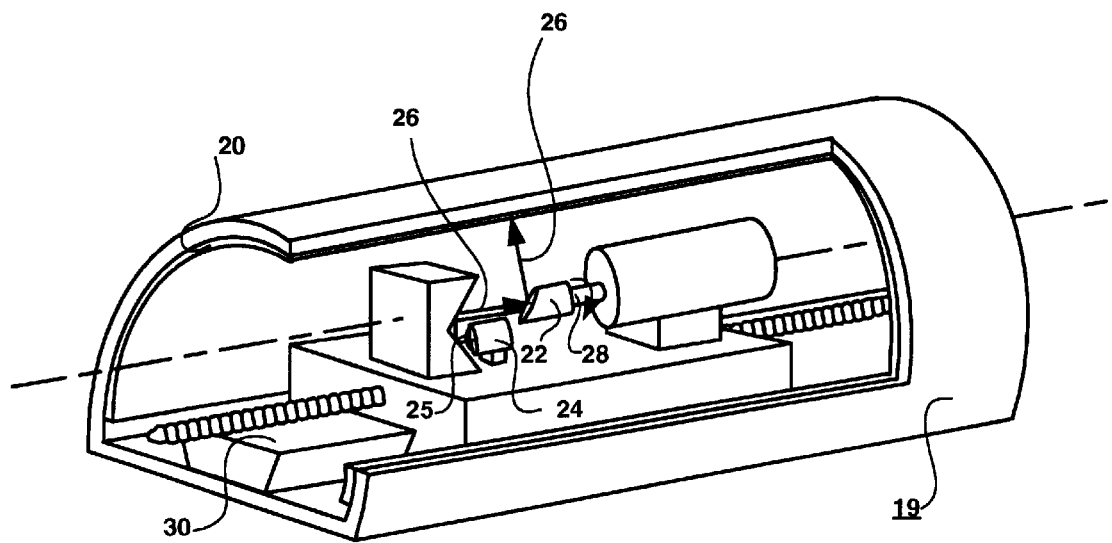
FIG. 2 illustrates a prior-art internal drum scan system.
Figure 3A:
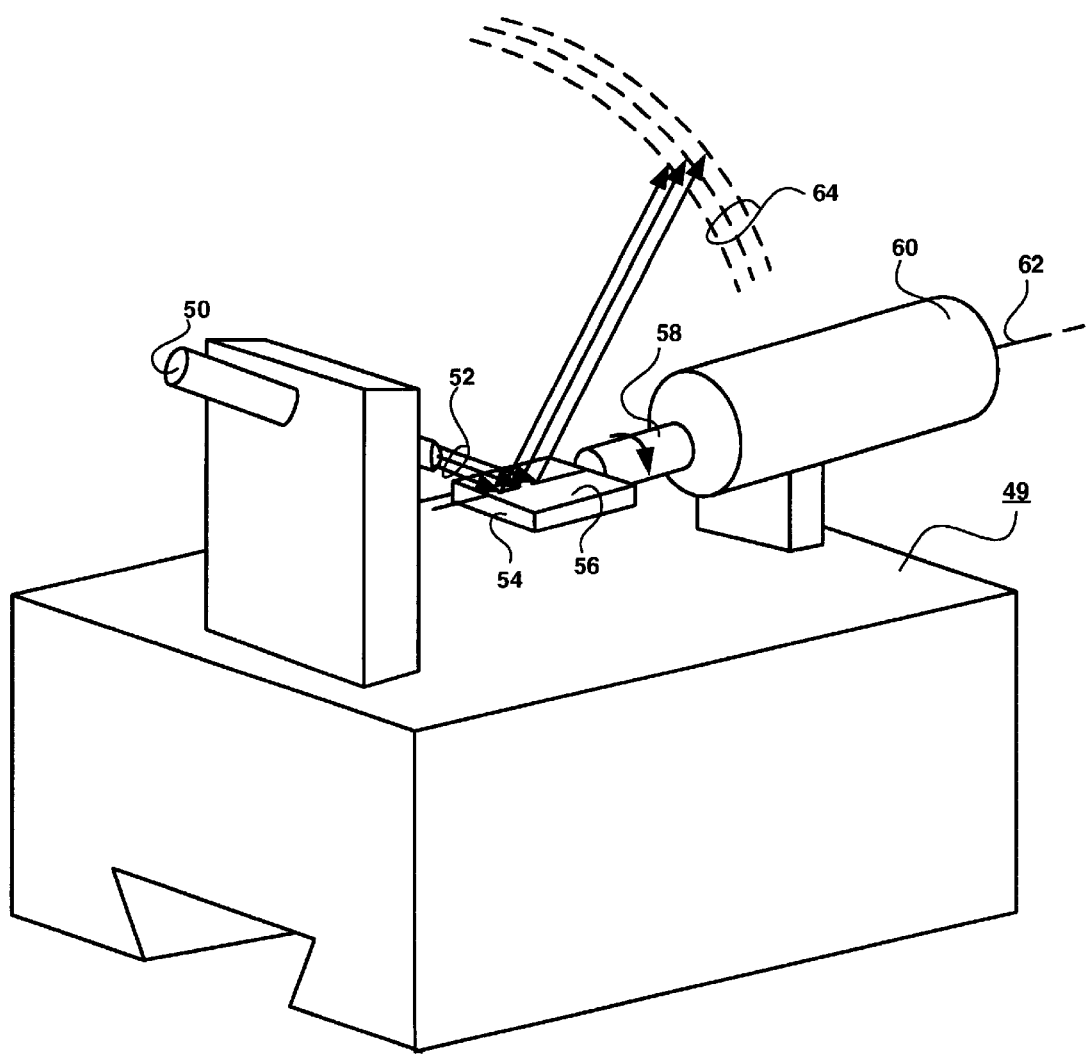

FIG. 3a illustrates a spinning and scan device 49 that can scan using multiple beams where each of the scanned beams is aligned over the entire scan range along a rotating line that passes through the rotational axis of the device. Radiation source 50 emits multiple beams 52 toward spinning flat-mirror 54, which has a reflecting plane 56. Mirror 54 is mounted on axis 58 of motor 60 that spins it. Axis 58 spins around its rotational axis 62. Plane 56 includes rotational axis 62. Beams 52 emitted from head 50 are aligned to axis 62. For any scan position of mirror 54, beams 52 are reflected from surface 56 along lines that pass through axis 62 and are projected along cylindrical lines 64.

Figure 3B:
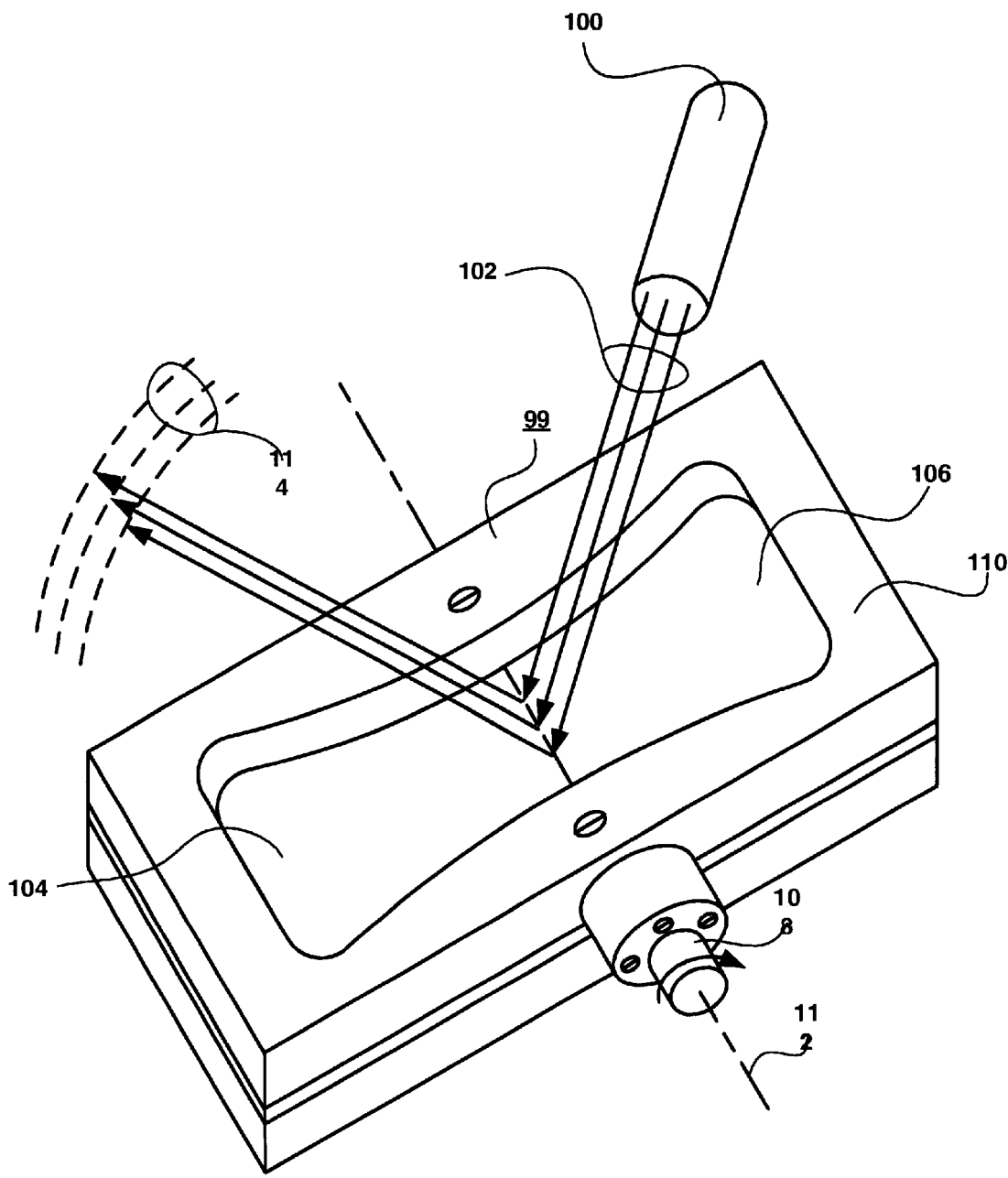

FIG. 3b illustrates another spinning and scan device 99 that can scan multiple beams when each beam is aligned over the entire scan range along a rotating line that passes through the rotational axis of the device. Radiation source 100 emits multiple beams 102 toward a spinning flat-foil 104 having two reflecting planes: plane 106 on its front side and an additional reflecting plane on its backside (not shown). Foil 104 is mounted in holding frame 110, which is attached to rotational axis 108. Axis 112 spins around its rotational axis 112. For a good approximation, since foil 104 is very thin, it can be assumed that both of its planes, front and back, contain rotational axis 112 to which beams 102 emitted from head 100 are aligned.

For any scan position of foil 104, beams 102 are reflected from both front and back surfaces along lines that pass through axis 112 and are projected along cylindrical lines 114. In principle spinning and scan device 99 of FIG. 3b is superior to device 49 of FIG. 3a since it has the advantage of two scan surfaces. On the other hand, device 99 is not as practical since it is not easily produced and its foil suffers from vibrations during a scan.

Figure 3C:
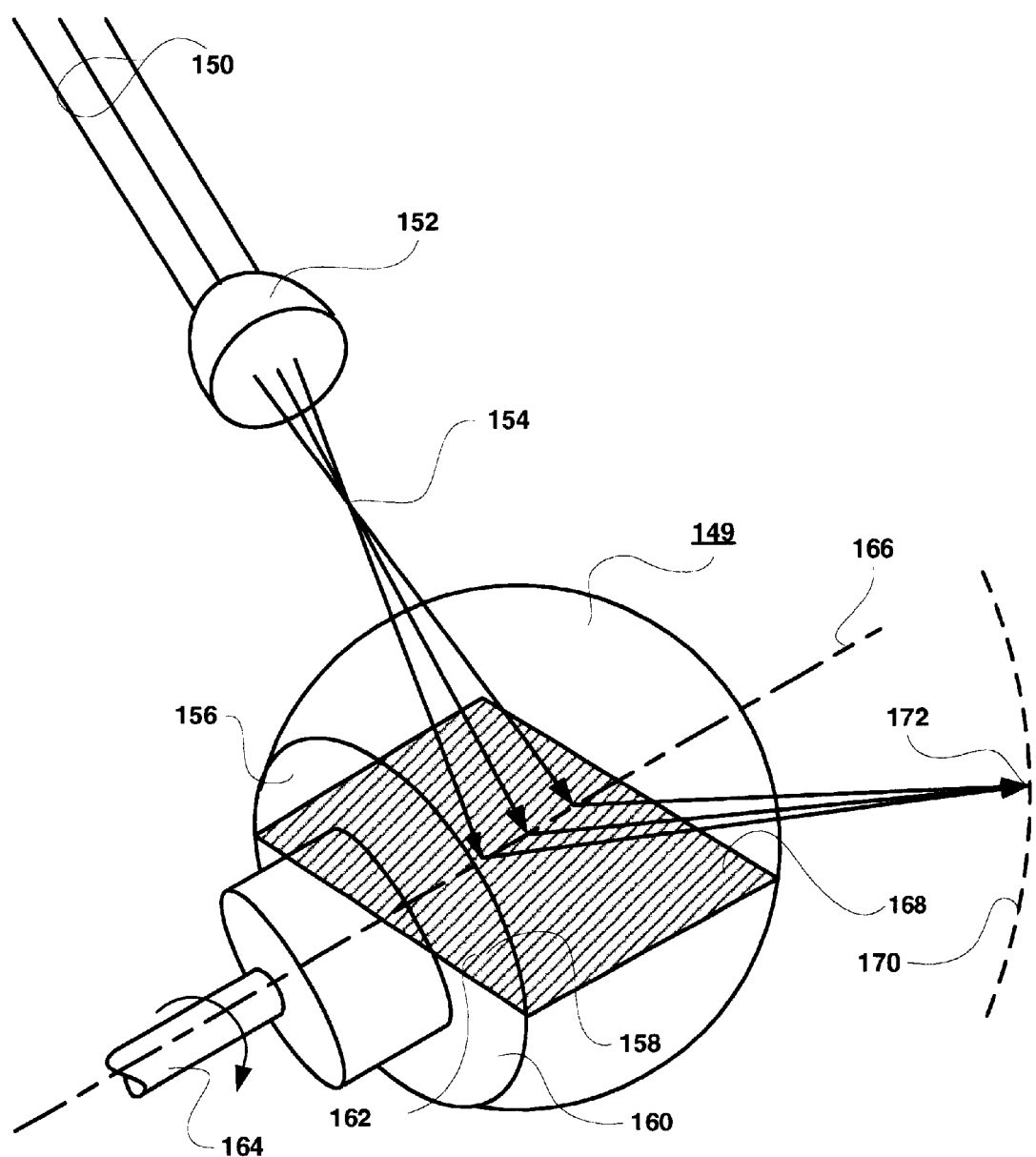

FIG. 3c illustrates a spinning and scan device 149, similar to device 99 of FIG. 3b, that can be produced more readily. Its reflecting surfaces do not suffer from vibrations. Though device 149 can scan multiple beams when each of the beams is aligned over the entire scan range along a rotating line that passes through the rotational axis of the device, only a single beam is shown. Collimated beam 150 is focused by lens 152 into radiation spot 154. From spot 154, beam 150 continues to propagate toward spinning sphere 156. Sphere 156 consists of two half-spheres 158 and 160. One of them is coated on its flat surface with a thin reflecting layer 162 and is bonded to the other half-sphere with a strong transparent glue. Rotating axle 164 is attached to sphere 156 and spins it.

Axle 164 spins around its rotational axis 166. For a good approximation, since layer 162 is very thin, it can be assumed that both of its planes, front plane 168 and its back plane (not shown) contain rotational axis 166 to which beam 150 is aligned. For any scan position of layer 162, beam 150 is reflected from both front and back surfaces along a rotating line that passes through axis 166 and is projected during the scan along cylindrical line 170. In addition to scan layer 162, sphere 156 also acts as spherical lens that transmits image focusing spot 154 to radiation spot 172 on line 170.

Figure 3D:
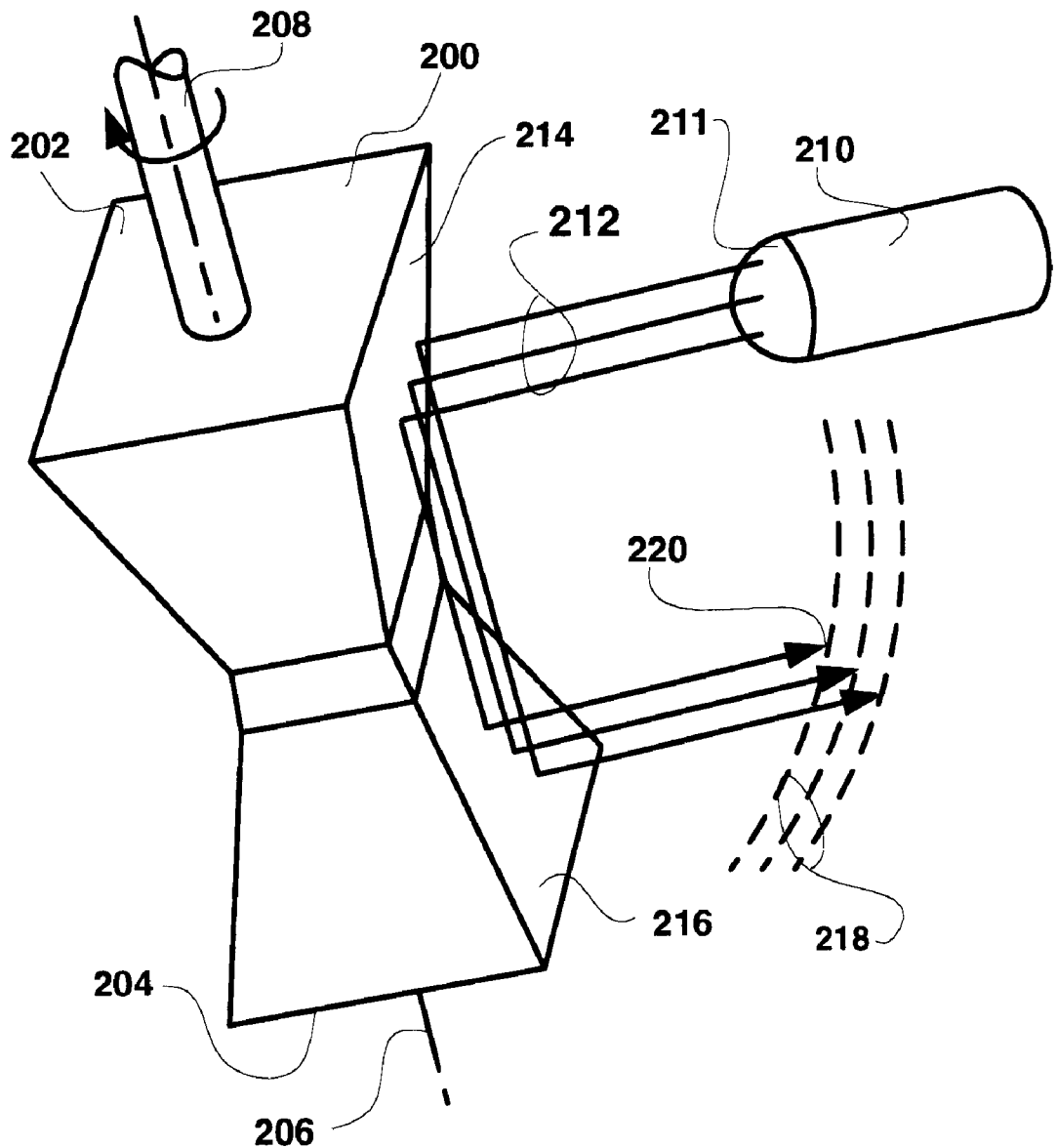

FIG. 3d illustrates a spinning and scan device 200 designed according to the above '438 patent. Device 200 includes upper polygonal mirrors 202 and lower polygonal mirrors 204. Both polygons 202 and 204 have tilted reflecting facets. All of the planes that contain these tilted facets intersect on a line or a point located on rotational axis 206.

Each pair of tilted facets, such as facets 214 and 216 of polygons 202 and 204, are oriented at right angles to each other and create a retro-reflector. This retro-reflector behaves effectively like a mirror. Its reflecting surface includes rotational axis 206 with an additional vertical displacement along rotational axis 206. Device 200 has an axis 208 that spins with device 200 around rotational axis 206. Head 210 has a focusing lens 211 and emits multiple beams 212 oriented toward rotational axis 206 and toward facet 214 of polygon 202 in device 200. Beams 212 are reflected out of device 202 along rotating lines, each of which passes through rotational axis 206 and scans focused spots 220 along cylindrical lines 218. Device 200 has the advantage that any number of scan sides can be used; it is not limited to two sides. Also device 202 does not suffer from the unwanted phenomena of wobble and jitter.

The important property of all the spinning and scan devices of FIGS. 3a to 3d is their ability to produce an accurate scan of multiple beams along circular lines at a rotational speed that is precisely twice the rotational speed of these devices. Alternatively it is possible to use these devices with multiple beams for producing accurate tracking of objects moving along circular lines at precisely twice the rotational speed of the device. The most attractive device is the one of FIG. 3d due to its large number of sides, which allows the device to produce a periodic scan with a high repetition rate. As widely discussed and explained in the above '438 patent, it is impossible to accurately scan or track along circular lines using a conventional polygon due to its off-axis facets.

Some of the following descriptions, explanations, and their accompanied drawings may refer to and illustrate one of the devices. These are given as examples only and any specific scan device may represent any of the devices illustrated in FIGS. 2 and 3a to 3d with their description.

FIG. 4—High-Resolution Internal Cylindrical Scanning—First Embodiment

FIG. 4 illustrates an internal drum scanner according to the invention. Scanner 300 has a radiation source 302 that emits multiple radiation beams 304 toward folding mirror 306. Mirror 306 receives beams 304 from source 302 and directs them toward spinning and scan device 308. Facet 310 of device 308 receives beams 304 from mirror 306 and reflects them toward facet 312 of device 308. From facet 312 beams 304 are reflected out of device 308. Beams 304 are oriented along lines that pass through rotational axis 314. Motor 316 has two spinning concentric axes 318 and 320. Device 308 is attached to outer axis 318. Inner axis 320 passes through axis 318 and device 308 (without touching) and is attached to rotating support 322, which carries lenses 324 and 326. Motor 316 spins axis 318 with device 308 mounted on it at a first rotational speed $\omega 1$ and spins axis 320 with support 322 mounted on it at a rotational speed $\omega 2$ that is twice rotational speed $\omega 1$. Axis 318, axis 320, device 308, and support 322 all spin around common rotational axis 314.

While device 308 spins at the first rotational speed $\omega 1$, beams 304 reflected from device 308 spin around axis 314 at twice the rotational speed $\omega 2$, where $\omega 2 = 2 \cdot \omega 1$. Beams 304 reflected from device 308 are oriented toward lens 324 mounted on support 322 and spin with support 322 at the double rotational speed. Since both lens 324 and beams 304 rotate and spin at the same speed, they have no relative movement between them. Accordingly beams 304 track lens 324 while both of them are in motion. Lens 324 focuses beams 304 into multiple radiation spots 328 onto surface 330. Lenses 324 and 326 are located close to surface 330 and thus have short focal lengths. In this situation lenses 324 and 326 can have an f number close to 1 and can be diffraction-limited quality for producing a very high scan resolution.

Surface 330 can be made from a flexible material to be inserted into drum 332 for providing a cylindrical shape. Along surface 330 the distance between lenses 324 and 326 is maintained fixed all over the scan range. Thus the conditions of focusing of beams 304 by lenses 324 and 326 on surface 330 are also maintained fixed all over the scan range. Surface 330 can be used for engraving, as is usually done with aluminum plates. For example, surface 330 can also be made from film coated with a light-sensitive material, as usually done in the pre-printing industry. This film is photographically developed to convert it into a projecting mask. This mask is used in photolithography to expose an aluminum plate for converting it into a printing plate by post etching. The plate is inked and pressed by the printing machine to produce the desired printing.

Device 308 has, for example, four sides. Each of the sides contains a pair of facets, like facets 310 and 312. Since the double rotational speed of spinning beams 304 is twice the rotational speed of device 308, it is clear that the rotational scan angle of beams 304 is twice the rotational scan angle of device 308. Beams 304 track lenses 324 and 326 which also rotate at $\omega 2 = 2 \cdot \omega 1$ and thus also have a rotational scan angle that is twice the rotational scan angle of device 308. Accordingly if the device has M sides, each side has a rotational scan angle that is equal to 360/M degrees. This corresponds the corresponding rotating scan lenses, which each have a rotational scan angle 2*360/M. This means that for an M-sided device, only M/2 scan lenses are required.

In the example of FIG. 4 device 308 has four sides and thus rotating support 322 has only two (4/2) lenses, lens 324 and lens 326. The rotational scan angle of each side of device 308 is 90 degrees and the corresponding rotational scan angle of lenses 324 and 326 is 180 degrees and is equal to the rotational angle of half the cylindrical shape in which surface 330 is set. The periodical rotational scan of each side of the sides of device 308 is 90 degrees. During this scan, beams 304 track one lens out of the group of lenses 324 and 326 along a rotational angle of 180 degrees. This means that two opposite sides of device 308 will always be related to the tracking of lens 324 and the other two opposite sides of device 308 will always be related to the tracking of lens 326.

For producing an area scan, all optical parts of the scanner should have relative movement with respect to surface 330 and along or parallel to axis 314. Such relative movement can be produced by either moving the optical parts when surface 330 is static or by moving surface 330 when the optical parts are static. A mechanical system for moving the optical components along and parallel to axis 314 includes motor 334 mounted on base plate 336 that spins guiding screw 338. Spinning screw 338 passes through mounting base 340 that carries motor 316 and causes base 340 to slide on guiding rail 342 parallel to axis 314. Arm 344 is attached to motor 316 and carries mounting bar 346 that supports source 302. Motor 316 also carries base 348, which has a mounting arm 350 that carries mirror 306. Accordingly, it can be seen that base 340 actually carries all the components of the optical system. Thus when base 340 slides along rail 342, it introduces a movement in the direction of axis 314. This movement adds to scan spots 328 that move on surface 330 along circular lines, an additional linear movement parallel to the direction of axis 314. The combination of the movements of spots 328 on surface 330, i.e., the circular movement around axis 314 with the linear movement parallel to axis 314, produces a screw-shaped scan of surface 330 by spots 328.

Surface 330 may represent any scanned surface having a cylindrical or a portion of a cylindrical shape. It especially may represent flexible surfaces that can be bent to fit the shape of guiding drum 332. Surface 330 can be an aluminum plate to be used in a Computer To Plate (CTP) scanner or plotter used in a direct writing process for the preparation of printing plates. Such plates are used as printing masks in prepress applications. (In prepress applications printing plates are inked and pressed onto a printed surface during the printing process.)

While FIG. 4 shows a writing, printing, or engraving system, such a system can be operated as a reading, inspecting, or viewing system. When replacing radiation source 302 with a radiation sink, the propagation of the radiation beams is inverted. Rotating lenses 324 and 326 collect multiple beams from their fields of view that they form and move on surface 300 and direct them to spinning device 308 that reflects them at a fixed orientation toward mirror 306. From mirror 306 the beams propagate toward the radiation sink and are collected there.

The system of FIG. 4 demonstrates a major principle of the invention that enables scans to be produced with ultra-high resolution, limited only by the diffraction limit of rotational lenses 324 and 326. In general, when using a rotational lens which is quality-of-diffraction limited, the scan resolution d (also known as an Arry disk) is given by:

$$d = 1.22 \lambda f / D$$

In the above equation $\lambda$ is the radiation wavelength, f is the focal length of the rotational lens, and D is the size of the radiation spot projected on the rotational lens by the scan beam reflected out from the scan device. Accordingly the resolution is improved with the decrease of f and with the increase of D.

The system of FIG. 4 includes a post-focusing technique i.e., a technique in which the focusing of scan beams 304 is done after their reflection from scan device 308. Due to the post focussing technique, the focal length f of rotational lenses 324 and 326 should be equal only to the distance between these lenses and the scanned region and thus it can be selected to be as small as desired. The maximum size of D is equal to f/F where F is the f-number of rotational lenses 324 and 326.

The best scan resolution is achieved when the sizes of the radiation spots on rotational lenses 324 and 326 is equal to the maximum size of D. In this case the sizes of the radiation spots is equal to the entire useable size of these lenses. In this arrangement, a proper operation of the system shown in FIG. 4 must assure that scan beams 304 track rotational lenses 324 and 326 very accurately without any translation between them. It is necessary to avoid such translation in order to maintain, over the entire scan range, a situation in which the useable area of rotational lenses 324 and 326 completely includes the radiation spots projected by scan beams 304 toward these lenses.

The combination of the tracking system with post focussing illustrated in FIG. 4 has a major advantage over known scan systems. This is the ability to maintain diffraction-limited resolution over an unlimited scan range. The scan range depends only on the rotational radius of the rotating lens and can be chosen to be as large as desired without any limitation on the scan range or the resolution. On the contrary, in other known scan systems that have a static scan lens, the scan range increases with the focal length f of the scan lens. Increasing the length f causes degradation in the scan resolution. This means that, unlike the system shown in FIG. 4 that can maintain a diffraction-limited resolution over any desired scan range, other known scan systems suffer from resolution degradation with an increase of the scan range.

The post-focussing technique has the additional important advantage of using a short focal length f which reduces unwanted scan deviations caused by production tolerances of the scan device. These tolerances have strong negative effects, especially when the scan device has multiple scan sides. In this case each side of the scan device may reflect the scan beam at a different angle. In such a situation when the reflection-angle deviation is $\delta\phi$, then the scan deviation is $\delta\phi \cdot R$ when R is the scan radius. In the present scan system, the scan deviation is $\delta\phi \cdot f$. Since f is much smaller then R, the scan deviations caused by production tolerances of the scan device are smaller by a factor of f/R than the scan deviations in other known scan systems.

The system of FIG. 4 demonstrates the principle of using a post focussing technique with highly accurate tracking of rotational lenses 324 and 326 by scan beams 304, with substantially no translation between them. This principle assures high-resolution scanning over any desired scan range with at least one radiation beam. This advantage is common to all other embodiments described below.

Scanner or plotter 300 exhibits very fast internal scanning due to the use of multiple beams 304 while maintaining very high resolution due to its rotational lenses 324 and 326. The combination of a fast scan at a high resolution enables the scanner to be used in many new fields for many new applications. Some of these applications are reading, inspecting, or viewing very dense information, such as the information written on computer disks, video disks, DVDs, PCBs, or silicon wafers used in the IC industry. Alternatively scanner 300 can be used for writing applications, such as writing very dense information on computer disks, video disks, and DVDs. Scanner 300 can also be used for direct laser beam writing on wafers or for lithographic application on masks used for exposing wafers, such as silicon IC wafers.

FIG. 5—High-Resolution Reading and Writing Using Internal Cylindrical Scan—Second Embodiment FIG. 5 illustrates an internal drum scanner designed according to the invention for high resolution reading and writing. Scanner 400 includes light source 402 that emits multiple beams 404. Beams 404 pass through beam splitter 406 and propagate toward focusing lens 408, which converts them into focusing beams. From lens 408 focusing beams 404 continues to propagate toward mirror 410 that reflects them toward spinning and scan device 412. Device 412 consists of multiple devices 414, 416, and 418 connected in a row. Each of them has a similar structure and a similar mode of operation as device 308 of FIG. 4.

Beams 404 hit device 414 and are reflected out of device 414 as spinning scan beams 404. Motor 420 spins two concentric axes 422 and 424. Outer axis 422 is attached to device 412 and spins it at angular velocity ω1. Inner axis 424 passes through axis 422 and device 412 without touching them. Motor 420 spins axis 424 at rotational speed ω2=2·ω1. Frame 426 supports axis 424 by hole 428 and supports axis 422 by hole 430. Axis 424 spins lens support 432 at rotational speed ω2 and thus scan beams 404 track lenses 434 and 436 that are mounted on lens support 432. Lenses 434 and 436 are close to cylinder 438 and have large numerical aperture and thus produce a scan with high resolution by focusing beams 404 into small radiation spots 440 on the surface of cylinder 438. Axis 422, axis 424 device 412, lens support 432, lens 434, and lens 436 all spin and rotate around rotational axis 478.

Radiation spots 440 can be used for writing on surface 438 or for illuminating surface 438 at high intensity for reading purposes. When using the scan system for illuminating the desired region to be read, lenses 434 and 436 collect the multiple radiation beams reflected from surface 438 as beams 442. Beams 442 propagate in a direction opposite to the direction along which illuminating beams 404 propagated before, but along the same optical path. Accordingly beams 442 continues to propagate via spinning device 414 and from there along a fixed orientation via mirror 410 and lens 408 toward splitter 406. Beams 442 are reflected from splitter 404 toward radiation sink 444 via splitter 406.

Splitter 446 splits each of beams 442 in conventional fashion so that one part of each beam passes through splitter 446 and another part is reflected. The reflected parts travel toward autofocus system 448. The parts of beams 442 that pass through splitter 446 are lost in the system and are not used in scan applications. Autofocus system 448 can be of the type described in U.S. Pat. No. 5,298,976 to A. Shahar and N. Schwartz, entitled "Method And Apparatus For Measuring Surface Distance From A Reference Plane", Mar. 29, 1994. Autofocus 448 measures the deviations from the optimal conditions of the focusing conditions of spots 440 on surface 438. These measurements of system 448 produce a controlling signal that is fed to motor 450 by leads 452. The controlling signal produced in system 448 controls motor 450. Motor 450 in turn moves mounting base 456 along the directions indicated by arrows 462. Base 456 carries supporting arm 458 to which lens 408 is connected by bar 460.

The controlling signal causes lens 408 to move into a position in which the focus conditions are optimal. Motor 420 is attached to frame 426 by tube 464 and is connected to bar 468 by rod 470. Bar 468 carries radiation source 402 and beam splitter 406 by arm 472, lens 408 by mounting base 456, autofocus system by box 474, radiation sink 444 by box 474 and beam splitter 446 by box 474, which are all attached to bar 468. Accordingly frame 426 actually carries all the optical components of the system. When frame 426 is moved by screw 476, it moves the whole optical system in the direction of rotational axis 478 for producing an area scan.

Illuminating and reading information from a surface at high resolution with autofocus system control using multiple beams is very attractive. It can replace known systems using computer disks, videodisks, and compact disks. It can be done very fast and the information can be written on at very low cost using materials such as plastic films that are bent into a cylindrical shape. There is no requirement for planarity and the media can be written on very rapidly by engraving using the same scan system. For reading information that consists of tracks and sectors, it is very important to move the scan from one sector to another in a very short time. For shortening the transition time between sectors, the scan can be done over multiple locations, as shown by additional groups of multiple beams 480 and 482 that are a duplication of beams 404. Beams 480 and 482 produce focused radiation spots 484 and 486 on surface 438, respectively, and thus reduce the transition time between scanned sectors and sectors to be scanned.

Surface 438 may represent any surface that can be bent into a cylindrical shape or a portion of a cylinder. IBM has recently announced new displays and electronic circuits that are partly made of organic materials and are very flexible. Such displays and circuits are very attractive for inspection and photolithographic purposes, as in the system of FIG. 5, because they can provide a very fast scan at a very high resolution, as needed in the IC industry.

In some applications planar scanning is important. Known scan systems for high resolution (diffraction limited) cannot scan wide ranges for the reasons explained below and as illustrated in the following FIGS. 6 and 7.

FIG. 6—Planar Scan System—Prior Art

FIG. 6 illustrates a prior-art system 499 for planar scanning. Radiation source 500 emits beams 502 and 504 toward a rotating conventional polygon 506. Polygon 506 reflects beams 502 and 504 out of its facet 508 and toward focusing lens 510 that focuses beams 502 and 504 into scan spots 512 and 514. Spots 512 and 514 move along lines 516 and 518, respectively. The scan range of spots 512 and 514 depends upon the focal length of lens 510. For achieving scan with high resolution the focal length of the lens has to be short. A short focal length provides a narrow scan range.

FIG. 7—Planar Scan System with Fiber Optics—Prior Art

FIG. 7 illustrates a prior-art system 600 for planar scanning designed according to the above '483 patent. System 600 includes a radiation source 602 that emits multiple beams 604 toward rotating polygon 606. Polygon 606 reflects beams 604 from its orthogonal facets 608 and 610 toward bundle of optical fibers 612. The receiving side of bundle 612 is arranged in a cylindrical shape 614 for collecting beams 604. Bundle 612 guides beams 604 to its other side where beams 604 are emitted onto a planar region 616. The output of bundle 612 is arranged along a line that can be very wide for producing wide scan range. On the other hand system 600 has a limited resolution that is dictated by the resolution that can be achieved by bundle 612.

FIG. 8—High-Resolution Reading and Writing Using Planar Scan—Third Embodiment

FIG. 8 shows scanner 700 for planar scanning designed according to the invention. Scanner 700 includes motor 702 having two concentric axes 704 and 706. Motor 702 spins outer axis 704 at rotational speed ω1. Outer axis 704 is attached to polygonal mirrors 708 and thus spins it at the same speed ω1. Inner axis 706 passes through outer axis 704 and polygon 708 without touching them. Motor 702 spins inner axis 706 at rotational speed ω2=2·ω1. Axis 706 is attached to cylinder 710 that is attached to circular plate 712 and thus spins both of them at rotational speed ω2. Motor 714 has two concentric axes 716 and 718. Outer axis 716 is attached to plate 720 and carries it. Plate 720 carries plate 722 having scanned surface 724.

Two axial screws 726 and 728 pass through tube 710 and are attached to wheels 730 and 732, respectively. When wheel 734 is static and tube 710 rotates with axis 706 and plate 712 at rotational speed ω2 it causes wheels 730 and 732 to roll on wheel 734. Rolling wheels 730 and 732 cause screws 726 and 728, respectively, to spin. Screws 726 and 728 pass through transparent bars 736 and 738 via holes having internal screws 740 and 742, respectively. When screws 726 and 728 spin they cause both bars 736 and 738 to move along guiding groves 744 and 746 in plate 712 in the direction along which their rotational radius R is increased. When wheel 734 is static, the spinning speed of screws 726 and 728, and thus the moving speed of bars 736 and 738, are all proportional to rotational speed $\omega 2$ of tube 710.

For controlling the spinning speed of screws 726 and 728 and thus controlling the moving speed of bars 736 and 738, wheel 734 may also be spun by motor 714 at a spinning speed $\omega 3$. As long as $\omega 3 < \omega 2$ and is at the same direction as $\omega 2$, it reduces the spinning speed of screws 726 and 728 and thus reduces the moving speed of bars 736 and 738. When $\omega 3 > \omega 2$ it inverts the spinning speed of screws 726 and 728 and thus also inverts the moving speed of bars 736 and 738. Similarly when $\omega 3$ has a direction opposite to the direction of $\omega 2$ it increases the rotational speeds of screws 726 and 728 and thus the moving speed of bars 736 and 738. Accordingly it is clear that the moving speed of bars 736 and 738 can be controlled by the speed and direction of $\omega 3$. This control allows the speed of bars 736 and 738 from being in the range between zero and high speed at any direction. I.e., both of them move inward (in the direction where R is decreased) along arrows 750 and 752 or both of them move outward (in the direction where R is increased) along arrows 748 and 754.

Light source 756 emits multiple beams 758 that are converted by lens 760 into collimated or quasi-collimated beams 762 that pass through beam splitter 761. Beams 762 hit rotating polygon 708 at its facet 764 and are reflected toward facet 766 which further reflects them out of the polygon as rotating collimated (or quasi-collimated) beams 768. Beams 768 rotate at angular velocity $\omega 2$ in which transparent bars 770 and 772 rotate also with their supporting plate 712. As explained before, beams 768 track bar 770 where they are reflected out from polygon 708 by one of its opposite facets 766 or 774. Beams 768 track bar 770 or bar 772 where they are reflected out from polygon 708 by one of its opposite facets 776 or 778. Transparent bar 770 is shown in cross section, but for the simplicity of the drawing no dashed line are shown.

Transparent bars 770 and 772 are attached to plate 712 and are made from material such as glass, quartz, or plastic and include two internal mirrors 780 and 782 and 784 and 786, respectively. These internal mirrors may be fabricated by the same technique used to produce a cubic beam splitter, i.e., evaporating a reflecting surface on transparent material, and bonding it with transparent glue to a complementary surface of another transparent material. Beams 768 are reflected twice by internal mirrors 780 and 782 of bar 770 and continue to propagate as collimated (or quasi-collimated) beams 788. (Or the beams can be reflected by mirrors 784 and 786 of bar 772 corresponding to another rotational position of polygon 708 when beams 768 are reflected by facet 776 or facet 778.)

Beams 788 are reflected as beams 794 by internal mirror 790 or internal mirror 792 of transparent bars 736 or 738, respectively. Lens 796 is mounted within bar 736 and is arranged to receive collimated (or quasi-collimated) beams 794 for focussing them into small radiation spots 798 on scanned surface 724. When plate 720 (supporting plate 722 with its surface 724) is in a static position, spots 798 scan planar surface 724 along lines 800 at rotational speed $\omega 2$.

Motor 714 can spin plate 720 at rotational speed $\omega 4$ by its outer axis 716 and thus surface 724 also rotates at angular velocity $\omega 4$. Accordingly the rotational speed of the planar scanning on surface 724 is equal to the relative speed between $\omega 2$ and $\omega 4$.

Axis 704, axis 706, polygon 708, tube 710 plate 712, surface 724 of plate 722, plate 720, axis 716, and axis 718 all spin around rotational axis 816.

The description above relates to scanner 700 operating as writing system. Scanner 700 can also be operated as reading system when collecting the radiation beams reflected from surface 724 by rotating lens 796 that scans this surface. When reading, rotating lens 796 converts the radiation collected from surface 724 into collimated (or quasi-collimated) beams that propagate along the same optical path as in the writing situation, but in the opposite direction. I.e., they propagate from rotating lens 796 to static beam splitter 761 via rotating mirrors 790, 782, 780, rotating polygon 708, and from there in a fixed orientation to beam splitter 761. From beam splitter 761 inverted beams 762 are reflected as beams 802 passing through beam splitter 803 and are collected by multiple detectors 804 for reading the information from surface 724. Scanner 700 can be used also for illuminating and reading by combining the two modes of operation, the writing mode for illuminating the surface and the reading mode for reading the illuminated surface. Collimated beams 762 have a small tilt angle relative to each other and thus beams 794 have the same relative tilt angle. This angle causes beams 794 to be focused by lens 796 into several separate radiation spots onto surface 724. For achieving optimal focussing conditions, lens 796 of bar 736 and the corresponding lens of bar 738 (not shown) are separated from surface 724 by a distance known as the Working Distance (WD) that is equal to their Focal Length (FL). For maintaining the WD equal to the FL over the entire scan range parts of beams 802 which are actually collected from surface 724 are directed by splitter 803 toward lens 806, which focuses them inside autofocus system 808. Autofocus system 808 measures the deviation between the WD and the FL. Depending on this deviation, it moves arm 810 along arrows 812. This causes lens 760 to move in the direction of arrows 814 into a position that causes the image of radiation source 756 on surface 724 to appear in optimal focus.

The additional movement of rotating bar 736 along arrows 748 and 752, or the additional movement of rotating bar 738 along arrows 750 and 754, converts the circular line scan of surface 724 into area scan.

The above additional movements of bars 736 and 738 also cause their mirrors 790 and 792 to move and to change the length of the optical path between radiation source 756 and surface 724. These changes do not affect the focus conditions of lens 796 (and corresponding lens 797 of bar 738) since these changes occur in the region where the radiation beams are collimated or quasi-collimated. For such beams the optical length along which they propagate has no influence on the focussing conditions. Scanner 700 is useful for scanning various surfaces, such as the surfaces of CDs, computer disks, or videodisks for the purposes of reading, inspecting, writing, or engraving. In a conventional scanner the scan speed, even when using multiple beams, is limited since the optical part of the system is in a static position. In this situation the scan speed is equal to $\omega 4$ and the supporting plate spins surface 724. $\omega 4$ is limited speed and is in a range of relatively low rotational speeds. This limited speed is due mainly to the imperfect balance of the disks having a surface such as surface 724 and is also due to variations between the disks. The unbalanced disks cause mechanical vibrations that make the scan impossible at high values of ω4.

Unlike the conventional scanners, scanner 700 has rotating optics which do not change when replacing one disk with another and thus can be balanced permanently for all the disks to be scanned. The almost perfect balance of the rotating optical system (polygon 708, bars 770 and 772, bars 736 and 738, and plate 712) allows it to rotate at a very high speed ω2. This speed is much higher than the rotational speed of the disks in conventional systems. This results in a dramatic improvement in the scan speed. On top of that the disk also can spin along a direction opposite to the rotational direction of the optical system. At ω4 that is equal to the rotational speed used in such conventional systems. Accordingly the scan speed of scanner 700 can be proportional to (ω2+ω4). Cf. conventional systems which spin at ω4 only, where ω2>>ω4. When scanner 700 is used to scan disks, scan lines 800 are actually tracks that may be arranged to contain sectors of information. While scanning the ability to move fast from one sector to another is very important. Such fast transition between sectors can be achieved by controlling rotational speed ω3 of wheel 734 for fast movement of bars 736 and 738 inward or outward between the desired sectors.

Surface 724 may represent any scanned surface, especially a compact disk, a videodisk, a computer disk, or a DVD.

FIG. 9—Circular Scan of Multiple Beams on Planar Surface

FIG. 9 schematically illustrates the scan tracks of a scan system designed according to the invention, such as the system of FIG. 8 but with a capability to scan along a complete circle. An almost complete circle can be scanned by a two-sided polygon or by joining together several arcs into a complete circle when the scan arcs are produced simultaneously by several facets of the rotating polygon (a spinning scan-device).

A scanned surface 900 is scanned along lines (tracks) 902 in a way similar to the way that surface 724 of FIG. 8 is scanned by lines 800. In this example surface 900 is scanned simultaneously along three lines 902, starting at three starting points 904. Each of lines 902 has a cycloid like shape when r1(t1), r2(t1), and r3(t1) are the values or the radii of the scan lines at a time t1. Similarly r1(t2), r2(t2), and r3(t2) are the values of the corresponded radii at t2. Radii r1, r2, and r3 change their sizes linearly with time. Their sizes are changed due to the motion of the focusing lens along the radius of the scanned surface, similar to the illustrated motion of lens 796 along grove 744 of FIG. 8.

The scan position on lines 902 as a function of time is given by the mathematical expressions: $(X)=r0+a\cdot t\cdot \sin(\omega \cdot t)$ and $(Y)=r0+a\cdot t\cdot \sin(\omega \cdot t)$. These are cycloid functions where (X) and (Y) are Cartesian coordinates, r0 is the initial value of the radius where the scan starts, t is time, a is a linear coefficient according to which radius R changes its size with time, and ω is the angular velocity of the scan. The latter is equal to the relative angular velocity between the rotating optics and the scanned surface. The value of coefficient a is such that during a rotation period T, the radius of the scan increases at least by a value equal to the total width d of scan lines 902. Accordingly a is bigger or equal to d/T.

FIG. 10—Planar Scan with Relative Movement Between Rotating Optics and Scanned Surface FIG. 10 is a side view of another version of planar scanning according to the invention. Scanner 1000 of FIG. 10 is similar to that of FIG. 8 but the conversion of a circular line scan into an area scan is done by introducing relative movement between the rotating optics and the scanned surface, instead of moving the focussing lens as shown in FIG. 8. Scanner 1000 includes motor 1002 having two concentric axes, outer axis 1004 and inner axis 1006. Axis 1004, driven by motor 1002, spins four-sided polygon 1008 at rotational speed ω1. Axis 1006 passes through axis 1004 and polygon 1008 is driven by the same motor and spins plate 1010 to which it is attached. It spins at rotational speed ω2. Plate 1010 carries two reflecting prisms 1612 and 1014 and two focussing lenses 1016 and 1018. Axis 1004, axis 1006, polygon 1008, and plate 1010 are all spin around rotational axis 1046.

Radiation source 1020 emits multiple beams 1022 that are converted by lens 1024 into beams 1026 passing through beam splitter 1025 and are directed toward facet 1028 of rotating polygon 1008. From facet 1028 beams 1026 are reflected toward facet 1030 of polygon 1008 and from there they are reflected as rotating scan beams 1032. Scan beams 1032 are oriented toward prism 1012, or toward prism 1014 in another scan position of polygon 1008 when beams 1032 are reflected from another facet of polygon 1008. They have an angular velocity ω2 that is equal to the rotational speed of plate 1010, prisms 1012 and 1014, and focussing lenses 1016 and 1018. Accordingly beams 1032 are reflected from prism 1012 (or from prism 1014) as beams 1034 and are directed toward rotating focussing lens 1016 (or toward focussing lens 1018). They track this lens without relative movement between them and the focussing lens over the entire scan range.

Lens 1016 (or lens 1018) focuses beams 1034 into small radiation spots 1036 onto scanned surface 1038. Spots 1038 move on surface 1038 along circular lines at rotational speed ω2. For converting the line-scan into an area-scan a relative movement is introduced between surface 1038 and rotating lenses 1016 and 1018. This relative movement can be produced by moving surface 1038 along arrows 1040, by moving scan system 1000 along arrows 1042, or by moving both of them along their corresponded arrows 1040 and 1042, respectively.

Since focussing lenses 1016 and 1018 are in a static position relative to plate 1010 (unlike FIG. 8 where focussing lenses 796 and 797 move relative to plate 712), the optical path between source 1020 and surface 1038 remains constant over the entire scan range. Due to the constant optical length between source 1020 and surface 1038, it is not necessary to use collimated or quasi-collimated beams for beams 1032 that propagate between facet 1030 of rotating polygon 1008 and prism 1012.

As explained in connection with scanner 700 of FIG. 8, scanner 1000 can also be operated as reading system or as an illuminating and reading system when the multiple beams collected from surface 1038 by lens 1016. These beams propagate along the same optical path between beam splitter 1025 and lens 1016, but in the opposite direction from rotating lens 1016 via rotating prism 1012, rotating polygon 1008, and from there along a fixed orientation toward beam splitter 1025. Beam splitter 1025 directs the inverted beams as beams 1048 toward autofocus system 1050 via beam splitter 1054 and focussing lens 1052. Parts of beams 1048 are directed by beam splitter 1054 toward multiple detectors 1056 for reading the information on surface 1038. Autofocus system 1050 measures the deviations of the focusing conditions on surface 1038 from their optimal conditions. According to this measurement autofocus system 1050 moves arm 1058 on which lens 1024 is mounted along arrows 1060 and 1062 for reproducing optimal focussing conditions on surface 1038.

FIG. 11—Scanning Planar Surfaces

FIG. 11 schematically illustrates a scan path on a planar surface. This scan is produced by a scan system such as scanner 1000 of FIG. 10. Scanned surface 1100 has relative movement, indicated by arrows 1102 or 1104 with respect to scanner 1000, for producing a planar area scan on surface 1100. For example the scan is produced by three focused spots 1106, 1108, and 1110. Each of which moves clockwise and starts on line 1112. Spots 1106, 1108, and 1110 have a velocity on surface 1100 that is a superposition of their rotational speed and their velocity relative to surface 1100 along arrow 1102 or arrow 1104. The rotational speeds of spots 1106, 1108, and 1110 are $\omega \cdot r1$, $\omega \cdot r2$, and $\omega \cdot r3$ when $\omega$ is the angular velocity of all the spots and r1, r2 and r3 are the rotational radii of spots 1106, 1108, and 1110, respectively the spots have a common center 1114 at the intersection point between lines 1112 and 1116. Solid lines 1118, 1120, and 1122, along which spots 1106, 1108 and 1110 move, are approximately circular since the rotational speeds of these points are much higher than their velocities in the direction of arrow 1102.

For each scan period the rotational center, such as center 1114, must move a distance that is equal or larger than scan width d, which is equal to r1–r3. For example the rotational center for the next (second) scan period is located at intersection point 1124 between lines 1116 and 1126. Centers 1124 and 1114 are separated from each other by a distance d. Broken lines 1128, 1130, and 1132 are the scan lines of the second scan period. In spite of the proper separation d=r1–r3 between centers 1124 and 1114, it can be seen that broken lines 1128, 1130, and 1132 create overwriting by the intersection of solid lines 1118, 1120, and 1122. This intersection between the solid lines of the first scan period and those of the next or second period cannot be avoided when the whole area is scanned.

This cross between the scan lines of different scan periods is due to the use of multiple scan spots in a scan system such as scanner 1000 that forces usage of different scan radii for each spot. Due to the different radii of the scan lines, the larger radii of the previous scan period are located just before the small radii of the next scan period at the boundary zone between the scan lines of such periods. Thus crossing between lines cannot be avoided.

Accordingly for proper scanning using multiple beams, a new scan configuration should be used when the scanned surface has linear relative movement with respect to the scan system. Such a new system is illustrated in FIG. 12.

FIGS. 12a to 12d—Planar Scanner with Multiple Beams and Moving Surface

Figure 12A:
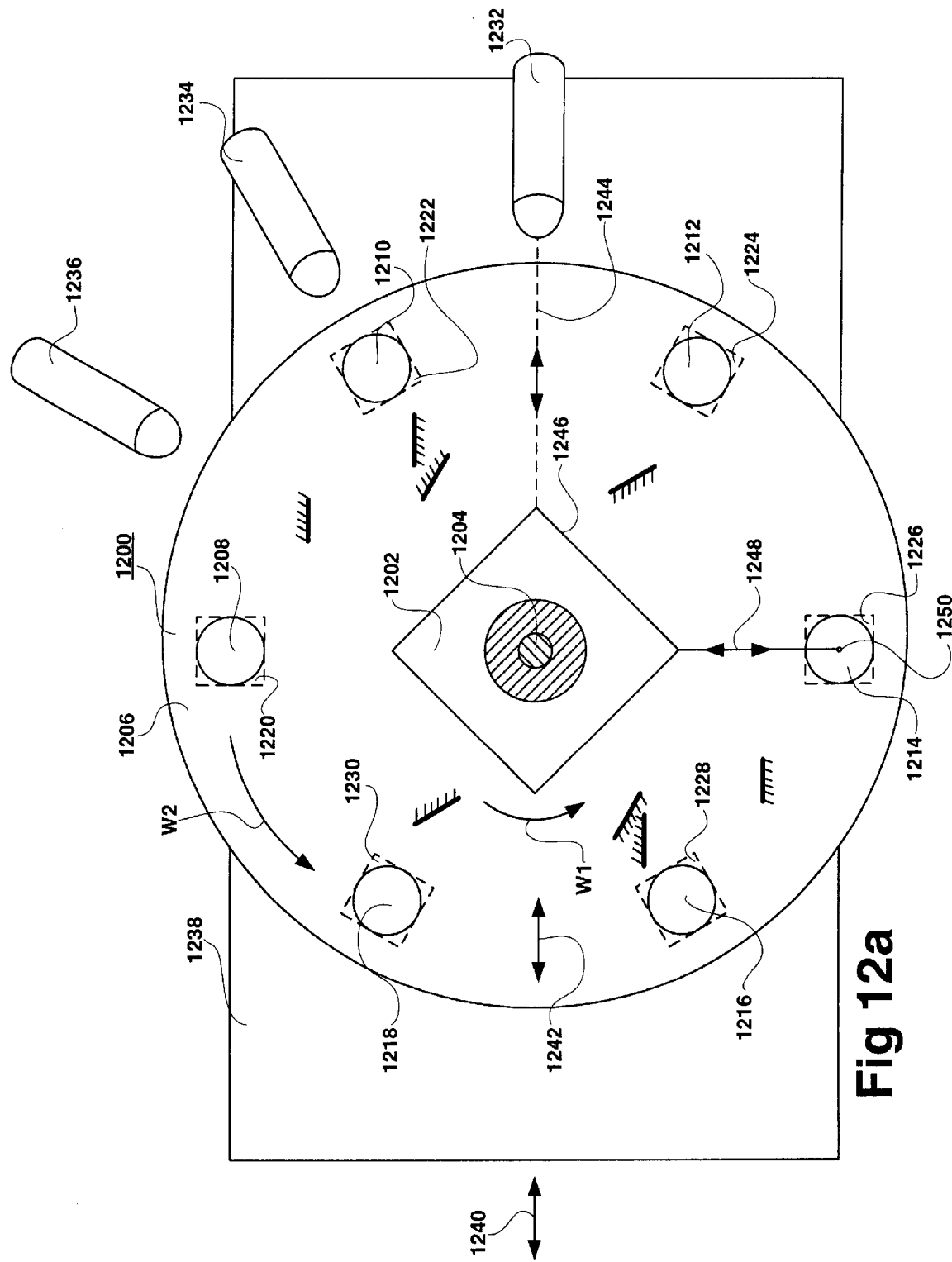

FIG. 12a illustrates a top view of scan system 1200 for scanning planar surfaces using multiple beams. FIGS. 12a to 12d include many parts of the same scanner and thus the same numeral is used for the same components. Scanner 1200 includes rotating polygon 1202 that was cut in its center and its upper part was removed. Inner axis 1204 passes through polygon 1202 and is attached to rotating plate 1206. Inner axis 1204 spins plate 1206 at rotational speed $\omega 2$ that is twice the rotational speed $\omega 1$ of polygon 1202. Rotating plate 1206 carries focussing lenses 1208, 1210, 1212, 1214, 1216, and 1218, which have reflecting prisms 1220, 1222, 1224, 1226, 1228, and 1230, respectively.

In the example of FIG. 12a, polygon 1202 has four sides and thus its periodic scan angle $\alpha$ equals 360/N=90 degrees when N=4 for a four-sided polygon. Radiation sources 1232, 1234, and 1236 may each emit a single beam and are distributed around axis 1204 at equal angles $\beta$ between them. Angle $\beta=\alpha/n$ where is the number of radiation sources used. For scanner 1200 n=3 and thus $\beta=90/3=30$ degrees. In addition to the rotational movement of scanner 1200 it also has linear relative movement with respect to scanned surface 1238. This relative movement can be produced by moving surface 1238 in the direction indicated by arrows 1240 or by moving scanner 1200 (arrows 1242) or moving both of them along their corresponding arrows.

Radiation source 1232 emits a single beam 1244 toward a facet of the upper part of polygon 1202. From this facet beam 1244 is reflected toward facet 1246 at the lower part of polygon 1202. I.e., beam 1244 is reflected as rotating scan beam 1248 that tracks reflecting prism 1226. Regarding the optical path of beam 1248, only the portion extending out of polygon 1202 in shown. Prism 1226 reflects beam 1248 down toward lens 1214, which collects beam 1248 with no relative movement between them over the scan range. Lens 1214 focuses beam 1248 into a small radiation spot 1250 on surface 1238. Spot 1250 scans surface 1238 at a tangential rotational speed of $\omega 2 \cdot r$ where r is the rotational radius of lens 1214. In principle source 1232 with its single beam can produce an area scan of planar surface 1238 when relative movement exists between surface 1238 and scanner 1200 (arrows 1240 or 1242). When high scan speed is important additional sources, such as sources 1234 and 1236, are added to scanner 1200. Polygon 1202 is illustrated in FIG. 12a at a position that allows it to scan over its entire scan angle $\alpha$.

Figure 12B:
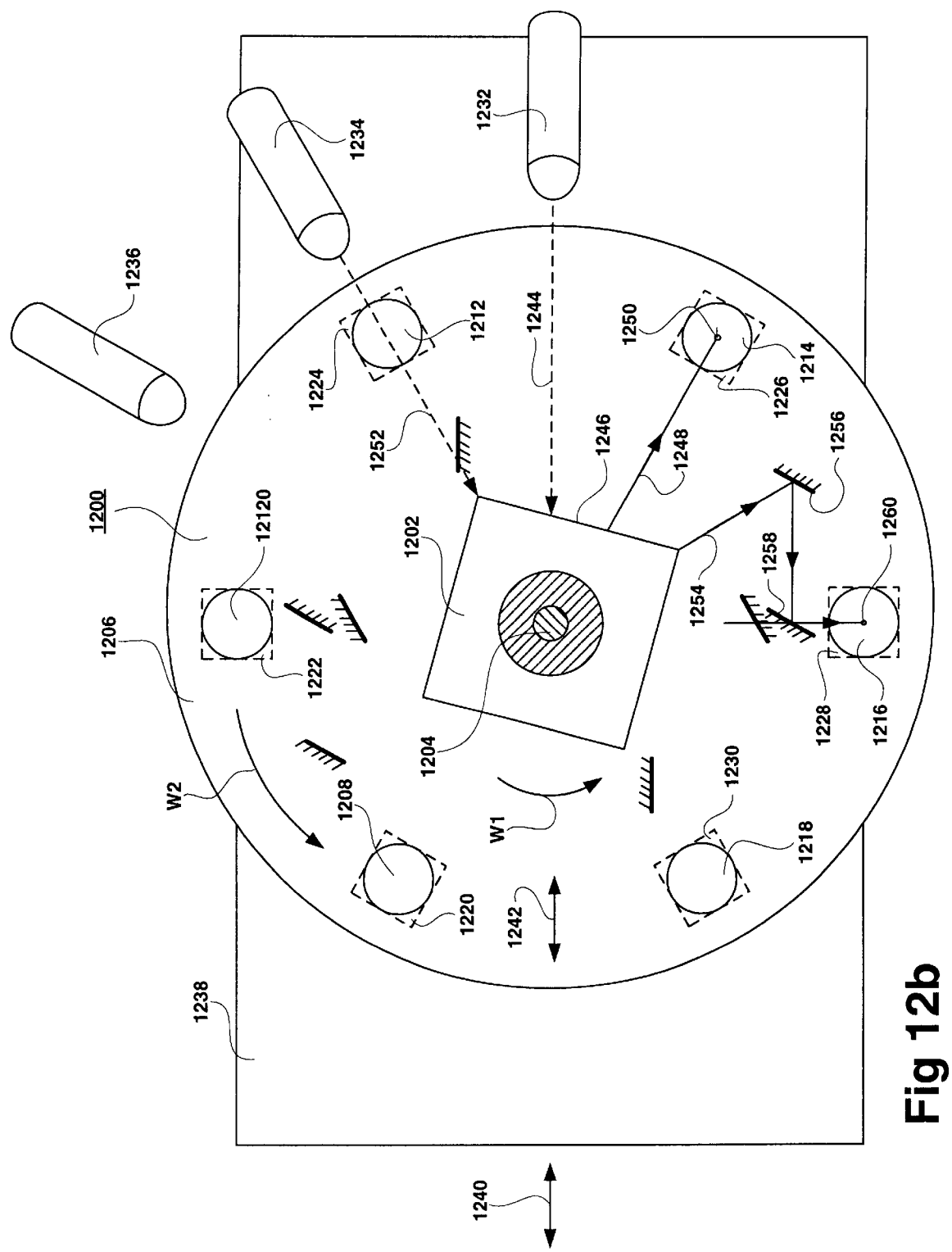

FIG. 12b illustrates scanner 1200 in another scan position when polygon 1202 is rotated at angle of 30 degrees and plate 1206 rotated at twice the angle, i.e., at angle of 60 degrees. At this position radiation source 1234 is located at angle of 30 degrees relative to source 1232 and can start to project its single beam onto the upper part of polygon 1202 (not shown). It does this in a way that beam 1252 is finally reflected out by facet 1246 at the lower part of polygon 1202. Beam 1252 is a rotating scan beam 1254 having a rotational speed $\omega 2$ that is equal to the rotational speed of mirrors 1256 and 1258, prism 1228, and lens 1216. Accordingly, beam 1254 is reflected twice by mirrors 1256 and 1258 and is reflected again by prism 1228 toward lens 1216. Lens 1216 collects rotating scan beam 1254 without relative movement between them over the entire scan range and focuses beam 1254 into a small radiation spot 1260 onto surface 1238.

Source 1234 is shifted at 30 degrees relative to source 1232 and its emitted beam 1252 is reflected from facet 1246, similar to beam 1244 of source 1232. In spite of the shift between sources 1232 and 1234 the starting pint of their scan (points 1250 and 1260 of FIGS. 12a and 12b, respectively) is the same due to the shift that mirrors 1256 and 1258 produce. Both sources scan via the same facets of polygon 1202, with the same starting point of the scan, having the same scan range $\alpha$ of polygon 1202, and having the same scan range $2 \cdot \alpha$ on surface 1238. Sources 1232 and 1234 differ from each other in that they start at different times. Accordingly for avoiding overlap between the scan lines of sources 1232 and 1234 on surface 1238, surface 1238 has to move a distance d that is equal to or greater than the width of the scan line of spot 1250 on surface 1238. The movement of surface 1238 along a distance d must be done during the period of time $\Delta t$ between the starting times of sources 1232 and 1234.

Figure 12C:
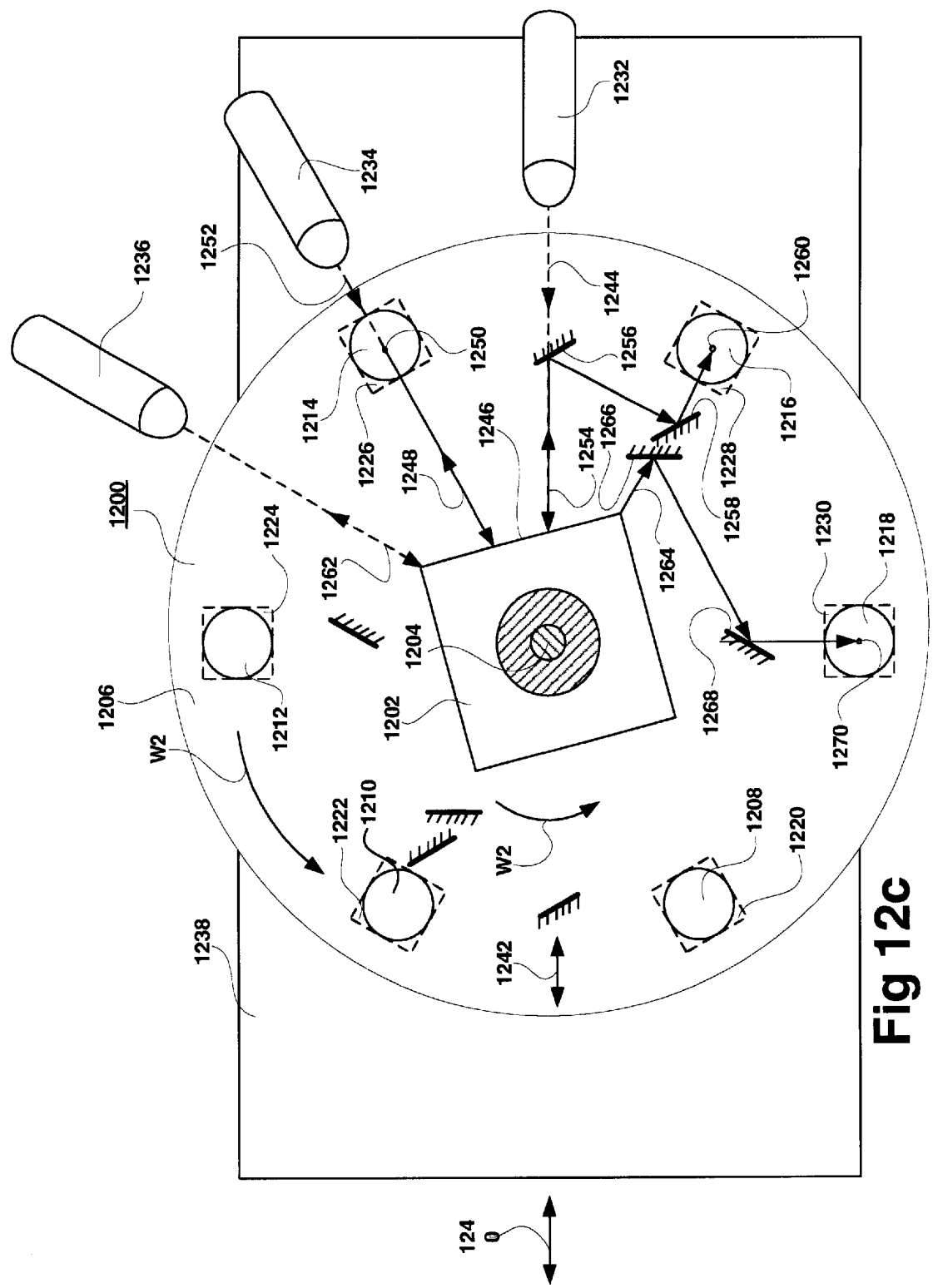

FIG. 12c illustrates scanner 1200 in another scan position when polygon 1202 is rotated at angle of 30 degrees and plate 1206 rotated at twice the angle, i.e., at angle of 60 degrees relative to the scan positions of FIG. 12b. At this position radiation source 1236 is located at angle of 30 degrees relative to source 1234. It can start to project its single beam 1262 onto the upper part of polygon 1202 (not shown) in a way such that beam 1262 is finally reflected out from polygon 1202 by facet 1246 in the lower part of polygon 1202. Beam 1262 is reflected from polygon 1202 as rotating scan beam 1264, which has a rotational speed ω·2 that is the same as the rotational speeds of mirrors 1266 and 1268, prism 1230, and lens 1218. Accordingly, beam 1264 is reflected twice by mirrors 1266 and 1268 and is reflected again by prism 1230 toward lens 1218.

Lens 1218 collects rotating scan beam 1264 without relative movement between lens 1218 and beam 1264 over the entire scan range and focuses beam 1264 into a small radiation spot 1270 on surface 1238.

Source 1236 is shifted at 30 degrees relative to source 1234 and its emitted beam 1262 is reflected from facet 1246, similar to beam 1252 of source 1234. In spite of the shift between sources 1234 and 1236 the starting points of their scan (points 1250 and 1260 of FIGS. 12a and 12b, respectively) are the same due to the shift that shifting mirrors 1266 and 1268 produce. Note that both sources scan via same facets 1246 of polygon 1202, and have the same starting point of scan. Also they have the same scan range α of polygon 1202, and have the same scan range 2·α on surface 1238.

Sources 1234 and 1236 differ in their scan starting times. Accordingly to avoid overlap between the scan lines of sources 1234 and 1236 on surface 1238, surface 1238 must move a distance d that is equal to or greater than the width of the scan line of spot 1260 on surface 1238. The movement of surface 1238 along distance d must be done during the period of time Δt between the starting times of sources 1234 and 1236.

Figure 12D:
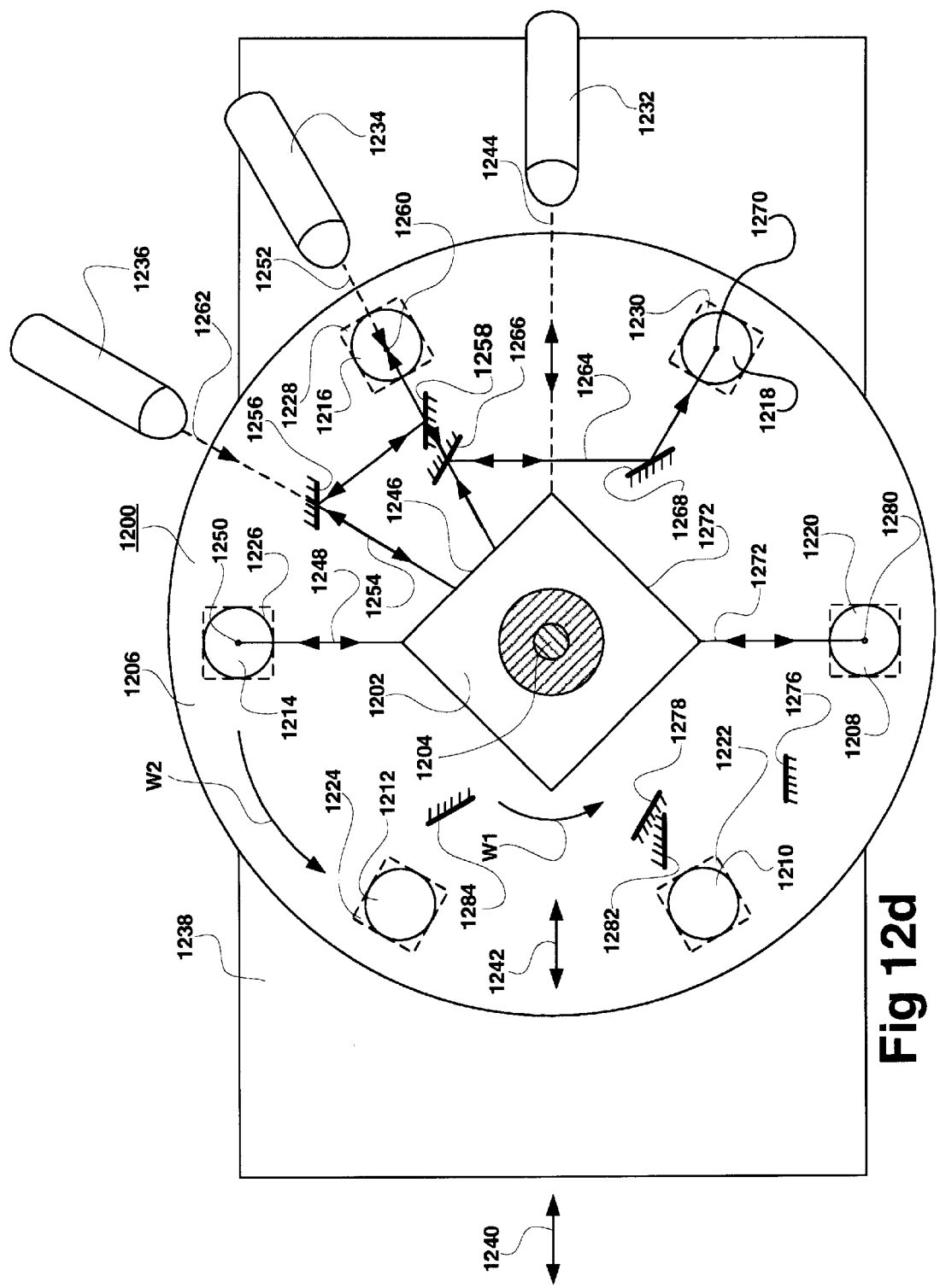

FIG. 12d illustrates scanner 1200 in another scan position when polygon 1202 rotates at an angle of 30 degrees and plate 1206 rotates at twice this angle, i.e., 60 degrees relative to the positions illustrated in FIG. 12c. At this position all radiation sources 1232, 1234, and 1236 are located at an angle of 30 degrees relative to each other. They continue to project their respective single beams onto the upper part of polygon 1202 (not shown) in a way that beams 1244, 1252, and 1262 are finally reflected from polygon 1202 by facet 1246 in the lower part of polygon 1202. Beams 1244,1252, and 1262 are reflected from polygon 1202 as rotating scan beams 1248, 1254, and 1264. They have a rotational speed ω·2 that is the same as the rotational speed of their reflecting mirrors, their prisms, and their lenses. Accordingly each focussing lens collects its corresponding rotating scan beam without relative movement between these lenses and the beams that they collect over the entire scan range and focuses its corresponded beam into a corresponded small radiation spot onto surface 1238.

Sources 1232, 1234, and 1236 are shifted at 30 degrees relative to each other and their emitted beam is reflected from the same facet 1246. In spite of the shift between the sources, the starting point of their scan (points 1250, 1260, and 1270 of FIGS. 12a to 12c) is the same due to the shift that their corresponding mirrors produce. Note that all sources scan via the same facets of polygon 1202 and have the same scan starting point. They also have the same scan range α of polygon 1202, and have the same scan range 2·α on surface 1238. The sources differ in their scan starting times. Accordingly to avoid overlap between the scan lines of the sources on surface 1238, surface 1238 must move a distance d that equals or exceeds the width of the scan line of each spot on surface 1238. The movement of surface 1238 along a distance d must be done during the period of time Δt between the starting times of the sources.

FIG. 12d illustrate scanner 1200 in its scan position just before scan beam 1244, reflected from facet 1246, is to be reflected as scan beam 1272 from facet 1274 for producing, by lens 1208, scan spot 1280 on surface 1238. The scan range on surface 1238 is along 180 degrees and thus system 1200 has a symmetry of 180 degrees. Accordingly mirrors 1276, 1278, 1282, and 1284 have an 180-degree symmetry with respect to mirrors 1256, 1258, 1266, and 1268, respectively.

As explained above, scanner 1200 can also be operated as a reading system or as illuminating and reading system. The focussing conditions can be controlled by autofocus systems as shown in the previous embodiments. For the clarity it is not shown here.

Scanned surface 1238 can be a PCB or a flat-panel display which must be scanned at high speed and high resolution for an inspection application or one which is to be written on by a direct writing photolithographic process. Surface 1238 can also be a plate to be written on or to be read by systems such as shown in FIGS. 10, 12a to 12d. Such systems can read and written on at a very high speed, even when the information is very dense. Accordingly surface 1238 can be read, inspected, or written on with very high density. Such density allows surface 1238 to improve and replace the CD, the videodisk, the computer disk, and the DVD by a plate such as surface 1238. This plate has improved performance due to its greater information density.

FIG. 13—Scan Path on Planar Surface

FIG. 13 illustrates the scan path of scanner 1200 of FIGS. 12a to 12d on a reduced scale.

Surface 1238 can move in the direction of arrows 1240, but in this example it moves in the direction of arrow 1241. FIG. 13 illustrates the scan path that starts at time t0 and ends at time t1. At time t0 the scan position corresponds to the illustration of FIG. 12d when scan spot 1250 completes a scan along line 1281 at an angular range of 180 degrees (half a circle) and it about to start a new period of scanning as spot 1280 along line 1287. At this position spot 1260, which started its scan with a time delay Δt along line 1283, completed an angular scan range of (180−2×30=120 degrees. Similarly spot 1270, which started its scan along line 1285 with a time delay of 2Δt, completes an angular scan range of (180−2×60)=60 degrees. When the scan continues spots 1260 and 1270 continue to scan along the parts of the broken lines of scan lines 1281 and 1283, respectively.

When each of spots 1250, 1260, 1270, and 1280 completes its periodic scan range (half a circle) it starts a new period of scan. This process is shown for spot 1250 that completed its scan along line 1281 and is about to start a new scan period of as spot 1280 along line 1287. During the delay Δt between the starting times of sources 1232, 1234, and 1236, surface 1238 moves a distance d which is equal to or greater than the width of scan spots 1250, 1260, and 1270, or is equal to or greater than the width of their corresponding lines 1281, 1283, and 1285. This movement of surface 1238 prevents overlap between the scan lines. For example, when a certain scan spot, such as spot 1250, completes its scan it starts a new scan period. The new scan period starts at a delay of 3Δt with respect to t0 and thus surface 1238 moves a distance 3×d, which is sufficient to produce a skip over the two scan lines above.

Accordingly the new period of scan of spot 1250 starts as spot 1280 on line 1287 above line 1285. Spot 1280 scans along line 1280 without any intersection between lines 1285 and 1287. Similarly all the periods of scan take a time of 3Δt and thus all additional periodic scan lines 1289, 1291, 1293, 1295, 1297, 1299 that will be produced later will not cross each other. The delay of Δt between the scan spots corresponds to a scan delay of 60 degrees over the entire scan range. Accordingly at the end of the scan at time t1 there will also be a scan delay of 60 degrees as can be seen from the positional differences between scan spots 1292, 1294, and 1296 on their corresponding lines 1293, 1295, and 1297.

Since d is much smaller than the length of the scan lines, each scan line has approximately the shape of half a circle having a radius r.

FIG. 14—Optical Path of Planar Scan

FIG. 14 illustrates a side view of scanner 1300 designed for a planar scan. Scanner 1300 is illustrated to demonstrate the side-view structure of the optical path of scanners, such as scanner 1200 of FIG. 12d. For clarity FIG. 14 shows only the main principles of the optical path of scanners such as scanner 1200. Accordingly some parts, such as shifting mirrors 1256, 1258, 1266, 1268, their corresponding symmetrical shifting mirrors 1284, 1282 1278, and 1276, and some other components included in FIG. 12, are not shown. The optical path shown is similar to the optical path shown in the top view of FIG. 12d between source 1232 and spot 1250 on surface 1238.

Motor 1302 has two concentric axes 1304 and 1306. Outer axis 1304 spins polygon 1308 at rotational speed ω1 and inner axis 1306 passes through axis 1304 and polygon 1308 without touching them. The motor spins plate 1310 at rotational speed ω2=2ω1. Plate 1310 carries reflecting prisms 1312 and 1314 and focussing lenses 1316 and 1318. Radiation source 1320 emits beam 1322 through focussing lens 1324 and beam splitter 1326 and toward facet 1328 of polygon 1308. Beam 1322 is reflected from facet 1328 toward facet 1330 of polygon 1308 and from there it is reflected from polygon 1308 as rotating scan beam 1332. Beam 1332 rotates at angular velocity ω2, the same as the rotational speed of prism 1312 and lens 1316.

Accordingly beam 1332, oriented toward prism 1312, tracks it and is reflected by prism 1312 toward lens 1316. Lens 1316 collects beam 1332 without any relative movement between this lens and beam 1332 over the entire scan range and focuses beam 1332 into small a radiation spot 1334 on scanned surface 1336. This spot is similar to spot 1250 on surface 1238 of FIG. 12d. Spot 1334 moves on surface 1336 along a circular line at rotational speed ω2.

When additional relative movement between surface 1336 and scanner 300 is introduced along arrows 1338 the circular scan turns into an area scan of surface 1336. In a reading mode, or illuminating and reading mode, the optical path between beam splitter 1326 and spot 1334 in the writing mode is the same as in the above modes. However the beam propagates in the reverse direction from spot 1334 to beam splitter 1326 via lens 1316, prism 1312, and polygon 1308, and from there in a fixed orientation toward beam splitter 1326. Beam splitter 1326 reflects inverted beam 1332 as beam 1340 through lens 1342 and toward sensor 1344. Sensor 1344 reads the information from surface 1336 and measures the deviations of the focus of spot 1334 on surface 1336 from optimum.

This measurement produces an electrical signal that is transferred by leads 1346 to autofocus system 1348. System 1348 produces a control signal that is transferred by leads 1350 to motor 1352. According to the control signal, motor 1352 moves lens 1324 by its arm 1354 in the direction indicated by arrows 1356 and/or moves lens 1342 by its arm 1358 along arrows 1360 to reproduce the optimal focus conditions of spot 1334 on surface 1336 and spot 1362 on sensor 1344.

For the simplicity scanner 1200 of FIG. 12d is illustrated without sensor 1344 and autofocus system 1348. A sensor, such as sensor 1344, and an autofocus system, such as autofocus system 1348, can be added and used with scanner 1200 of FIG. 12d.

Surface 1336 can be for example, a silicon wafer such as those used to fabricate ICs.

FIG. 15—Scanning with Multiple Sources Aligned Toward Multiple Facets

FIG. 15 illustrates scanner 1400 and scanned surface 1418. These are actually equivalent to scanner 1200 with scanned surface 1238 but, with additional radiation sources. For the clarity and to emphasize the additional sources added, the numerals of the components of FIG. 12 have been removed.

Additional sources 1400, 1402, 1404, 1406, 1408, 1410, 1412, 1414, and 1416 have been added to the system of FIG. 12d and are distributed uniformly around a complete circle. When only a part of the above sources is used with the sources are distributed along a part of a circle, the separation angle between them must fit the design of the system, which is 30 degrees for the specific scanner in FIGS. 12d and 15.

Each group of three additional sources, such as sources 1406, 1408 and 1410, act similarly to sources 1232, 1234, and 1236 of scanner 1200 of FIG. 12d. This allows the range of scanner 1200 to be converted from 180 degrees to be 360 degrees, with the additional benefit of simultaneously illuminating several facets of the polygon, resulting in increasing scan speed.

FIG. 16—Spinning and Scan Device

FIG. 16 illustrates a spinning and scan device 1500 for producing a scan with multiple beams in a scan configuration similar to that of scanner 1200 of FIG. 12d. The scan of device 1500 is similar to that of scanner 1200 in the sense that both of them produce a scan with an angular delay between the scan beams. While in scanner 1200 the angular delay between beams is produced by shifting mirrors, device 1500 produces such a delay directly without the need for shifting mirrors.

Device 1500 includes three polygons 1502, 1504, and 1506, each of which is similar to polygon 1202 of FIG. 12d. Polygons 1502, 1504, 1506, and mounting axis 1508, all have the same rotational axis 1510. Polygons 1502, 1504, and 1506 are oriented to have a constant rotational angle relative to each other. For scanner 1500 (or scanner 1200) an equivalent relative rotational angle between the polygons is 30 degrees.

Beam 1520 hits polygon 1506 and is reflected as scan beam 1522. Beam 1512, oriented at the same angle as beam 1522, hits polygon 1502 and is reflected as scan beam 1514. Polygon 1502 is rotated relative to polygon 1506 at an angle of 60 degrees and thus beam 1514 is rotated at an angle of 120 degrees relative to beam 1522.

Beam 1516 is oriented at the same angle as beams 1520 and 1512. It hits polygon 1504 and is reflected as scan beam 1518. Polygon 1504 is rotated at angles of 30 and −30 degrees relative to polygons 1502 and 1506, respectively. Thus beam 1518 is rotated relative to beams 1514 and 1522 at angles of 60 and −60 degrees, respectively.

Accordingly device 1500 can directly produce a scan with an angular delay between scan beams 1522, 1516, and 1518 in a configuration that may fit the scan system, such as that of scanner 1200, without the need for shifting mirrors.

FIG. 17a13 Planar Scanning with Multiple Sources Aligned Toward Multiple Facets for Writing, Illuminating, or Inspecting by Imaging or Collecting Scattered Light FIG. 17a schematically illustrates a scanner 1600 which includes multiple radiation sources 1602 and 1604 directed toward multiple sides 1606 and 1608 of a rotating scan device 1610. Carrying plate 1612 carries a spindle 1614 (driven by a motor) and mounting bars 1616 and 1618. Sinks 1620 and 1622 are mounted on bar 1616 and sinks 1624 and 1626 are mounted on bar 1618. Spindle 1614 has two concentric axes. It spins an outer axis 1628 at first angular velocity ω1 and an inner axis 1630 at second angular velocity ω2. Outer axis 1628 is attached to scan device 1610, carries it, and spins it at first angular velocity ω1. Inner axis 1630 is connected to plate 1632 by connecting disk 1634 and spins it at angular second angular velocity ω2. Inner axis 1630 passes through outer axis 1628 and scan device 1610 without touching them. Rotating plate 1632 carries rotating lenses 1636 and 1638 with their corresponding reflector prisms 1640 and 1642 and spins them all at second angular velocity ω2.

Each of sources 1602 and 1604 emits multiple radiation beams (or at least one radiation beam) 1644 and 1646 directed toward splitters 1643 and 1645, respectively. Splitter 1643 receives beams 1644 from radiation source 1602 and transmits parts of them to lens 1648. Lens 1648 receives beams 1644 1643 and directs them to pinhole array 1650.

Lens 1648 is designed to convert beams 1644 into an image 1652 of multiple focused radiation spots arranged in the same structure as pinhole array 1650 and such spots are projected onto its plane. Thus, each spot of image 1652 is aligned with its corresponding hole in array 1650. The holes of array 1652 have smaller dimensions than the diffraction limit of lens 1648, as is usual in confocal microscopes. (A confocal microscope is one in which both the illuminating radiation and the radiation collected from the imaged surface are transmitted through pinholes for improving resolution and decreasing depth of focus.)

In that way the holes of the array clip or trim the waists or spread of beams 1644 by transmitting only parts of them. The holes also serve as very small objects to be imaged on planar scan surface 1654. Each beam that passes through the holes of array 1650 behaves as a diverging beam that comes out of an object that is located at its corresponded hole in pinhole array 1650 and has the same size as that hole.

Pinhole array 1650 is shown in a side view cross section. Only one hole is shown and thus it is the only one that illustrates the transmission of one beam (of multiple beams 1644) through array 1650.

To improve the imaging resolution of the radiation spots of image 1652 that serves as an object to imaged on surface 1654, the diverging angle of each beam is designed to be as large as possible. This angle is limited when the radiation spot of each of beams 1644 on lens 1656, which collects it, will cover the whole effective area of that lens.

Lens 1656 collects beams 1644 and converts them into beams that are substantially parallel and are directed toward splitter 1658. Splitter 1658 receives beams 1644 and transmits parts them toward side 1606 of rotating scan device 1610.

Side 1606 receives beams 1644 from splitter 1658 and reflects them toward side 1660 of scan device 1610. Side 1660 receives beams 1644 from side 1606 and reflects them toward reflector-prism 1640. Reflector 1640 receives beams 1644 from side 1660 and reflects them toward scan lens 1636.

Lens 1636 receives beams 1644 from reflector-prism 1640 and converts them into image 1662 projected onto surface 1654. Image 1662 moves on surface 1654. Surface 1654 is positioned at a distance from lens 1636 equal to the focal length of this lens. In this case the focusing conditions of image 1662 are optimal. Image 1662 is the image of pinhole array 1650 (or real image 1652 that serves as an object) on surface 1654. Image 1662 can be produced by providing scan lens with an f-number close to 1 and thus it can have a resolution that is diffraction limited.

The optical path between radiation source 1604 and scanned surface 1654, via rotating device 1610, is described briefly since it is similar to the optical path between source 1602 and scanned surface 1654 via rotating device 1610.

Source 1604 emits beams 1646 toward lens 1647 that collects and directs them toward splitter 1645. Splitter 1645 transmits parts of them toward pinhole array 1664. Parts of beams 1646 pass through array 1664 toward lens 1666, which converts them into beams that are close to parallel and directs them to splitter 1668. Splitter 1668 transmits parts of beams 1646 that propagate toward side 1608 of rotating scan device 1610. Beams 1646 are reflected from side 1608 toward side 1670 of device 1610 and are reflected from there to prism 1642. Beams 1646 are reflected from prism 1642 toward scan lens 1638, which converts them into image 1672 of pinhole array 1664 and projects this image onto surface 1654 and moves it along this surface. Surface 1654 is positioned at a distance from lens 1638 that is equal to the focal length of this lens. In this case the focusing conditions of image 1672 are optimal.

Scan device 1610 has a special design in which all the planes that contain its sides, such as sides 1606, 1608, 1660, and 1670, all intersect at a point on rotational axis 1673. Due to this design, when scan device 1610 rotates at angular velocity ω1 around axis 1673, it reflects beams 1644 as a scan beam rotating at angular velocity ω2 around axis 1673. ω1 and ω2 satisfy the relationships ω2=2ω1. Supporting plate 1632 carries lenses 1636 and 1638 and reflector-prisms 1640 and 1642 and rotates at angular velocity ω2. Thus it causes all the above optical components that it carries to rotate at the same angular velocity ω2. Beams 1644 and 1646 reflected from scan device 1610 also rotate at angular velocity ω2 and track reflectors 1640 and 1642, respectively, with no relative translation between them. Since scan lenses 1636 and 1638 with their corresponding reflectors 1640 and 1642, respectively, are all mounted on plate 1632, there is no relative motion between them. Thus beams 1644 and 1646, reflected from reflectors 1640 and 1642 toward lenses 1636 and 1638, respectively, track their corresponding lenses very accurately and without relative translation.

An accurate tracking of scan lenses 1636 and 1638 by beams 1644 and 1646, respectively, without relative translation between the beams and the lenses, is very important for producing a high-resolution scan. In general, the lack of translation between the scan lenses and the beams that track them enables whole effective area of the scan lenses to be covered throughout the entire scan range. This provides very high scan resolution that is diffraction limited.

Images, such as image 1662 and 1672 of pinhole arrays 1650 and 1664, respectively, are projected onto scanned surface 1654 and can be used for writing and engraving applications. Modulating or switching the intensity of each beam of radiation beams 1644 and 1646 controls the written or engraved information. Sources 1602 and 1604 can be lasers arrays capable of emitting multiple beams while the intensity of each beam can be modulated or switched separately by a switching or modulating controller which controls the radiation sources (not shown).

The small focused spots of images such as images 1662 and 1672 of pinhole arrays 1650 and 1664, respectively, can be used also for illuminating scanned surface 1654. By using this technique, the scan system of FIG. 17a is capable of illuminating surface 1654 at a very high intensity. High illumination is very important for applications of imaging and inspecting since it improves the brightness and thus the signal-to-noise ratio and the contrast, resulting in improved image acquisition.

The system of FIG. 17a illustrates two techniques for imaging according to the invention.

The first technique is for acquiring the images or inspecting by collecting scattered light. This technique is also known as imaging and inspecting by laser scattering.

In the other technique multiple detectors such as a line scan camera, CCD camera, or Time Delay Integration (TDI) camera, does acquiring images in the mode of a rotating confocal microscope.

According to the first technique, the small focused spots of images 1662 and 1672 on scanned surface 1654 illuminate this surface. The low transmission loss of beams 1644 and 1646 through pinhole arrays 1650 and 1664 is minor. In addition the focused spot of images 1662 and 1672 on surface 1654 can be very small due to the achievable diffraction limited resolution all over the scan range. In general, the above low transmission loss and the small size of the focused radiation spots on the scanned surface enable very high illumination intensity on the scanned surface to be achieved. This is achievable even when the power of the sources is conventional.

The small focused spots of images 1662 and 1672 are reflected from and scattered by surface 1654. Radiation 1674 that is reflected from and scattered by surface 1654 is collected by sinks 1620 and 622. Similarly, sinks 1624 and 1626 collect radiation 1676 that is reflected from and scattered by surface 1654. Sinks 1620, 1622, 1624, and 1626 can be made of highly sensitive radiation detectors, such as photomultipliers, which are sensitive to the wavelength that radiation sources 1602 and 1604 emit.

When using a single beam, image acquisition is obtained by illuminating surface 1654 with that beam during the scan produced by rotating scan device 1610 and rotating plate 1632 at angular velocities ω1 and ω2, respectively. In this mode the focused spot of this single beam moves on surface 1654. Each time it illuminates a different spot on planar surface 1654 along the scan path. During the time in which the scan is conducted, detectors 1620 to 1626 collect radiation 1674 and 1676 that is scattered and reflected from surface 1654 and convert it into a time dependent signal that is fed into an image acquisition system (not shown).

The relationships between the timing of the scan and the illumination position on surface 1654 are known. The image acquisition system synchronizes this timing with the time-dependent signal produced by detectors 1620 to 1626 and creates the relationships between the signal of these detectors and the illumination position on surface 1654. The use of these relationships enables image acquisition system to construct the image of scanned surface 1654.

The system of FIG. 17a is actually divided into two groups. The first group includes surface 1654 and translation stage 1678 which carries that surface and can move it in the X, Y plane along arrows 1680 or along arrows 1682 in the Z direction. The second group actually includes all the rest of the components schematically illustrated in FIG. 17a. All the components of the system of FIG. 17a that belong to the second group are attached directly or indirectly to carrying plate 1612. Some of these components are not shown attached for avoiding complexity and maintaining the clarity of the drawing of FIG. 17a.

Translation stage 1684 that belongs to the second group actually carries all the components of this group and is capable of moving them all together as a single rigged body in the X, Y plane along arrows 1686, or in the Z direction along arrows 1688.

An area scan can be produced in two different ways by introducing relative movement between rotating plate 1632 and scanned surface 1654 along the X, Y plane in the direction of arrows 1680 or 1686 normal to axis 1673. The first option is to move surface 1654 by translator 1678 along arrows 1680 and normal to rotational axis 1673. The other option is to move the whole second group by translator 1684 along arrows 1686 and normal to axis 1673. An additional option is to use the combination of the two previous options by moving both stages 1678 and 1686 along a direction normal to axis 1673. The relative movement between plate 1632 and surface 1654 normal to axis 1673 converts the scan from being along lines, when such relative movement does not exist, into an area scan when this relative movement is introduced.

Radiation-sensitive detectors 1620–1626 can schematically represent additional multiple detectors distributed around axis 1673.

Similarly, sources 1602 and 1604 can schematically illustrate additional multiple sources that are distributed around axis 1673 and are directed toward multiple sides of scan device 1610. In addition lenses 1648 and 1656, splitters 1643 and 1658, and pinhole array 1650 can be included as parts in the assembly of source 1602. Similarly, lenses 1647 and 1666, splitters 1645 and 1668, and pinhole array 1664 can be included as parts in the assembly of source 1604.

It is possible to dramatically increase the scan speed of the scan system of FIG. 17a for the purposes or writing, engraving, illuminating, reading, imaging, and inspecting by using multiple beams. The use of multiple beams in the above technique of light (or laser) scattering for a single radiation beam requires that the scan system use its additional capabilities.

When a single beam I used to scan in applications of illuminating and inspecting by light scattering, the radiation reflected from and scattered by the scan surface can be collected by all the radiation sensitive detectors. In this case the construction of the image of the scanned surface is done by the correlation between the illumination position on the surface and the corresponding signal of all the detectors.

Unlike the situation where imaging is done using light scattering of a single beam, the use of multiple beams for imaging by light scattering causes each one of the detectors to collect and combine the light scattered and reflected from all the focused spots on the scanned surface. The signals corresponding to each scan spot are also summed and mixed. Proper imaging requires the capability to distinguish between the different signals corresponding to the different focused spots produced by the different beams. This distinction is necessary for identifying the different signals corresponding to the different positions of the focused spots on the scanned surface, produced by different beams.

FIG. 17a illustrates a technique for distinguishing between the different signals produced by detectors 1620–1626 corresponding to the positions of the focused spots of images 1662 and 1672 on scanned surface 1654, related to pinhole arrays 1650 and 1664, respectively. Each beam of beams 1644 and 1646 has a different wavelength. Detectors 1620–1626 include filters 1690–1696, respectively. At least one of filters 1690–1696 1620–1622 transmits only a wavelength that is equal to one of the wavelengths of one of the beams. In this configuration for each beam there is at least one dedicated detector that produces only the signal that is related to this beam with its specific wavelength. This technique enables a different and separate image of the scanned surface to be produced for each beam. Adding the images produced by each of the beams results in the image of whole the scanned area. Such an image is produced at much higher throughput as compared to imaging by scattering of a single beam.

To increase the sensitivity of the detectors they can be made of photomultipliers that are sensitive to the spectral range of the beams.

The second imaging technique is based on at least one radiation sensitive detector 1698 or 1700, or both of them. Usually detectors 1698 and 1700 include multiple detectors in the form of a line scan camera or CCD camera. The radiation of the focused spots related to image 1662 of array 1650 is reflected from and scattered by surface 1654 while image 1662 is moved along planar surface 1654 by rotating lens 1632.

Lens 1636 collects the radiation scattered and reflected from image 1632 on surface 1654 and converts it into reflected radiation beams 1644 that are very close to parallel beams and contain at least one radiation beam.

Reflected beams 1644 propagate along an optical path that is similar to the optical path of beams 1644 between splitter 1643 and image 1662 on surface 1654. However the beams travel in the reverse direction. Beams 1644 are directed by rotating lens 1636 toward reflector-prism 1640. Reflector 1640 reflects them toward side 1660 of device 1610. From side 1660 beams 1644 are reflected and directed to side 1606 of device 1610 and are reflected there from device 1610. Radiation beams 1644 are actually about the same as incoming beams 1644 and differ in their behavior only by the direction of their propagation.

The existing situation, where the path of incoming beams 1644 for illumination process also exists for the optical path of reflected beams 1644 for the imaging process. In both cases plate 1632 and scan device have angular velocities ω1 and ω2 when ω2=2ω1. Beams 1644 start their path when they are oriented along a fixed direction and end their path as scan image 1662 moving along surface 1654. Accordingly, reflected beams 1644 that start their optical paths at scan image 1662, move on planar surface 1654, and end their path in a fixed orientation where they are reflected from device 1610 to beam splitter 1658. The fixed orientation along which reflected beams 1644 are reflected from device 1616 is parallel to the fixed orientation along which incoming beams 1644 are aligned in their initial optical path.

Beam splitter 1658 receives reflected beams 1644 from device 1610 with a fixed orientation, even though scan device 1610 rotates at angular velocity ω1. Splitter 1658 transmits parts of reflected beams 1644 and directs them toward lens 1656. Lens 1656 converts beams 1644 back into image 1652 projected onto pinhole array 1650. Image 1662 of array 1650 is projected on surface 1654 with optimal focus.

Reflected beams 1644 originate as this image when it serves as an object to be imaged by lens 1656. Accordingly, the image that lens 1656 produces from reflected beams 1644 is projected back onto pinhole array 1650 and is identical to both image 1652 and array 1650.

The radiation spots of image 1652 project back on themselves and are perfectly matched in structure, arrangement, and size to the holes of array 1650. Thus the array receives reflected beams 1644 from lens 1656 and transmits them from image 1652 toward lens 1648 without attenuation. Image 1652, which serves as an object to be imaged by lens 1648, is the image of image 1662 on surface 1654, which also serves as an object. Lens 1648 projects the image of object 1652 (real image) by reflected beams 1644 onto detector 1698 via beam splitter 1643. Splitter 1643 reflects parts of beams 1644 toward detector 1698.

In this configuration, detector 1698 actually receives the image of scanned surface 1654 under moving image 1662 and converts it into corresponding electrical signals that are fed into the image acquisition system (not shown). When relative movement is introduced between rotating scan lens 1636 and scanned surface 1654 along a direction normal to rotational axis 1673, the radiation sensitive detectors of detector 1698 produce signals. During scanning, these signals are related to different scan times and scan positions. These signals are used by the image acquisition system to reconstruct the image area of the scanned image.

Beam splitter 1658 reflects parts of reflected radiation beams 1644 toward lens 1702, which collects them and converts them into image 1704 of object 1662 (real image) that is projected onto autofocus system 1706. Autofocus system 1706 measures the deviations of the imaging conditions of image 1662 on surface 1654 from their optimal conditions. Autofocus system 1706 controls the focusing conditions of image 1662 on surface 1654 to keep them optimal over the entire scan range. (Optimal focussing conditions occur when the sizes of the radiation spots of image 1662 on surface 1654 are minimal.) There are three ways in which system 1706 maintains optimal focussing conditions:

The first is by changing the distance between lens 1656 and pinhole 1650 (or real image 1652) in a direction along arrows 1708. Shifting arm 1710 that holds lens 1656 moves lens 1656 in this direction. Arm 1710, and thus the movement of lens 1656, is shifted by translator 1712. The latter is controlled by autofocus system 1706. Autofocus system 1706 causes lens 1656 to be located in a position where image 1662 on surface 1654 is optimally focussed.

The second way is by changing the distance between rotating lens 1636 and scanned surface 1654 to maintain its value such that image 1636 on surface 1654 will be optimal. Autofocus system 1706 controls translation stage 1678 via leads 1714 and 1716. The signal supplied on these leads moves this stage in the Z direction along arrows 1682. The controlled translation of stage 1678 causes surface 1654 to move into positions where optimal focussing conditions are maintained. I.e., the sizes of the radiation spots of image 1662 on surface 1654 are minimal over the entire scan range.

The third way is by changing the distance between rotating lens 1636 and scanned surface 1654 such that image 1636 on surface 1654 will be in optimal focus. Autofocus system 1706 controls translation stage 1684 by leads 1714 and 1718 which supply a signal which cause it to move it in Z direction along arrows 1688. The controlled translation of stage 1684 causes rotating scan lens 1636 to move into positions where the distance between lens 1636 and surface 1654 produces optimal focus conditions. These conditions are maintained such that the size of the radiation spots of image 1662 on planar surface 1654 is minimal over the entire scan range.

The process of imaging by detector 1698 and controlling the focus conditions by autofocus system 1706 is completely analogous to the way it occurs in the symmetric sides of the scan system of FIG. 17a. Thus it will be described only briefly.

The radiation reflected and scattered by surface 1654 from the region under image 1672 is collected by lens 1638 and directed toward reflector 1642 as parallel reflected radiation beams 1646. From reflector 1642 beams 1646 continue toward side 1670 of device 1610 and are reflected toward side 1608 of device 1610. From side 1608 beams 1646 are reflected from device 1610, during its rotation, along a fixed orientation and toward splitter 1668. Splitter 1668 transmits parts of beams 1646 toward lens 1666, which converts them into the image of object (real image) 1672 on surface 1654 and projects it onto pinhole array 1664. Array 1664 transmits reflected beams 1646 toward lens 1647, which converts them into the image of pinhole array 1644 (or real image 1672) and projects them via splitter 1645, which reflects them onto detector 1700. Detector 1700 produces signals during the scan to feed an image acquisition system that reconstructs the image of the scanned area.

Beam splitter 1668 reflects the other parts of reflected beams 1646 toward lens 1720 that converts them into image 1722 of object (real image) 1672 and projects them onto autofocus system 1724. Lens 1666 is moved by arm 1728 in the direction indicated by arrows 1726. Arm 1728 is shifted by translator 1730 that is controlled by autofocus system 1724 to keep lens 1666 in a position that assures optimal focussing of image 1672 on surface 1654.

The imaging by sensitive detectors 1698 and 1700 by double passing of incoming and reflected beams 1644 and 1646 through pinhole arrays 1650 and 1664, respectively, is similar to the imaging done by a confocal microscope. Accordingly one of the versions of system 1600 illustrated in FIG. 17a actually shows at least one rotating confocal microscope designed according to the invention for the use of at least one radiation beam. Similar to a conventional confocal microscope that has a very short depth of focus, rotating microscope 1600 of FIG. 17a is also very sensitive to its focus conditions.

The use of pinhole arrays 1650 and 1664 increases the scan resolution of images 1662 and 1672 on surface 1654 and decreases dramatically the depth of focus of the rotating microscope. The depth of focus of microscope 1600 is very shallow since any slight deviation from optimal focus conditions will cause the radiation intensity of the image projected on detector 1698 to decrease dramatically. This intensity decrease in and out from optimal focusing conditions is due to the way that image 1652, produced from reflected beams 1644 by lens 1656, is imaged back onto pinhole array 1650.

If the focus conditions are proper, image 1652 is imaged precisely back on itself. Image 1652 is imaged in a way that the structure, size, and arrangement of its radiation spot will not perfectly fit pinhole array 1650. The mismatch between image 1652 and pinhole array 1650 causes a very high attenuation of reflected beams 1644 in their passage through array 1650 and this causes a dramatic reduction of the brightness of the image projected onto detector 1698. Accordingly system 1600, when used as a rotating confocal microscope, produces a strong contrast for features at different heights in the topology of the scanned surface. Thus it is useful as a system for three dimensional (3D) imaging. Such 3D imaging is very useful in the IC industry for inspecting stacks of processed silicon wafers that have different heights.

All the versions, modes, and ways of operation of system 1600 of FIG. 17a can be used in any combination. These combinations can be in any form, from the simplest combination where each of them is used separately, to the opposite, where all are used together.

FIG. 17b—Conversion of Circular Scan into Another Scan Form

FIG. 17b schematically illustrates bundle 1740 of radiation guides 1750 that serves as first scan region 1742 of scan system 1600 of FIG. 17a and is combined into scan system 1600 to replace scanned surface 1654 and translator 1678. Since the rest of the components of system 1600 remain the same, they are not shown in FIG. 17b. Only rotational axis 1673 of system 1600 and scan beams 1644, which are converted into scan spots 1662, are shown. Axis 1673 determines the relative position of bundle 1740 with respect to the rest of the components of system 1600. Beams 1644 and spots 1662 illustrate the way in which first region 1742 is scanned.

Region 1742 is a plane including concentric circular lines 1744 having center 1746. Inputs 1748 of radiation guides 1750 are arranged along circular lines 1744 in a form of at least portions of complete circles. Rotational axis 1673 is normal to plane 1742 of first region 1742 and passes through center 1746 of concentric circular lines 1744. The distance of region 1742 from lenses 1636 and 1638 of system 1600 is adjusted to produce optimal focusing of beams 1644. Plane 1742 of the first region actually replaces plane 1654 of the scanned region of FIG. 17a. Thus beams 1644 are focused into scan spots 1662 which having minimal size. They are projected and are moved by lenses 1636 and 1638 onto first scanned region 1742 and along circular lines 1744. Scan spots 1662 that move along lines 1744 scan inputs 1748 of guides 1750, which are arranged along these lines.

During the scan of spots 1662 along inputs 1748 of guides 1750 the radiation of spots 1662 is coupled alternately into guides 1750, which direct them into outputs 1752 of guides 1750. The radiation is then emitted as beams 1644 toward second region 1754. Beams 1644 are projected on second region 1754 and form corresponding scan spots 1756 on that region. Accordingly the alternate coupling of spots 1662 into inputs 1748 during the scan of spots 1662 along lines 1744 of first region 1742 results in the alternate emitting of beams 1644 from outputs 1752 toward and along second region 1754. This produces a scan of spots 1756 along region 1754.

Bundle 1740 of radiation guides 1750 demonstrates, for example, the conversion of planar circular scan of spots 1662 along lines 1744 into a linear scan of spots 1756 along region 1754. It is clear that by using other arrangements of guides 1750 of bundle 1740, the planar circular scan on first scanned region 1742 can be converted into any other desired scan form. In such situations the scan forms of spots 1756 match the forms of region 1754.

In writing applications region 1754 emits multiple reflected beams 1644 from the surface under spots 1756 and directs beams 1644 toward outputs 1752 of guides 1750 in bundle 1740. Outputs 1752 of guides 1750 receive beams 1644 and guide beams 1644 into inputs 1748 of guides 1750 where they are emitted out from these inputs. The radiation emitted from inputs 1748 is directed from first surface 1742, where inputs 1748 are located, as reflected beams 1644. Rotating lenses 1636 and 1638 of system 1600 of FIG. 17a alternately collect beams 1644. The rest of the scanning and imaging process is identical to the illustrated in FIG. 17a and explained in its accompanied description and thus is not taught here.

FIG. 18—Scan Image Structure in Rotating Confocal Microscopes

FIG. 18 schematically illustrates scan image 1800 of a pinhole array, such as scan image 1662 of array 1650 in system 1600 of FIG. 17a. Image 1800 includes multiple radiation spots, corresponding to the multiple holes of a pinhole array (not shown) that serves as an object to produce image 1800. Spots 1802 are arranged in a structure suitable for use as scan image 1662 in system 1600. Image 1800 of the array 1800 is projected onto the scanned surface (not shown) in a way similar to the way that image 1662 is projected on planar surface 1654. Image 1800 moves with its radiation spots 1802 on the scanned surface in the direction indicated by arrows 1804.

Each of spots 1802 is separated from the next spot by a distance d1 in the X direction. Similarly, each spot 1802 is separated from the next spot by a distance d2 in the Y direction. Accordingly spots 1802 are arranged along diagonal lines 1806. A distance that is large enough to avoid any interference pattern of image 1800 separates beams 1802 from each other. On the other hand, the structure of diagonal lines 1806, along which spots 1802 are distributed, assures that the scan line that each spot produces when scan image 1800 moves on the scanned surface to overlap the next scan line. The overlap between adjacent lines enables the entire area of the surface to be scanned.

Accordingly, the structure of scan image 1800 fulfils two requirements needed for a rotating confocal microscope:
1. Interference between radiation spots 1802 should be avoided.
2. The entire area of the surface should be scanned.

FIG. 19*a*—Inner Drum Scan Combined with Scattered Light Collection

FIG. 19*a* schematically illustrates an inner drum scan system 1900 to be used as scanner, plotter, reading system, inspecting system, printing system, writing system, engraving system, or direct writing system.

Plate 1902 carries spinning motor (or spindle) 1904 which has two concentric axes, outer axis 1906 and inner axis 1908. Outer axis 1906 is attached to scan device 1910 and spins it around rotational axis 1920 at angular velocity $\omega 1$. Device 1910 has multiple sides 1912, 1914, 1916, and 1918. Each pair of sides of device 1910, such as the pair of sides 1912 and 1914 and the pair of sides 1916 and 1918, effectively reflect the radiation like a mirror mounted directly on rotational axis 1920 with additional vertical displacement. This property of device 1910 is achieved since all the planes that contain its sides intersect at point 1917 on axis 1920.

Inner axis 1908 is attached to rotating plate 1922 by connecting disk 1924 and spins it around axis 1920 at angular velocity $\omega 1$. Rotating plate 1922 carries lens mounts 1926 and 1928 in which rotating scan lenses 1930 and 1932 are mounted. Lenses 1930 and 1932, plate 1922, and mounts 1926 and 1928 all rotate together at angular velocity $\omega 2$, which is twice $\omega 1$.

Radiation source 1934 emits multiple beams 1936 and directs them through beam splitter 1938 toward lens 1940. Lens 1940 receives parts of beams 1936 transmitted by splitter 1938 and converts them into image 1944 containing multiple radiation spots and is projected onto pinhole array 1942. The arrangement of the spots of image 1944 perfectly match the arrangement of array 1942 and thus beams 1936 pass through the array with a minor radiation loss and continue to propagate toward lens 1946.

Lens 1946 receives beams 1936 from the pinhole array and converts object (real image) 1944 on array 1942 into parallel beams directed toward splitter 1948. Parts of beams 1936 pass through splitter 1948 toward side 1912 of device 1910. Side 1912 receives beams 1936 and reflects them toward side 1914. Side 1914 reflects them out of device 1910 as rotating scan beams 1936, which are directed toward rotating scan lens 1938. Scan beams 1936 rotate at angular velocity $\omega 2$ that equals the rotating speed of scan lens 1930. Thus the beams track rotating scan lens 1930 without any translation between them.

Lens 1930 receives rotating beams 1936 and converts them into image 1950 projected on surface 1952. Image 1950 is the image of real image 1942 that serves as an object to be imaged on surface 1952. Image 1950 is identical to the image of pinhole array 1942 on surface 1952 and moves on this surface along circular lines. Surface 1952 is in a form of at least a portion of a cylinder and each spot of image 1950 produces a circular scan line on surface 1952, which overlaps its adjacent scan line.

Rotating lenses 1930 and 1932 are distributed around axis 1920 with central angles that are twice than the central angles of the sides of the scan device. Accordingly when the scan device changes its active scan side during the scan, its other side becomes the active scan side and starts to track another scan lens.

Surface 1952 has a shape in a form of at least a portion of a cylinder. Surface 1952 can be made from a flexible plate of metal such as aluminum or can be made from some type of plastic. The scan of surface 1952 can be done with a resolution that is diffraction limited. Accordingly surface 1952 can be used for writing and reading information that is very dense. The high density of the information on surface 1952, and the high speed at which it can be written or read, makes surface 1952 suitable for replacing currently CDs, videodisks, and computer disks. Surface 1952 can also be a flexible display and flexible IC, similar to one recently developed by IBM, which is partially made of organic materials.

The system of FIG. 19*a* is divided into three groups. One group is scanned surface 1952.

The second group is the moving units which includes static drive motor 1954 that spins lead screw 1956 connected to plate 1902 by plate 1958, which has an internal screw. Guiding pins 1960 and 1962 pass through plate 1902 via lead holes 1963 and 1965. The driving unit causes plate 1902 to slide along guiding pins 1960 and 1962 while the lead screw spins.

The third group contains the rest of the system components in a configuration where they are all attached directly or indirectly to plate 1902 and can move with it as one rigid body.

Accordingly when the moving unit moves plate 1902 it actually moves all of the components of the third group and thus adds to the circular scan lines a motion in a direction along axis 1920. This additional relative motion between surface 1952 and scan plate 1922 along axis 1920 converts the line scan, which exists without this motion, into an area scan of region 1952.

An alternative way of producing an area scan is to produce relative motion between region 1952 and plate 1922 along axis 1920 in the direction of arrows 1966. Moving surface 1952 along arrows 1966 produces such relative movement.

Imaging in the scan system of FIG. 19*a* can be done in two ways. The first one is in the mode of rotating confocal microscope and the second way is by collecting scattered light.

When the system of FIG. 19*a* acquires the image of surface 1952 under image 1950, radiation is reflected from and scattered by surface 1952. Surface 1952 is under image 1950 and within the field of view of lens 1930. This lens collects the reflected radiation. Lens 1930 converts the radiation reflected from and scattered by surface 1952 into beams 1936 that are parallel and can consist of only one beam.

Reflected beams 1936 propagate along the path between region 1952 and splitter 1940. This path is similar to the optical path of incoming beams 1936 but extends in the opposite direction. Beams 1936 are directed by lens 1930 toward side 1914 of device 1910 and are reflected toward side 1912 of device 1910. Side 1912 receives beams 1936 and reflects them, during its rotation, along a fixed orientation and toward splitter 1948. Splitter 1948 receives beams 1936 and transmits parts of them toward lens 1946. Lens 1946 collects beams 1936 and converts them into image 1944 projected back on itself and on pinhole array 1942 in a way such that they match each other.

Accordingly beams 1936 pass through pinhole array 1942 with a minor radiation loss and toward lens 1940, which receives them. Lens 1940 converts beams 1936 into image 1970, which is the image of surface 1952 under image 1950. Lens 1940 projects image 1970 toward and via splitter 1939 to be formed on detector 1968. Detector 1968 may represent multiple detectors, such as a line-scan camera or a CCD camera. In any case it includes at least one detector. Detector 1968 converts image 1970 into a signal related to the position of image 1950 on surface 1952. The signals from detector 1970 are fed into an image acquisition system (not shown) that reconstructs the image of the scanned area on surface 1952.

Parts of reflected beams 1936 are directed by splitter 1948 toward lens 1972, which converts them into image 1974 of surface 1952 under image 1950 and projects image 1974 onto autofocus system 1976. System 1976 measures the focus conditions of image 1950 on surface 1952 and detects any deviation of the focus conditions from optimal. In any case where a deviation from the optimal focus is detected by system 1976, it causes supporting arm 1978, that carries lens 1946, to move into another position to put locating lens 1948 in a position that assures optimal focus. According to this control of system 1976, the optimal focus of scan image 1950 on scanned surface 1952 is maintained over the entire scan range.

When using the mode of imaging by collecting scattered radiation 1953 from surface 1952 under image 1950, radiation 1953 is collected by detectors 1980 to 1994. These detectors are mounted on arms 1996 to 2002 that are attached to plate 1900. Radiation sensitive detectors 1980–1994 are distributed around rotational axis 1920 and may represent photomultipliers, which are very sensitive detectors. The imaging of surface 1952 is acquired by an image-processing unit (not shown). This unit is fed by detectors 1980–1994 with the signals that these detectors produce. These signals represent a conversion of radiation 1953 into signals that are related to the image of surface 1952 under image 1950. This relation between the position on of image 1950 on surface 1952, and the corresponding signals produced by detectors 1980–1994, are used by the image processing unit for constructing the whole image of the scanned area on surface 1952.

When multiple scan beams 1936 illuminate surface 1952, image 1950 on surface 1952 contains multiple spots. To be able to distinguish between the different radiation beams 1953 scattered from surface 1952 under the different radiation spots of image 1950, each of beams 1936 has a different wavelength. Similarly, at least one of detectors 1980–1994 has a radiation filter suitable of transmitting only one wavelength, corresponding to the wavelength of one radiation beam included in beams 1936. In such a configuration it is possible to separate the different signals and to correlate between the position of each spot of image 1950 on surface 1952 and its corresponding signals. This correlation is used by the image processing unit to construct separately the image produced by each spot of image 1950 and to combine them into one unified image of the whole scanned area on surface 1952. This use of multiple scan beams results in a major increase of the scan speed and throughput by the scan system of FIG. 19a.

Each mode in which the scan system can be operated can be used separately, or they can be operated simultaneously. The rotating confocal microscope has the advantage of shallow depth of focus and high imaging resolution. The imaging mode where scattered light 1953 is collected has the advantage of high contrast and high sensitivity to small defects. Accordingly, the advantages of each mode of operation can be used separately or can be combined.

FIG. 19b—Conversion of Inner Drum Scan into Another Scan Form

FIG. 19b schematically illustrates bundle 2020 of radiation guides 2022 that serves as first scanned region 2024 of scan system 1900 of FIG. 19a. Region 2024 is combined into system 1900 to replace scanned surface 1952. Since the rest of the components of system 1900 remain the same, they are not shown in FIG. 19b. Only axis 1920 of system 1900 and scan beams 1936 are shown. Axis 1920 determines the relative position of bundle 2020 with respect to the rest of the components of system 1900. Beams 1936 and spots 1950 indicate the scan path along first scanned region 2024.

First region 2024 is an inner surface of a cylinder which includes circular lines 2026 having centers 2025, 2027, and 2028. Inputs 2030 of guides 2022 are arranged along circular lines 2026 in the form of at least portions of complete circles. Axis 1920 is parallel to surface 2024 of the first scanned region and passes through centers 2025–2028 of circular lines 2026.

The distance of region 2024 from lenses 1930 and 1932 of system 1900 is adjusted to produce optimal focusing of beams 1936. Plane 2024 of the first region actually replaces plane 1952 of the scanned region of FIG. 19a. Thus beams 1936 are focused into spots 1950, which have minimal size. These are projected and are moved by lenses 1930 and 1932 onto region 2024 and along circular lines 2026.

Spots 1950 that move along lines 2026 scan inputs 2030 of guides 2022 that are arranged along these lines. During the scan of spots 1950 along inputs 2030 of guides 2022, the radiation of spots 1950 is coupled alternately into guides 2022 and is guided by guides 2022 into outputs 2032 of guides 2022. From outputs 2032 the radiation is emitted as beams 1936 directed toward region 2034. Beams 1936 projected on region 2034 form corresponding spots 2036 on that region. Accordingly the alternate coupling of spots 1950 into inputs 2030 during the scan of spots 1950 along lines 2026 of first region 2024 results in alternate emitting of beams 1936 from outputs 2032 toward and along second region 2034 and thus produces the scan of spots 2036 along region 2034.

Bundle 2020 of radiation guides 2022 indicates, inter alia, the conversion of inner drum scans of spots 1950 along lines 2026 into a linear scan of spots 2036 along region 2034. By using other arrangements of guides 2022 of bundle 2020, the inner drum scan on first region 2024 can be converted into any other desired scan form. In such situations the scan forms of spots 1950 matches the forms of second surface 2034.

Some of guides 2022 are illustrated in broken lines to indicate that bundle 2020 of guides 2022 may include more guides than actually shown in FIG. 19b.

In writing applications second region 2034 emits multiple reflected beams 1936 from the surface under radiation spots 2036 and directs beams 1936 toward outputs 2032 of guides 2022 in bundle 2020. Outputs 2032 of guides 2022 receive beams 1936 and guide the radiation of beams 1936 into inputs 2030 of guides 2022 where it is emitted out. This radiation is directed from first surface 2024, where inputs 2030 are located, as reflected beams 1936. Rotating lenses 1930 and 1932 of system 1900 of FIG. 19a alternately collect beams 1936. The rest of the scanning and imaging process is identical to the illustrated in FIG. 19a and explained in its accompanied description and thus is not taught here.

FIG. 20—Scan Device and Scan Lenses Rotating at Same Speed

FIG. 20 schematically illustrates a planar scan system 2100 in which scan device 2102 rotates with scanning and rotating lens 2104 at the same angular velocity ω1 (ω1=ω2) around axis 2116. Radiation source 2106 emits a single radiation beam 2108 toward single pinhole 2110. Pinhole 2110 transmits and directs beam 2108 through lens 2109 toward reflector 2112. Reflector 2112 reflects beam 2108 toward splitter 2114 and along axis 2116 around which scan device 2102 spins and scan lens 2104 rotates. Splitter 2114 receives beam 2108 and transmits part of it through tube 2118 toward scan device 2102. Beam 2108 is reflected by scan device 2102 as beam 2108 through opening 2119 in tube 2118 and toward rotating reflector prism 2120. Prism 2120 is mounted on rotating support plate 2122. This plate also carries scan device 2102, reflector prism 2120, and scan lens 2104 and rotates with them at angular velocity ω1. Reflector 2120 reflects and directs beam 2108 toward rotating scan lens 2104, which receives beam 2108 and focuses it into spot 2126 projected onto scanned surface 2124.

Motor (or spindle) 2128 has an axis 2132 and is attached to plate 2130. Its axle 2132 spins wheel 2134. Tube 2118 is connected to wheel 2136 that is in turn coupled to wheel 2134. Wheel 2134 spins the tube by driving belt 2138 at angular velocity ω1. Accordingly, tube 2118, mounted in ball bearings 2140 attached to plate 2130, also spins with its wheel 2136 and its opening 2119 at angular velocity ω1. Tube 2118, attached to supporting plate 2122, rotates this plate with device 2102, reflector 2120, and lens 2104 that it carries at angular velocity ω1.

For any rotational position of tube 2118, the relative position between plate 2122, scan device 2102, reflector 2120, scan lens 2104, and axis 2116 remains the same. Beam 2108 propagates along axis 2116 and is reflected by scan device 2102 as beam 2108 that rotates at angular velocity ω1. Beam 2108 has, for any scan position, the same relative angle relative to axis 2116. Accordingly, for any scan position, beam 2108, reflector 2120, scan lens 2104, and axis 2116 all have the same relative position between each other and especially between them and axis 2116. Thus beam 2108 tracks reflector 2120 and lens 2104 with no translation between them.

Radiation spot 2126 moves on scanned surface 2124 along circular lines. The line scan of spot 2126 on surface 2124 is converted to an area scan by introducing relative movement between surface 2124 and plate 2122 normal to axis 2116 and along arrows 2142 in the X direction. Such movement can be introduced by moving translator 2144 that carries surface 2124 and moves together with it along arrows 2142.

Alternatively, such relative movement can be produced by moving plate 2130 normal to axis 2116 and in the direction indicated by arrows 2142. Plate 2130 carries all the components of the scan system, as schematically illustrated by FIG. 20, except for surface 2124 and translator 2144. Accordingly, plate 2130, translator 2144, or moving both of them, will produce the desired relative movement between surface 2124 and plate 2122 for producing an area scan of surface 2124.

Spot 2126 can be used for writing, engraving, and photolithographic applications when modulating or switching the intensity of beam 2108 by source 2106. Source 2106 can be a gas tube or diode laser whose emitting intensity is controlled by a controller (not shown).

When spot 2126 illuminates scan surface 2124, the imaging of scanned surface 2124 under moving spot 2126 can be acquired in two ways similar to that illustrated in FIGS. 17 and 19 and as explained above.

The first imaging technique is done by collecting scattered light 2146 from spot 2126 that is scattered by illuminated surface 2124, under spot 2126, toward detectors 2148 to 2154. Detectors 2148–2154 can represent photomultipliers which collect scattered radiation 2146 and convert it into signals to be fed into an image acquisition system (not shown) to produce the image of scanned surface 2124.

According to the other technique, lens 2104 collects the radiation reflected from surface 2124 under spot 2126 and converts it into reflected beam 2108. Beam 2108 propagates back along the path between splitter 2114 and rotating lens 2104 in the same way as incoming beam 2108 does, but in the opposite direction. From splitter 2114 beam 2108 propagates toward pinhole 2156, which transmits reflected beam 2108 through lens 2157 toward radiation sensitive detector 2158. Detector 2158 can be, for example, a line scan or a CCD camera that converts beam 2108 into the image of the scanned area under illuminating spot 2126 on surface 2124. In this imaging mode the system of FIG. 20 is actually operates as a rotating confocal microscope. When removing pinholes 2110 and 2156, the system operates as a rotational conventional microscope.

The assembly of detector 2158 may also include an autofocus system (not shown) to maintain the proper focus conditions in which the size of spot 2126 on surface 2124 is minimal. Controlling the distance between lens 2104 and surface 2124 maintains the proper focus conditions. This distance is controlled by the autofocus system, which produces a control signal to feed translator 2144 trough leads 2160. According to the control signal, translator 2144 moves along arrows 2162 in the Y direction and thus moves surface 2124 with it to position surface 2124 at the proper distance to produce optimal focus conditions of spot 2126 on surface 2124.

Alternatively, moving plate 2130 along arrows 2162 in the Y direction can control the distance between lens 2104 and surface 2124.The focus of spot 2126 on surface 2124 can be controlled by moving lens 2109, which changes its distance from pinhole 2110 according to this movement. Lens 2109 is attached to arm 2164 and is moved by it. The motion of translator 1266 along arrows 2165 is controlled by the signals produced by the autofocus system. These signals are fed to translator 1266 by leads 1268. Accordingly, the autofocus system controls the position of lens 2109 in the direction indicated by arrows 2167 and thus controls the focus of spot 2126 on surface 2124 to maintain them optimal over the entire scan.

The scan system of FIG. 20 exhibits an advantage since scan lens 2104 and device 2102 both rotate at the same speed (ω1=ω2) and can be attached to plate 2122. Unlike the requirements for the systems in the previous drawings in which ω2=2ω1, in the system of FIG. 20 there is no need for different rotating units for driving scan device 2102 and scan lens 2104 at different speeds. There is also no need to maintain those speeds synchronized and at a ratio of 1:2.

FIG. 21—Unique Geometrical Point of Conventional Polygon

The system of FIG. 21 is combines the advantages of a single angular velocity (ω1=ω2) with the ability to scan with multiple beams.

Conventional polygonal mirrors 2200 have a rotational axis 2202 and six off-axis outside surfaces 2204, 2206, 2208, 2210, 2212, and 2214, which serve as its facets. Each of surfaces 2204 to 2214 2200 has its corresponding lens outside of the lens group comprising lenses 2216, 2218, 2210, 2222, 2224, and 2226. Each center of lenses 2216–2226 is located on one of normal bisector lines 2232, 2234, 2236, 2238, 2240, and 2242 of its corresponding facet included in lenses 2216–2226. The distances of centers 2244, 2246, 2248, 2250, 2252, and 2254 from their corresponding facets along normal bisector lines 2232–2242 of these facets is equal to the distance of these facets from rotational axis 2202 along the same normal bisector lines passing through axis 2202. For example, distance 2228 of center 2246 of lens 2218 from facet 2206 equals the distance 2230 of side 2206 from axis 2202 when distances 2228 and 2230 are both measured along normal bisector line 2234.

From basic optical rules it is clear that centers 2224–2254 of lenses 2216–2226 are positioned in "Unique Geometrical Points" (UGP). The UGP is a point to which the central axis of any beam reflected by a polygon facet is directed to and passes through after being directed toward axis 2202. For example, central axes 2260 and 2262 of beams 2256 and 2258, respectively, reflected by facet 2206, are directed to and pass through UGP 2246 after being oriented toward axis 2202. Axes 2260 and 2262 of beams 2256 and 2258, respectively, that are reflected from facet 2206 of polygon 2200 pass through UGP 2246, which it is also the center 2246 of lens 2218. Thus their orientation is not affected by lens 2218.

Accordingly beam 2256 is focused by lens 2218 into spot 2264, which is projected onto intersection point 2264 between axis 2260 and focal plane 2268 of lens 2218. Similarly, beam 2258 is focused by lens 2218 into spot 2266 projected onto point 2266 between axis 2262 and focal plane 2268 of lens 2218. In the same way, if the central axis of another beam, reflected by facet 2206, were aligned along normal bisector 2234, this beam would be focused by lens 2218 into spot 2270 projected onto point 2270. Point 2270 is the intersection between line 2234 and focal plane 2268 of lens 2218.

Beams 2256 and 2258 are also aligned along different positions of the radii of circle 2272. (Axis 2202 passes through the center of circle 2272.) Beams 2256 and 2258 are shown in different positions, but they actually represent different positions of the same beam relative to polygon 2200 and lenses 2218–2226. The same relative positions still exist in a real scan configuration when polygon 2000 rotates together with all lenses 2216–2226 at the same angular velocity ω1 and beams 2256 and 2258 are a single static beam directed toward axis 2202.

Accordingly, in a real scan configuration, beams such as beam 2256, reflected from sides 2204–2214 of polygon 2000, track the UGP and thus track lenses 2216–2226 that rotate with polygon 2000 at the same rotational speed ω1. The central axes of the beams that track the UGP also track the rotating lenses, which have the UGPs at their centers, without relative translation between these lenses and the central axes of the tracking beams. In this case the focal planes of lenses 2216–2226, such as focal plane 2268 of lens 2218, also rotate at angular velocity ω1. Radiation spots 2264, 2266, and 2270 on focal plane 2268 rotate with this plane at angular velocity ω1. There is an additional movement D on plane 2268 that is related to the rotational angle θ of polygon 2000 and to the focal length f of lens 2218 and is given by:

$$D = \theta f$$

D is measured relative to a reference point on plane 2268. This reference point is indicated by the position of spot 2270 on plane 2268. Reference point 2270 on plane 2268 rotates, with this plane, with radius r around axis 2202. Accordingly the distance R of the scan spots, such as spots 2264 and 2266 from axis 2202, is not constant and it is a function of the scan angle ω. The distance R=R(θ) is given by:

$$R(\theta) = [r^2 + D^2]^{1/2} = [r^2 + (f\theta)^2]^{1/2}$$

The dependency of θ of the distance R of the scanned spot from axis 2202 makes the configuration illustrated in FIG. 21 unsuitable for use for inner drum scanning, in which R must be constant over the entire scan range.

On the other hand this configuration allows the scan to be produced with multiple beams when the scan device (polygon 2000) and lenses 2216–2226 rotate at the same angular velocity ω1. In spite of the fact that the configuration of FIG. 21 is unsuitable for inner drum scanning, it still has two major advantages. The first is the ability to scan when the scan device and the lenses rotate at the same speed. The second is that the scan is conducted when the beams track the lenses without relative translation between them.

These two advantages make this configuration very attractive for use in applications other than inner drum scanning, such as a planar scan. Accordingly the configuration of FIG. 21 is modified to produce a planar scan as explained below and illustrated in the next drawings.

FIG. 22a—Planar Scan Using Scan Device, Rotating Mirror, and Scan Lens Rotating at Same Speed FIG. 22 is a side view of planar scan configuration 2300, including rotating scan device (polygon) 2302, rotating reflector 2304, and rotating scan lens 2306 that all rotate at the same speed. Configuration 2300 is similar to configuration 2200 of FIG. 21, but is modified by adding rotating reflector 2304 to enable a planar scan. Beam 2310 is oriented toward rotational axis 2308. Beam 2310 passes through beam splitter 2304 and hits side 2312 of device 2302. Side 2312 reflects beam 2310 as scan beam 2310 that is directed toward beam splitter 2304. If a lens, such as lens 2314, were placed at a UGP, i.e., at a distance S from side 2312 equal to the distance of side 2312 from axis 2308, the parts of scan beam 2310 that pass back through beam splitter 2304 will produce scan radiation spot 2316.

The configuration that produces scan spot 2316 is identical to configuration 2200. In configuration 2300 splitter 2304 serves as rotating mirror 2304 and the reflected part of beam 2310 reflected by beam splitter 2304 is used for scanning. Rotating splitter 2304 folds beam 2310 downward and images the position of the UGP and lens 2314 as they should be placed (in configuration 2200 of FIG. 21) into another position where lens 2306 is now positioned according to configuration 2300 of FIG. 22a. Lens 2306 with the UGP in its center is located at a distance S1 from beam splitter 2304 and beam splitter 2304 is at a distance S2 from side 2312 when S1 and S2 satisfy the following equation:

$$S1 + S2 = S$$

Since the center of lens 2306 coincides with the UGP, beam 2310 tracks the center of lens 2306 without translation between them over the entire scan. Beam 2310 that tracks lens 2306 is converted into scan spot 2318 on planar surface 2320. Since device 2302, splitter 2304, and lens 2306 are all rotate together as a rigid body around axis 2308, the distance between lens 2306 and scanned surface 2320 is fixed over the entire scan. The distance between lens 2306 and surface 2320 is adjusted to contain the focal plane of lens 2306 and thus it remains all over the scan. In configuration 2300, rotating lens 2306 causes radiation spot 2318 to move on planar surface 2320 while maintaining optimal focussing conditions over the entire scan.

Accordingly configuration 2300 demonstrates the principle of a planar scan system with the following advantages:

Optimal focus conditions are maintained over the entire scan range.

The scan lens can rotate at the same speed as the scan device.

The scan beam tracks the center of the scan lens without relative translation between them.

Scan device 2302 may suffer from some production tolerances, such as facets that are tilted at different angles and a tilted mounting angle between the symmetry axis of device 2302 and rotational axis 2308. Such tolerances may cause spot 2318 to have a different scan path on scanned surface 2320; this is known as wobble and jitter.

FIG. 22b—Planar Scan with Improved Scan Device

FIG. 22b illustrates a configuration similar to configuration 2300 of FIG. 22a. This embodiment has an improved scan device that does not produce the unwanted wobble and jitter.

FIG. 22b is a side view of planar scan configuration 2400. It has an improved rotating scanned device 2402. Each side, such as sides 2404 and 2406 of device 2402, consists of two facets, such as facets 2408 and 2410 of side 2404 oriented at right angles to each other, or facets 2412 and 2414 of side 2406, oriented at right angles.

Facets 2408 and 2410 intersect along a line that contains point 2416. Similarly, facets 2412 and 2414 intersect along a line that contains point 2418. Facets 2408 and 2410 behave effectively like a mirror with an additional vertical displacement that passes through point 2416. Its plane 2422 is parallel to rotational axis 2420. Facets 2412 and 2414 behave effectively like a mirror with an additional vertical displacement that passes through point 2418; its plane 2424 is parallel to rotational axis 2420.

Effective reflecting planes 2422 and 2424 remain parallel to rotational axis 2420, regardless of the tilt deviations of the facets of device 2402 and its tilted mounting angle. This is true as long as the following conditions are satisfied: The right angle between facets 2408 and 2410 and facets 2412 and 2414 is maintained and impinging radiation beam 2426 is normal to axis 2420.

Accordingly, when the above conditions are satisfied (this can be achieved easily), device 2402 produces a scan that is free of unwanted wobble and jitter.

Beam 2428 hits facet 2408 of side 2404 and is reflected toward facet 2410. Facet 2410 receives beam 2428 and reflects it toward splitter 2430 as scan beam 2428. If the part transmitted by splitter 2430 were used for the scan, a lens such as lens 2432 would be placed at a distance S from effective reflecting plane 2422. Distance S is equal to the distances of reflecting planes 2422 and 2424 from rotational axis 2420 and thus the center of lens 2428 coincides with the UGP.

If a lens such as lens 2432 were placed at the UGP, the part of scan beam 2428 that passes through beam splitter 2304 would produce scan spot 2434. The configuration that produces spot 2434 is identical to configuration 2200. In configuration 2400 splitter 2430 serves as rotating mirror 2430 and the reflected part of beam 2428 reflected by splitter 2430 is used for the scan.

Splitter 2430 folds scan beam 2428 downward and images the position of UGP and lens 2432 as they should be placed (in configuration 2200 of FIG. 21) into another position where lens 2436 is now positioned according to configuration 2400 of FIG. 22b. In this configuration lens 2436 with the UGP in its center is located at a distance S1 from splitter 2430 and splitter 2430 is at a distance S2 from reflecting plane 2422 when S1 and S2 satisfy the equation:

$$S1+S2=S$$

Since the center of lens 2436 coincides with the UGP it is clear that beam 2428 tracks the center of lens 2436 without translation between them over the entire scan. Beam 2428 tracks lens 2436 and is converted into scan spot 2438 on surface 2440. Device 2402, splitter 2430, and lens 2436 are all rotate together as a rigid body around axis 2420. Thus the distance between lens 2436 and surface 2440 is fixed over the entire scan. The distance between lens 2436 and surface 2440 is adjusted to contain the focal plane of lens 2436 and thus it remains constant over the entire scan. In configuration 2400, lens 2436 causes spot 2438 to move on planar surface 2440 while maintaining optimal focus conditions over the entire scan.

Accordingly configuration 2400 demonstrates a system for planar scan system with the following advantages:

Optimal focussing conditions are maintained over the entire scan range.

The scan lens rotates at the same speed as the scan device.

The scan beam tracks the center of the scan lens without relative translation between the center of the lens and the center of the scan beams.

The planar scan is free of wobble and jitter even when the scan device suffers from production and mounting tolerances.

Scanning can be done with multiple beams.

Scanning can be done with a scan device having multiple sides.

FIG. 23—Planar Scan with Multiple Beams and Scan Device Rotating with Scan Lenses at Same Rotational Speed FIG. 23 is a side view of planar scan system 2500, including improved scan device 2502 and scan lenses 2504 and 2506, that all rotate at the same angular velocity. Side 2508 of device 2502 includes two facets 2510 and 2512 oriented at right angles. They intersect along a line that contains point 2514.

Side 2516 of device 2502 includes two facets 2518 and 2520 oriented at right angles and intersect along a line that contains point 2522. Points 2514 and 2522 are located on reflecting planes 2524 and 2526, respectively, that are oriented parallel to axis 2528.

Scan system 2500 is designed according to configuration 2400 of FIG. 22b and thus the center of rotating scan lenses 2504 and 2506 coincides with the UGP. This means that the distance of plane 2524 from rotational axis 2528 is equal to the sum of the distances oriented along the path of beams 2534 from plane 2514 to reflector 2530, and from this reflector to lens 2504.

When side 2516 is switched to be the scan side of device 2502, beams 2534 are reflected from this side. The distance of plane 2526 from axis 2528 is equal to the sum of the distances oriented along the optical path of beams 2534 from plane 2526 to reflector 2532 and from this reflector to lens 2506.

Plate 2536 carries all components of scan system 2500 that are attached to it directly or indirectly, except for scanned surface 2538 mounted on translator 2540. Motor 2542, attached to plate 2536, spins axis 2544 together with its wheel 2546. Wheel 2546 is coupled to wheel 2548 and spins it by driving belt 2550. Wheel 2548, attached to axis 2552, causes axis 2548 to spin with it. One edge of axis 2552 is mounted to plate 2536 by ball bearings 2554 which support axis 2552 and allow axis 2552 to spin freely with scan device 2502 attached to axis 2552 on its other edge. Plate 2556 attached to device 2502 carries reflector prisms 2530 and 2532 and lenses 2504 and 2506 and all rotate at the same angular velocity.

Radiation source 2558 emits multiple beams 2534 toward pinhole arrays 2560 that receive beams 2534 and transmit them toward lens 2562. Lens 2562 collects beams 2534 and directs them toward reflector 2564. Reflector 2564 reflects the beams toward rotating facet 2510 of side 2508 of device 2502. Facet 2510 reflects beams 2534 toward facet 2512 and are then reflected from device 2502 as rotating beams 2534 that are directed toward rotating reflector prism 2530. Reflector 2530 receives beams 2534 and reflects them toward the UGP at the center of lens 2504. Beams 2534 track the UGP, at the center of lens 2504, without translation between beams 2534 and the UGP.

Lens 2504 converts beams 2534 into multiple spots 2566 that are actually the image of pinhole array 2560 on surface 2538. Rotating lens 2504 causes each of spots 2566 to move on surface 2538 along scan lines. Each scan line partially overlaps its adjacent scan lines.

During the rotation of scan device 2502, beams 2534 alternatively hit one of its sides 2508 or 2516. Each side, such as sides 2508 and 2516, serves in turn as the active scan side with its corresponding scan lens, such as lenses 2530 and 2532.

When relative movement is introduced between scanned surface 2538 and rotating plate 2556, in the X direction along arrows 2568, the line scan of spots 2566 (produced without this relative movement) is converted into an area scan of surface 2538. This relative movement between surface 2538 and plate 2556 can be produced, either by moving translator 2540 with surface 2538 on top of it, in the direction indicated by arrows 2568, or by moving plate 2536, with all the component attached to it, in direction 2572.

The above description explains how system 2500 operates as a writing, engraving, photolithograpic, or illuminating system.

Radiation source 2558 can be a laser source or a Light Emitting Diode (LED) source whose intensity can be modulated or switched by a controller (not shown) to control the information written on surface 2538. The system can also be operated in a rotating confocal microscope when using pinhole array 2560. It can also be operated as a conventional rotating microscope when array 2560 is removed. Multiple radiation sources can be used (not shown to avoid a dense drawing). When multiple sources are used, they may be distributed around axis 2528 to irradiate at least one side of scan device 2502.

The illumination of surface 2538 by spots 2566 of the image of array 2560 on surface 2538, and the imaging of the scanned area on surface 2538 under spots 2566, can be done in two ways: by collecting scattered light using multiple radiation detectors, such as photomultipliers, or by image acquisition using cameras, including multiple radiation detectors such as line-scan cameras or CCD cameras.

Radiation 2574 reflected and scattered from surface 2538, under scan spots 2566, is collected by detectors 2576 to 2582 attached to plate 2536 by bars 2584 and 2586. Detectors 2576 to 2582 can be photomultiplier detectors that convert radiation 2574 into signals corresponding to the scan position of spots 2566 on surface 2538. These signals are fed to an image processing system (not shown) that reconstructs the image of the scanned area.

To distinguish between the information that each of spots 2566 produces, a different wavelength may be used for each of beams 2534. In addition detectors 2574 to 2582 may include multiple filters where at least one is designed to transmits at least one of the wavelengths of one of beams 1534.

The other imaging mode includes multiple imaging radiation detectors 2588, such as a line scan camera, a Time Delay Integration (TDI) camera, or a CCD (Charge-Coupled Device) camera. The radiation scattered and reflected form surface 2538 under scan spots 2566 is collected by lens 2504 and is converted into reflected beams 2534 directed toward reflector 2530.

Reflected beams 2534 propagate along a path similar to the path of incoming beams 2534 from splitter 2536 to lens 2504, but in the opposite direction. Reflector 2530 receives beams 2534 and reflects them toward facet 2512 of side 2508 of device 2502. Beams 2534 are reflected by facet 2512 to facet 2510 that reflects them out from device 2502 toward splitter 2564 along a fixed orientation while device 2502 is rotating.

Splitter 2564 transmits parts of beams 2534 and directs them toward lens 2590. Lens 2590 converts beams 2534 into spots that form image 2592 on surface 2538. Image 2592 is projected by lens 2590 onto pinhole array 2594 in a way that the spot size of image 2592 and their arrangement matches the size and the arrangement of the holes in array 2594. Accordingly array 2594 transmits beams 2534 without loss and directs them toward detectors 2588.

Detector 2588 collects beams 2534 from image 2594 on array 2594 and converts them into signals corresponding to the scan position of spots 2566 on surface 2538. These signals are fed to an image processing system (not shown) that constructs the image of the scanned area under spots 2566 on surface 2538.

The assembly of detectors 2588 includes an autofocus system which insures that the focus of spots 2566 is optimal, i.e., the sizes of spots 2566 on surface 2538 are minimal over the entire scan range. The autofocus system of assembly 2588 produces signals which are transferred by leads 2597 and 2599 to control either the movement of translator 2540 in a direction along arrows 2598 or the movement of translator 2596 in a direction parallel to arrows 2598 and along arrows 2600.

The controlled movement of translator 2540 adjusts the distance between lens 2504 and surface 2538 to produce the desired focus of spots 2566 on surface 2538. Similarly, controlling the movement of plate 2536 adjusts the distance between lens 2504 and surface 2538 to produce the desired focus of spots 2566 on surface 2538.

The controlled movement of translator 2696 causes lens 2562 to move into a position that adjusts the distance between lens 2562 and array 2560. This produces the desired optimal focus of spots 2566 on surface 2538.

Multiple sources 2604, such as lasers or LEDs, are attached to plate 2536. Beams 2606 emitted from sources 2604 are guided by guides 2608, such as optical fibers, and are coupled by these guides to the holes of array 2610. Beams 2606 pass through array 2610 and propagate to produce a scan path. This path is not shown to avoiding crowding. Sources 1604, guides 2608, and array 2610 are shown mainly to demonstrate the use of optical fibers 2608 for producing an optical coupling between sources 2604 and the holes of array 2610.

In FIG. 23 and in the other figures that illustrate planar scan systems, the scanned regions are illustrated arbitrarily as being located under the scan lenses. This orientation is arbitrary and all these drawings can also represent other orientations. Especially, it can represent and orientation where the scan systems are rotated at 180 degrees with respect to the illustrated. In such situations, the scanned region is positioned above the rotating lenses to avoid its contamination by parts that may fall from the moving parts of the scan systems as may occur when these lenses are above the scanned region. When the scanned regions are above the scan lenses the stages that move the scanned regions for producing area scans may include vacuum chucks or holding clips to hold these regions.

FIGS. 24a and 24b—Scanning Systems Including Rotating Optical System with Additional Configuration FIG. 24a illustrates scanning system 1301' with a slightly different configuration of the rotating optical system, including at least one lens and at least one reflector. FIG. 24a is provided mainly to demonstrate the option of using the lenses and the reflectors in the rotating optical system in the reverse order.

System 1301' of FIG. 24a is identical to system 1300 of FIG. 14 except for one minor change: The position of rotating focusing lenses 1316 and 1318 in the system of FIG. 14 is changed from a position after reflectors 1312 and 1314 to a position before these reflectors as lenses 1317 and 1319, which are mounted on posts 1315 and 1321. These are attached to rotating plate 1310 before reflectors 1312 and 1314. Accordingly the same numeral is used for the same components in both of the drawings, in FIGS. 14 and 24a. Similarly, it is clear that the description for scanning system 1300 of FIG. 14 still applies to scan system 1301' of FIG. 24a, except for reversing the order between the lenses and the reflectors in the rotating optical systems mounted on rotating plate 1310 of systems 1300 and 1301. For the above reason the description of system 1301' is not repeated here.

Lenses 1317 and 1319 focus radiation beam 1322 via reflectors 1312 and 1314 respectively into radiation spot 1334 on surface 1336. Thus lenses 1317 and 1319 cannot be positioned very close to surface 1336. Lenses 1316 and 1318 of system 1300 of FIG. 14 focus beam 1322 directly onto surface 1336 and can be very close to it. Accordingly lenses 1317 and 1319 must have a focal length that is longer than the focal length of lenses 1316 and 1318, resulting in a resolution that is inferior in system 1301 with comparison to the resolution of system 1300.

When a diffraction-limited resolution is not the main concern and lower scanning resolutions are tolerable, the design of the system can be changed into a simpler one as shown in FIG. 24b.

FIG. 24b illustrates a scanning system 1303 that is identical to scanning system 1301', except for removing lenses 1317 and 1319 with their corresponding mounting posts 1315 and 1321 from the rotating optical system. Accordingly the same numerals are used for the same components of both systems. For a similar reason, the description for system 1301', is actually the description for system 1300 of FIG. 14, except for removing lenses 1316 and 1318. This description thus still holds for system 1303 and is not repeated here.

In scanning system 1303, lens 1324 is moved by arm 1354 into a position that differs from its position in system 1303. The position of lens 1324 assures optimal focusing condition of radiation spot 1334 on surface 1336 in both of systems, 1301 and 1303. Lens 1324 has different positions in systems 1301 and 1303 because it produces different functions in these systems. In system 1301, lens 1324 converts radiation beam 1322 emitted from radiation source 1320 into a collimated beam. Collimated beam 1322 is reflected later from scan device 1308 to be focused by rotating focusing lenses 1317 and 1319 into spot 1334 directed by reflectors 1312 and 1314 onto surface 1336. On the other hand, in system 1303 lens 1324 converts radiation beam 1322 emitted from radiation source 1320 into a focusing beam. Focusing beam 1322 is reflected later from scan device 1308 to produce a directly focused radiation spot 1334 directed by reflectors 1312 and 1314 onto scanned surface 1336.

Accordingly, while the distance of lens 1324 from source 1320 in system 1301 is adjusted to convert beam 1322 into a collimated beam, this distance in system 1303 is adjusted to produce a minimal size of spot 1334 on surface 1336.

The optical focusing distance in system 1303 from lens 1324 to surface 1336 via facets 1326 and 1330 of scan device 1308 and reflector 1312 is much longer from the optical focusing distances in systems 1300 and 1301 from lens 1316 to surface 1336 and from lens 1317 to surface 1336 via reflector 1312, respectively.

The long optical focusing distance in system 1303 causes degradation in the scan resolution of system 1303 in comparison to the resolutions of systems 1300 and 1301. On the other hand, the design of system 1303 is simpler than the design of systems 1300 and 1301 because it does not require rotating focusing lenses.

When a relatively low scan resolution, such as the resolution of system 1303, is acceptable, the design of the system can be even far simpler. In system 1303 the rotating optical system includes only rotating reflectors 1312 and 1314 that are tracked by scanning/tracking beam 1322. For any scan position the relative position between tracked reflectors 1312 and 1314 and tracking beam 1322 is the same. In addition, the rotational course of each reflector 1312 or 1314 is along a virtual surface of a conelike shape whose peak point is on the rotational axis of scan device 1308 and its base is normal to that rotational axis. Accordingly rotating reflectors 1312 and 1314 can be replaced by a static reflector having a rotational symmetry in the form of at least a portion of a surface of a conelike shape whose peak is on the rotational axis of scan device 1308 and whose base is normal to that axis.

In such a design, the rotational symmetry of rotating reflectors 1312 and 1314 and their relative position with respect to tracking beam 1322 are maintained over the entire scan range by the above static reflector that replaces reflectors 1312 and 1314. Such a reflector can be operated in a rotating mode or in a static mode.

The above described reflector in the form of at least a portion of a surface of a conelike shape has a different focusing effect on the different axial orientations of beam 1322, resulting in astigmatic distortions of spot 1334 on surface 1336. A planar scanning system including a static reflector with no astigmatic distortions is illustrated in FIG. 25.

FIG. 25—Scanning System Including Static Reflector Having Rotational Symmetry

FIG. 25 illustrates planar scanning system 3000 having rotatable optical system including reflector 3002. In principle, rotatable reflector 3002 can be rotated around rotational axis 3004, but since it has a rotational symmetry around axis 3004, there will be no difference if it is rotating or it is static. For simplicity, system 3000 is illustrated with reflector 3002 in a static position.

Radiation source 3006 emits multiple beams 3008 toward beam splitter 3010. Beam splitter 3010 receives beams 3008 and transmits part of them toward lens 3012. Lens 3012 receives the part of beams 3008 3010, converts them into focusing beams and directs them toward facet 3014 of rotating scan device 3016. Beams 3008 are reflected from facet 3014 toward facet 3018 of device 3016 and are reflected there out from device 3016 as scanning beams 3008 rotating around axis 3004 and directed toward reflector 3002. Reflector 3002 has a reflecting surface in a form of at least a portion of a sphere 3020 whose diameter lies along rotational axis 3004. Reflector 3002 receives beams 3008 at a point 3022 where radius R creates angle θ with axis 3004. Accordingly beams 3008 are also reflected from reflector 3002 at angle θ with respect to R, which is the normal to the surface of reflector 3002. Thus scanning beams 3008 are reflected from reflector 3002, while rotating around axis 3004 at an angle 2(90−θ) relative to their orientation before hitting reflector 3002.

In the specific design illustrated in FIG. 25, θ=45° and thus reflector 3002 directs scanning beams 3008, during their rotation around axis 3004, toward surface 3024 and along an orientation normal to surface 3024. Beams 3008 are projected onto surface 3024 by reflector 3002 to form focused radiation spots 3026 on surface 3024. The optical distance from lens 3012 to surface 3024 via device 3016 and reflector 3002 and the distance between source 3006 and lens 3012 are adjusted to produce optimal focusing conditions in which the size of spots 3026 on surface 3024 is minimal. Both lens 3012 and reflector 3002, when the focusing of lens 3012 is dominant, produce focusing of beams 3008 into focused spots 3026 on surface 3024.

Since reflector 3002 is at least a portion of sphere 3020, it has the same curvature radius in any direction for any reflection point on it. Thus reflector 3002 produces the same focusing effect on beams 3008 along all their axes and all over the scan range, resulting in the elimination of astigmatic distortions, as would exist if reflector 3002 had at least a portion of a conelike shape.

Focused spots 3026 move on surface 3024 during the scan to produce a line scan. Relative movement between surface 3024 and system 3000 achieves conversion of the line scan into an area scan along arrows 3028.

System 3000 can also be operated as reading system when the reflected radiation propagates as reflected beams 3008 in the reverse direction, opposite to the original propagation direction of beams 3008. Reflected beams 3008 are reflected from spots 3026 on surface 3024 and propagate, via reflector 3002 and rotating scan device 3016, and directed by rotating device 3016, along a fixed orientation and toward beam splitter 3010. Part of reflected beams 3008 is directed by splitter 3010 toward a radiation sensitive detector (not shown), which reads the information from scanned surface 3024.

FIG. 26—Scanning System Including Static Lens Having Rotational Symmetry

FIG. 26 illustrates inner drum scanning system 3100 having rotatable optical system, including rotatable lens 3102. Since lens 3102 has a rotational symmetry around rotational axis 3104, it does not make any difference if lens 3102 rotates or not around that axis. The design that includes lens 3102 in a static position is much simpler and is illustrated in FIG. 26. However lens 3102 may also be arranged to rotate.

Radiation source 3106 emits multiple beams 3108 toward beam splitter 3110. Splitter 3110 reflects part of beams 3108 toward lens 3112. Lens 3112 receives the part of beams 3108 reflected by splitter 3110 and directs beams 3108 toward facet 3114 of rotating device 3116. Beams 3108 are reflected by facet 3114 toward facet 3118 of rotating device 3116 and are then reflected as scanning beams rotating around rotational axis 3104 and directed toward static lens 3102. Lens 3102 is a portion of a sphere 3120 that receives scanning beams 3108 and directs them towards inner surface 3122 of drum 3124. Lens 3102 has a torroid-like shape and thus has a defocusing effect on beams 3108 that are projected on surface 3122 as focused radiation spots 3126. Beams 3108 emitted from source 3106 are focused on surface 3122 by both lens 3112 and lens 3102.

Spots 3126 move on surface 3122 and produce a line scan. Introducing relative movement between system 3100 and drum 3124 along arrows 3128 converts the line scan into an area scan of surface 3122.

System 3100 operates as reading system when reflected beams 3108 are collected by lens 3102 from spots 3126 on surface 3122. Reflected beams 3108 are directed by lens 3102 toward splitter 3110 via rotating device 3116 and lens 3112 along the same optical path of original beams 3108, but in the opposite direction. A part of reflected beams 3108 passes through splitter 3110 and is projected onto radiation sensitive detector 3130. Detector 3130 receives reflected beams 3108 and reads the information from scanned surface 3122.

FIG. 27—Orientation Preservation of Scanning Spots

The upper part of FIG. 27 shows device 3200 at one scan position and its lower part illustrates another scan position. The two different scan positions of scan device 3200 are illustrated in the same figure to emphasize the orientation preservation of scanning spots 3210, regardless what is the scan position of device 3200.

FIG. 27 illustrates scan device 3200 in two different scan positions. Lens 3202 directs beams 3204 toward facet 3206 of rotating scan device 3200. Device 3200 rotates around rotational axis 3216. Beams 3204 are reflected from facet 3206 toward facet 3208 of device 3200 and are then reflected as rotating scanning beams 3204. Scanning beams 3204 are focused into scanning spots 3210 along line 3212 that rotates during the scan along circle 3214.

As illustrated and can be seen on the upper and lower parts of FIG. 27, the orientation of spots 3210 along line 3212 is preserved during the scan. It is also clear that during the scan the orientation of line 3212 on which spots 3210 are distributed, is preserved and remains parallel to rotational axis 3216. Axis 3216 defines the orientation along which a relative linear scan movement is introduced between scan device 3200 and the scanned region (not shown) to produce an area scan. Thus the orientation of scanning spots 3210 is preserved relative to the direction of the linear scan movement.

Orientation preservation of the scan spots is a crucial function that must be accomplished in inner drum scanning. The scan devices of FIGS. 3*a*, 3*b*, 3*c*, and 3*d* all fulfill this requirement when using multiple scanning beams. On the other hand, the scan device of FIG. 20 does not fulfill this requirement for inner drum scanning with multiple scanning beams. All the scanning systems described above, excluding the system of FIG. 20, are systems in which the scan orientation of the multiple scanning beams, reflected from their scan device, is preserved.

While inner drum scanning requires a specific orientation preservation of the scanning spots, such preservation has disadvantages when converting the inner drum scanning, by rotating reflectors, into a planar scan. When a planar scan is performed, the main disadvantage of scanning systems that preserve the orientation of the scanning spots, as required for inner drum scanning, is the non-uniform overlap between the periodic line scan that produces the area scan. Such a non-uniform overlap is reduced when the scan is done by delayed scanning lines, as shown in FIGS. 12*a*–12*d*. For a high quality area scan, even the reduced effect of non-uniform overlapping, such as the one exists in the system of FIGS. 12a–12d, should be eliminated. On the other hand, in systems such as the one illustrated in FIG. 20, the scan device does not preserve the orientation of the scan spots, as required for use in inner drum scanning. Also it can produce a planar scan without non-uniform overlap.

FIG. 28—Non-Uniform Overlap in Planar Scan

FIG. 28 illustrates the undesired non-uniform overlap produced in planar scan systems, such as the system of FIG. 10, that preserve the orientation of the scanning spots. While FIG. 28 illustrates the non-uniform overlap illustrated by dashed areas 3304 produced by multiple scan spots 3300 that scan planar region 3302, such non-uniform overlapping is also produced when using only a single scanning spot.

Spots 3300 rotate around rotational center 3306 and are illustrated in three scan positions corresponding to rotational angles $\theta 1$, $\theta 2$, and $\theta 3$, and are arranged for any scan position in a radial orientation relative to rotational center 3306. Spots 3300 rotate around center 3306 with an angular velocity $\omega$ to form on surface 3302 a multiple line scan. Conversion of the line scan into an area scan is achieved by introducing relative linear scan movement between surface 3302 and rotational center 3306 along a direction indicated by arrows 3308.

Each spot in the group of spots 3300 partially overlaps its adjacent spot or spots. Scanned area 3310 is produced by a single periodic scan of spots 3300 and has an inner radius R1 and outer radius R2 when R2>R1. Area 3310 is confined between radii R1 and R2 and the edges of region 3302. Joining multiple periodic scanned areas 3314, such as area 3310, produces scanned area 3312. Joining areas 3314 is done by applying relative linear scan movement along arrows 3308. The linear scan movement is adjusted to produce a movement along a distance that is equal to R2−R1 in a time period of a single periodic scan. In this situation each of periodic scanned areas 3314 is tangent to its previous periodic scanned area in a point, such as point 3318 located on line 3316 oriented in the direction of R1 when $\theta 2$=90 degrees. Each of periodic scanned areas 3314 is joined to its previous scanned area by a point, such as point 3318, where its smaller radius R1 is tangent to the bigger radius R2 of its previous scanned area. In this situation each scanned area of areas 3314 must overlap its previous scanned area. The overlapped areas between scanned areas 3314 are dashed areas 3304.

When using a single scanning beam, the periodic scanned area (a single line scan) still has two different radii R1 and R2 when R2>R1 and thus non-uniform overlap still exists in a form similar to that of areas 3304.

For example, spots 3300 correspond to spots 1036 that scan planar surface 1038 in the system of FIG. 10. The latter system includes scan device 1008. Spots 3300 preserve their orientation all over the planar scan-range, relative to the radial orientation along R1 or R2. However they do not preserve their orientation relative to the direction of the linear scan movement along arrows 3308. On the other hand, the system of FIG. 19a includes scan device 1910 that is similar to scan device 1008 of FIG. 10. FIG. 19a illustrates inner drum scanning in which scanning spots 1950 that scan surface 1952 preserve their orientation relative to the direction of the linear scan movement along arrows 1966.

Some scan devices are used in scanning systems that preserve the orientation of the scanning spots, in inner drum scanning, along the direction of the linear scan movement that produces area scan. Those scan devices do not preserve their orientation along this direction when they are used for a planar scan. Thus such devices suffer from the disadvantage of producing non-uniform overlap in a planar scan.

On the other hand, some scan devices do not preserve the orientation of the scanning spots, in inner drum scanning, along the direction of the linear scan movement that produces area scans. Those scan devices are used in systems for planar scaning and then they preserve the orientation of the scan spots along the direction of the linear scan movement used to produce an area scan. Such devices do not suffer from the disadvantage of producing non-uniform overlap in a planar scan. Examples of such devices are illustrated in FIGS. 29a and 29b.

FIGS. 29a and 29b—Devices for Improved Planar Scanning

FIG. 29a illustrates the same scanning system 3400 with its scan device 3402 shown in two different positions. The two different positions are shown in the same drawing to demonstrate the changes between the two positions and to allow comparison. The upper and lower parts of FIG. 29a show system 3400 in two positions when scan device 3402 is rotated, relative to X axis, at angles $\theta 1$ and $\theta 2$, respectively, when $\theta 2 - \theta 1 = 90°$.

Multiple beams 3404 are converted by lens 3406 into focusing beams 3404 directed toward scan device 3402. Device 3402 rotates around axis 3408 at an angular velocity $\omega$ and reflects beams 3404 as rotating scanning beams 3404. Beams 3404 are focused into rotating scanning spots 3410 arranged along line 3412. Line 3412 is tangent to circle 3414 at point 3416 and moves along circle 3414 at angular velocity $\omega$. Circle 3414 has its center on axis 3408.

Line 3412, along which scanning spots 3410 are arranged, is parallel to axis 3408 for rotational angle $\theta 1$ and is at a right angle to axis 3408 for rotational angle $\theta 2$, as is shown in the upper and the lower parts of the drawing, respectively. When device 3400 changes its rotational position by 90° from $\theta 1$ to $\theta 2$, line 3412 changes its position by rotating its direction by angle $\theta 3$, equal to 90° also. This means that line 3412 rotates around rotating tangential point 3416 at angular velocity $\omega 1$ when $\omega 1 = \omega$. The rotational axis of line 3412 passes through point 3416 and intersects axis 3408. The rotational directions of device 3400 and line 3412 are opposite. In the specific example of FIG. 29a, while device 3400 rotates counterclockwise around axis 3408, line 3412 rotates clockwise around point 3416.

Rotational axis 3408 is oriented in the direction in which a relative linear scan movement should be applied between system 3400 and a scanned surface (not shown) to produce area scan of the inner drum scanning type. Line 3412 changes its orientation, during the scan rotation of device 3402, relative to axis 3408. Thus system 3400, including device 3402, does not preserve the orientation of scanning spots 3410 relative to the direction of the linear scan movement and it is not suitable for use as an inner drum scanner.

Scan device 3402 is actually similar to a tilted mirror and many other devices can achieve the effects that it produces. One of them is illustrated in FIG. 29b.

FIG. 29b illustrate a scanning system 3500, including rotating penta prism 3502, as a scan device. Device 3502 receives radiation beams 3504 in the direction of its rotational axis 3506 and reflects them at a right angle along axis 3508. Beams 3504 are converted by lens 3510 into focusing beams 3504 oriented toward rotating device 3502 and along its rotational axis 3506. Device 3502 reflects focusing beams 3504 as rotating scanning beams 3504 to be focused as scan radiation spots 3512 arranged along line 3514. Spots 3512 rotate along circle 3518 when line 3514 is tangent to circle 3518 at point 3520, which axis 3508 also passes through.

When device 3502 rotates with angular velocity ω along arrows 3516 around axis 3506, scan beams 3504 rotate around this axis at the same angular velocity along arrows 3522. At the same time line 3514 with spots 3512 also rotates at angular velocity ω around its rotational axis 3508 and point 3520 along arrows 3524.

Rotational axis 3506 is oriented along the direction in which a relative linear scan movement should be applied between system 3500 and a scanned surface (not shown) to produce an area scan of the inner drum scan type. Line 3514 changes its orientation, during the scan rotation of device 3502, relative to axis 3506. Thus system 3500, including device 3502, does not preserve the orientation of scan spots 3512 relative to the direction of the linear scan movement and it is not suitable for use as an inner drum scanner.

When scan device 3502 is a pentaprism, it always reflects scan beams 3504 at a right angle relative to axis 3506 and along axis 3508, regardless of the tilt angle between device 3502 and axis 3506. This makes the pentaprism very attractive for use as scan device 3502 since it does not require any special alignment relative to axis 3506 and thus produces a scan without any wobble and jitter effects.

Many rotating devices that receive the beams along their rotational axis and reflect them as rotating scan beams would produce a scan similar to that is illustrated in FIGS. 29a and 29b. This is described in their accompanying description. For example, a right-angle prism, a Porro prism system, an Amici prism, and a Schmidt prism are such devices and are illustrated and described in "The Photonics Design and Application Handbook 1991" pp. H-344 to H-345.

Scan devices such as 3402 and 3502 of systems 3400 and 3500 (FIGS. 29a and 29b, respectively), and other devices, such as mentioned in the accompanying description do not preserve the orientation of the scan spots, such as spots 3410 and 3512 relative to the direction of the linear scan. Thus these devices are not suitable for use as an inner drum scanner.

On the other hand, FIG. 30 shows how such devices, when used in systems for planar scanning, do preserve the orientation of the scan spots relative to the direction of linear scan movement. These devices, when used for a planar scan, eliminate the non-uniform overlap illustrated in FIG. 28 and thus are very useful and attractive in systems for planar scanning.

FIG. 30—Planar Scan System That Preserves Orientation of Scan Spot

FIG. 30 illustrates planar scan system 3600. The upper and the lower parts of FIG. 30 show two different rotational positions of the system. The two rotational positions of the system are shown in the same drawing to allow the comparison between the orientations of scanning spots 3602 at these positions.

The rotating optical system of system 3600 is attached to a rotating plate 3612 and includes rotating reflecting prisms 3604 and 3606 and focusing lense 3608.The rotating optical system with its supporting plate 3612 rotates at angular velocity ω around rotational axis 3614 and along arrow 3616. Lens 3618 converts beams 3620 into focusing beams 3620 directed toward scan device 3622. Device 3622 has two sides, 3624 and 3626, which receive focusing beams 3620, and reflect them out of it as rotating scanning beams 3620. Side 3624 of rotating device 3622 reflects beams 3620 at angular velocity ω and directs them to track prism 3604. Similarly, side 3626 of rotating device 3622 reflects rotating scanning beams 3620 at angular velocity ω and directs them to track prism 3606. For each periodic scan, one of sides 3624 and 3626, in its turn, serves as the scanning side and reflects beams 3620 as scanning beams 3620. The scan range of each of sides 3624 and 3626, in its turn, is 180°. The upper part of drawing 30 illustrates side 3624 in its middle scanning range and the lower part shows side 3624 when its scan ends. Accordingly, the difference between the rotational positions of system 3600 as shown in the upper and the lower parts of the drawing is 90°.

Prisms 3604 and 3606 reflect scanning beams 3620 toward rotating lenses 3608 and 3610, respectively. For the clarity, lens 3608 and prism 3604 are shown in cross-section without hatching. The cross-sections of supporting plate 3612 are shown with hatching and are slightly different in the upper and in the lower parts of the drawing, but that both parts of the drawing refer to same complete system 3600, including the parts removed by the cross sections. Lens 3610 is not shown and it is in a hidden position. Focusing lenses 3608 and 3610 project scanning beams 3620 onto line 3628 as focused radiation-scanning spots 3602. Spots 3602 rotate at angular velocity ω around axis 3614 along arrow 3632 and are arranged along line 3628, all over the scan range, while line 3628 preserves its orientation over this scan range.

Accordingly, in spite of the two different rotational positions of system 3600 in the upper and in the lower parts, line 3628 in the upper part is parallel to line 3628 in the lower part. An area scan is achieved by introducing relative linear scan movement between system 3600 and the scanned surface (not shown). Arrows 3630, which illustrate the scan direction, are directed along a fixed orientation, and indicate this relative linear scan movement. Arrows 3630 are also directed along a fixed orientation. Thus spots 3602, arranged on line 3628, preserve their orientation with respect to the relative movement between system 3600 and the scanned surface. As will be explained below in the description to FIG. 34, this orientation preservation has the advantage of eliminating the undesired non-uniform overlap shown in FIG. 28.

FIG. 31—Planar Scan with Multiple Beams Rotating with Scan Device at Same Angular Velocity FIG. 31 illustrates a scanning system for a planar scan that is very similar to the scan system of FIG. 20. The systems of FIG. 20 and system 3700 have a few different components, as explained below:

(I) Radiation source 2106 of FIG. 20 that emits single beam 2108 is replaced in system 3700 by radiation source 2101 that emits multiple beams 2107.

(II) Scan device 2102 of FIG. 20 that has a single reflecting facet is replaced in system 3700 by a four sided scan device 2103. Two of its reflecting facets 2111 and 2113 are shown in cross-section.

(III) While, in FIG. 20, lens 2109 focuses beam 2108 into a single scanning spot 2126 projected onto surface 2124, in system 3700 this lens focuses beams 2107 into multiple scanning spots 2127 projected onto surface 2124.

(IV) The system of FIG. 20 has one open hole 2119 in tube 2118. System 3700 has four open holes. Holes 2119 and 2115 are shown in cross-section and hole 2117 is shown in front view. Open holes 2119, 2115, and 2117 allow scanning beams 2107 to pass through tube 2118 toward their corresponding reflecting prisms, which they track. The forth hole is not shown.

(V) System 3700 has additional three rotating lenses and three additional reflecting prisms, which the system of FIG. 20 does not have. Only additional rotating lens 2105 and additional rotating prism 2121 are shown in cross-section.

The operational principle of the system of FIG. 20 explained in the description of this figure is similar to that of system 3700 and thus will not be repeated here. Accordingly the explanation to FIG. 31 refers only the to the way of operation of system 3700 which is different from FIG. 20.

The scan system of FIG. 20 belongs to the group of scanning system that preserve the orientation of the scanning spot or spots relative to the radial orientation around their rotational axis. The system of FIG. 20 could be included within such a group only when using a single beam. When using multiple beams, the system of FIG. 20 becomes a system such as system 3700. As illustrated in FIGS. 29a, 29b, and 30 and described above, system 3700 does not preserve the orientation of scanning spots 2127 with respect to the radial orientation of rotational axis 2116, but it does preserve the orientation of scanning spots 2126 along the linear scan movement in the direction of X axis.

One beam of beams 2107 is illustrated by a broken line and it has an optical path similar to that of beam 2108 of the system of FIG. 20. This beam is directed toward scan device 2102 along axis 2116. The rest of the beams of beams 2107 also have an optical path similar to that beam. As explained above, and as illustrated in FIGS. 29a, 29b, and 30, the rest of beams 2107, reflected from scan device 2103 as rotating scanning beams 2107 that rotate around axis 2126, also rotate around the scanning beam, illustrated by a broken line. The rotational angle of these beams around the broken line is equal to their rotational angle around axis 2116. The above rotation of beams 2107 around the broken line cause them, after their reflection from the reflecting prisms, such as prism 2120, to preserve their orientation with respect to the relative linear scan movement between system 3700 and scanned surface 2124 that produces the area scan. Thus scanning spots 2127 also preserve this orientation all over the scan range and avoid the non-uniform over lapping shown in FIG. 28.

The central angle of each side, such as sides 2113 and 2111 of scan device 2103, is 90°. Scanning beams 2107 rotate with device 2103 at the same angular velocity ω around rotational axis 2116. Thus spots 2127 periodically scan surface 2124 along a 90° rotational angle. Each side of device 2103 produces the scan in its periodic turn by tracking, with scanning beams 2107, the corresponding reflecting prism related to the relevant periodic scan.

FIG. 32—Planar Scan System Including Sub System with Two Scan Devices

FIG. 31 illustrates scanning system 3800 having a scan device 3802 similar to scan device 1008 of the scan system of FIG. 10. Both of devices 3802 and 1008 are scan devices which preserve the orientation of the scan beams, in that they reflect with respect to the radial orientation of their rotational axis. As illustrated in FIG. 28 and explained, such preservation does not preserves the orientation of the scanning spots with respect to the relative linear scan movement between the scanned region and the scan system and thus produces an undesired non-uniform overlap of the planar scan.

System 3800 includes a sub-scanning-system that consists of two scan devices, 3802 and 3804. Device 3804 is illustrated as being a Dove prism, but it can be also a Pechan prism, an Abee' prism, or a reversion prism. Those prisms are illustrated and described in "The Photonics Design and Application Handbook", Book 3, 37$^{th}$ Int. Ed. (Photonics Spectra Magazine, pub. 1991) pp. H-344 to H-345. For example, scan device 3804 can be made from any other device which is capable of receiving an image along its optical axis and transmitting that image along its optical axis when the transmitted image is inverted or reversed (or both of them) relative to the received image. When such devices rotate around their optical axes and receive radiation beams directed along these axes, they transmit these beams along these axes while these beams rotate around their optical axes at angular velocity that is twice the velocity with which the devices rotate.

Radiation source 3806 emits multiple beams 3808 directed toward lens 3810. Lens 3810 receives beams 3808 and converts them into collimated beams 3808 directed toward scan device 3804 along its optical axis 3812. Optical axis 3812 is also the rotational axis of device 3804 around which it rotates at angular velocity ω along arrow 3814. Device 3804 is mounted in cylinder 3816 that is inserted in ball bearings 3818 and 3820; all devices are shown in cross-section. Motor 3822 has three shafts, 3824, 3826, and 3828. Shaft 3824 is oriented at a right angle to concentric shafts 3826 and 3828. Motor 3822 spins shaft 3824 togetrer with wheel 3830 attached to shaft 3824. Wheel 3830 is coupled to wheel 3832, which in turn is attached to cylinder 3816 by belt 3834. Thus spinning shaft 3824 causes cylinder 3816 to spin with device 3804 around axis 3812. Wheels 3830 and 3832 and part of belt 3834 are shown in cross-section.

Device 3804 transmits beams 3808 and directs them toward scan device 3802 while beams 3808 spin around axis 3812 at angular velocity 2ω. Beam 3836 of beams 3808 is oriented along optical and rotational axis 3812 and is illustrated by a broken line along its optical path. Device 3802 receives spinning beams 3808 on its facet 3838 and reflects these beams, by its facet 3840, as scan beams 3808. Device 3802 is rotated around rotational axis 3842 by shaft 3826 at angular velocity ω and thus causes beams 3808 to rotate around axis 3842 at angular velocity 2ω. Beams 3808 do not just rotate around axis 3842, but also spin around axis 3844 that is aligned along scan beam 3836. Beam 3836 is illustrated by a broken line. The spin orientations of beams 3808 around axis 3812 when they exit device 3804 is opposite to the spin orientation of beams 3808 around axis 3844 when they are reflected from device 3802.

Shaft 3828 of motor 3822, shown in cross-section, passes through device 3802 without any contact between the shaft and device 3802. Shaft 3828 is attached to supporting plate 3846 and spins together with it at angular velocity 2ω. Plate 3846 carries the rotating optical system that rotates with it at angular velocity 2ω and includes rotating reflecting prisms 3848 and 3850 and rotating lenses 3852 and 3854. The system that includes devices 3802 and 3804 causes scan beams 3808 to rotate around axis 3842 at angular velocity 2ω and to spin around axis 3844 at the same angular velocity. While scan beams 3808 rotate around axis 3842 at angular velocity 2ω, they track optical components such as prism 3848 and lens 3852 or alternatively track prism 3850 and lens 3854, which are all belong to the rotating optical system attached to rotating plate 3846.

Scan beams 3808 that track rotating prism 3848 are reflected by that prism to track lens 3852 that projects these beams onto surface 3856 as scan spots 3858. Spots 3858 rotates around axis 3842 and spins around axis 3860 along which scan beam 3836, illustrated by a broken line, is aligned. To produce an area scan along surface 3856, a relative linear scan movement is introduced between system 3800 and surface 3856 along a fixed orientation and along arrow 3862.

Scan spots 3858 rotate around axis 3842 and spin around axis 3860 in opposite directions but at the same speed. In such configurations the orientation along which spots 3858 are arranged is preserved and remains fixed relative to the direction of the linear scan movement along arrow 3862. In such situations, the non-uniform overlap shown in FIG. 28 does not exist when system 3800 produces a planar scan of surface 3856.

Scan device 3804 rotates beams 3808 180° when its rotation around axis 3812 is equal to 90°. Since there is no way to distinguish between the beams of beams 3808, a rotation of 180° of beams 3808 is equivalent to their return into their initial position. This means that the rotational symmetry of scan device 3804 is equivalent to a rotational symmetry of 90°. Thus to synchronize scan device 3804 with scan device 3802, scan device 3802 must have four sides which also produce a symmetry of 90° and a scan range of 180°.

FIG. 25 illustates system 3000 in which the reflecting elements of the rotating optical system are replaced by a static reflector 3002 having rotational symmetry centered around rotational axis 3004. Similar to the system of FIG. 25, the reflecting elements, such as prisms 3848 and 3450 of the rotating optical system in FIG. 32, can be replaced by a static reflector, such as reflector 3002, having rotational symmetry centered around rotational axis 3842.

System 3800 can also serve as reading system when the direction of the optical path is reversed to travel via the rotating optical system and the rotating scan-device system to originate from radiation spots 3858, impinge upon surface 3856, and finally to a radiation sink (not shown) that replaces radiation source 3806.

FIG. 33—Scanning Spots that Preserve Orientation Relative to Scan Direction

FIG. 33 schematically illustrates two rotational positions, shown in a top view 3900, of scanning spots 3902 produced by scan systems, such as systems 3700 and 3800 of FIGS. 31 and 32, respectively. Circle 3904 has a center 3912 illustrated by broken line and indicates the course along which point 3906 moves during the scan. Arrow 3910 indicates the orientation of this movement. Center 3912 is a point on the scanned surface (not shown) in which rotational axes, such as axes 2116 and 3842 of systems 3700 and 3800 illustrated in FIGS. 31 and 32, respectively, pass through. Point 3906 is the point on the scanned surface (not shown) in which beams, such as the beams illustrated by broken line in FIGS. 31 and 32, pass through. Arrow 3908 shows the direction along which the relative linear scan movement between the scan system and the scanned surface is applied.

Radius R1 is oriented along line 3914 and radius R2 is oriented along line 3918. Relative rotational angle θ of spots 3902 around center 3912 is measured between R2 and R1 along the rotational direction of spots 3902, as shown by arrow 3910. Relative spin angle θ1 of spots 3902 around point 3906 is measured between lines 3916 and 3918 and along the direction of arrow 3920. The position of the initial rotation is indicated by line 3914 that is in the direction of R1. Spots 3902 preserve their orientation relative to the orientation of arrow 3908 since they spin around point 3906 along arrow 3920 at the same angular velocity that they rotate around center 3912, but in the opposite direction. Thus θ=θ1 and line 3916, along which spots 3902 are arranged in their second scan position, is parallel to lines 3914 and R1 along which spots 3902 are arranged in their initial scan position. Accordingly, spots 3902 preserve their orientation for any rotational angle θ and thus also preserve their orientation relative to the fixed orientation of the scan direction along arrow 3908. This orientation preservation of spots 3902 is maintained over the entire scan range.

FIG. 34—Scan Produced By Spots that Preserve Their Orientation Relative to Scan Direction FIG. 34 is a schematic illustration 4000 of scanned surface 4002. Scan spots 4004 make an area scan of surface 4002. Spots 4004 preserve their orientation along the direction of arrow 4006 in which a relative linear scan movement is introduced between spots 4004 and surface 4002 to produce the area scan. The relative linear scan movement along arrow 4006 converts the multiple lines scan produced by the periodic rotational movement of spots 4004 around centers, such as centers 4008 and 4010, into an area scan. Thus the relative movement of spots 4004 along arrow 4006 is in addition to their rotation along arrow 4012.

Spots 4004 are shown in four different rotational positions. In all of these positions they are arranged along lines parallel to line 4013. Thus spots 4004 preserve their orientation relative to the direction of the linear scan movement along arrow 4006. Such scan performances are produced by scanning systems 3700 and 3800 shown in FIGS. 31 and 32, respectively, and also according to the illustration in FIG. 33, as explained above.

Points 4014 are shown in the same four different rotational positions in which scan spots 4004 are illustrated. Spots 4004 and points 4014 are correspond to spots 3902 and points 3906 of FIG. 33. Points 4014 are the intersection points between surface 4002 and the rotating axis, such as axis 3860 of FIG. 32, around which scanning spots 4004 spin. Center 4008 is the intersection point between surface 4002 and the rotational axis of the rotating optical system, such as rotational axis 3842 of FIG. 32.

Area 4020 is confined between scan lines 4016, 4018 and the edges of surface 4002. Scan lines 4016 and 4018 appear to be circular, but they are not a part of a perfect circle due to the additional linear scan movement along arrow 4006. Still lines, such as line 4016, appear to be circular since the rotational speed along arrow 4012 is much larger than the linear movement along arrow 4006. Area 4020 is shown separately for the illustration of the area scanned by multiple lines scanning of spots 4004 in a single period of the periodic scan of spots 4004. Area scan 4022 is achieved by introducing relative movement between surface 4002 and the scan system (not shown) and along arrow 4006. Distance d is the total length between scan lines 4016 and 4018 in the direction of arrow 4006. The movement along arrow 4006 is adjusted to produce a displacement d in a period of time equal to the time period of a single scan of spots 4004. In this situation, joining multiple scan segments, such as segment 4020, produces scanned area 4022.

Spots 4004 preserve their orientation, with respect to the direction of the scan along arrow 4006, over the entire scan range. θ1 is the initial scanning angle between the rotational radius R of spot 4014 and spots 4004. At any rotational angle θ2, spots 4004 spin around rotating point 4014 at the same angle θ2 and thus create angle θ3 between R and line 4013 when θ3=θ1+θ2. In this configuration line 4013, along which spots 4004 are arranged at any arbitrary rotational position, is parallel to edge 4024 of surface 4002. This means that spots 4004 preserve their orientation relative to the direction of arrow 4006.

The above mentioned orientation preservation of spots 4004 means that all spots 4004 have the same rotational radius R, but each of these spots has a different rotational center, such as centers 4008 and 4010. The same rotational radius R for each spot of spots 4004 assures that joining the segments of the scanned area, such as segment 4020, to form scanned area 4022 can be done without any overlap, or can be done with a uniform overlap. This way the undesired non-uniform overlap of the planar scan shown in FIG. 28 is avoided.

FIGS. 35a and 35b—Inner Drum Scan System Including Multiple Scan Devices

A. With Rotating Optical System

FIG. 35a illustrates inner drum scan system 4100, which includes scan devices 4102 and 4104. System 4100, as an inner drum scanner, must preserve the orientation of scanning spots 4114 on surface 4108 and keep spots 4114 arranged along a fixed orientation relative to axis 4112. Accordingly, the relative orientation between scan beams 4106 with respect to the direction of the relative linear scan movement between system 4100 and scanned surface 4108 must be preserved. The above relative linear scan movement is directed along arrow 4110 that is oriented in the direction of rotational axis 4112.

Two sided scan device 4102 rotates around rotational axis 4112. Device 4102 is similar to scan devices 2102, 3402, 3622, and 2103 of FIGS. 20, 29a, 30, and 31, respectively. As explained, such devices have cannot reflect the beams that they receive as scanning beams that preserve their orientation relative to the direction of the rotational axis around which they rotate.

On the other hand, device 4102 is very attractive since it has several advantages:

1. It has a simple structure and thus is easy to produce.
2. It has a small footprint.
3. It reflects scan beams 4106 at the same angular velocity with which it rotates Thus device 4102 rotates at the same speed as the rotating optical system mounted on plate 4120, which includes lenses 4116 and 4118.

To gain the advantages of device 4102, its disadvantage (it does not preserve the orientation of the scan spots relative to axis 4112) must be corrected. This correction is done, as explained below, by the use of a scan-device system which includes both device 4102 and scan device 4104.

Radiation source 4122, attached to carrying plate 4146 by arm 4188, emits multiple beams 4106 toward lens 4124. Lens 4124 receives beams 4106 and directs them toward rotating scan device 4104 that rotates around its optical axis, which serves also as a rotational axis 4126. Rotating scan device 4104 is a Dove prism and is mounted in rotating tube 4128, which is inserted in ball bearings 4130 and 4132. Motor 4134 spins shaft 4136 with wheel 4138 attached to shaft 4136. Wheel 4140 is attached to tube 4128 and is coupled to wheel 4138 by belt 4142. Ball bearing 4132 is attached by arm 4144 to plate 4146, which carries system 4100. Beam 4148 (one of beams 4106) is directed toward device 4104 and is illustrated by a broken line to indicate that it is oriented along axis 4126. Device 4104 receives beam 4148 and transmits it along same axis 4126.

Device 4104 rotates around axis 4126 at angular velocity $\omega$ in the direction of arrow 4150. Beams 4106 from rotating device 4104 also spin around axis 4126 along arrow 4150, but at double velocity $2\omega$. Beams 4106 transmitted by device 4104 are directed toward mirror 4154 in the direction of axis 4126. Arm 4152 attaches motor 4134 and mirror 4154 to carrying plate 4146. Mirror 4154 receives beams 4106 and reflects them into rotating tube 4156 in the direction of axis 4112 around which device 4102 rotates. Tube 4156 is attached to plate 4146 by ball bearing 4186. Beams 4106 directed toward device 4102 spin around axis 4112, along which beam 4148 (illustrated by a broken line). Beams 4106 spin around axis 4112 at angular velocity $2\omega$ and are directed along arrow 4158.

Motor 4160, attached to carrying plate 4146, spins its shaft 4162 together with wheel 4164 attached to this shaft. Wheel 4166 is attached to tube 4156 and is coupled to wheel 4164 by belt 4168. Belt 4168 causes wheel 4166 to spin together with tube 4156 around axis 4122 at angular velocity $2\omega$ and in the direction of arrow 4158. Tube 4156 is attached to plate 4120 and thus rotates with it at angular velocity $2\omega$ in the direction of arrow 4158. Plate 4120 carries scan device 4102 and the rotating optical system that includes lenses 4116 and 4118 and causes them to rotate together around axis 4112 at angular velocity $2\omega$ in the direction of arrow 4158.

Rotating scan device 4102 receives spinning beams 4106 from mirror 4154 through tube 4156. Device 4102 reflects beams 4106 from its facet 4172, through hole 4170 in tube 4156, as rotating scan beams 4106. Beams 4106 are reflected from device 4102 with no spin motion. If scan device 4102 were in a static position, then the spin motion of beams 4106, produced by device 4104, would cause beams 4106 to spin around rotating axis 4176 at angular velocity $2\omega$ in the direction of arrow 4178. If scan device 4104 were in a static position, then the spin motion of beams 4106, produced by rotating device 4102, would cause beams 4106 to spin around rotating axis 4176 at angular velocity $2\omega$ in the direction of arrow 4180. The spin motion of the beams that device 4102 produces is explained above and shown in FIG. 29a. The spin motion that devices 4102 and 4104 produce along arrows 4178 and 4180, respectively, are at equal speeds ($2\omega$) but in opposite directions and thus cancel each other. Cancellation of the spin motion of beams 4106 assures that these beams, and thus spots 4114, are all preserve their orientation relative to axis 4112 or arrow 4110, as required for inner drum scanning.

Beams 4106 rotate around axis 4122 at angular velocity $2\omega$ and in the direction of arrow 4158. Thus when beams 4106 are reflected from facet 4172 of device 4102, they precisely track rotating lens 4116. Similarly, when beams 4106 are reflected from facet 4174 of device 4102, they pass through hole 4182 and precisely track rotating lens 4118. Lenses 4116 and 4118 project beams 4106, onto surface 4108 as scanning spots 4114. Surface 4108 is the inner surface of cylinder 4184.

Device 4104 rotates beams 4106 at 180° when it rotates 90°. When there is no way to distinguish between beams 4106, a rotation of 180° is equivalent to a return to the initial position. Accordingly device 4104 should be considered as being with effective rotational symmetry of 90°. Device 4102 has two sides and thus has rotational symmetry of 180°. Accordingly device 4104 has a rotational symmetry angle that is half of the rotational symmetry angle of device 4102. Since device 4104 rotates at half of the speed at which device 4102 rotates, they both complete their rotational symmetry angle at the same time, and thus are synchronized.

System 4100 is illustrated as a writing system. System 4100 is also capable of serving as reading system. In the reading configuration, beams 4106 propagate along the same optical path, but in a reversed direction from spots 4114, via devices 4102 and 4104, to a radiation sink that replaces radiation source 4122. Plate 4146 carries all the components of system 4100. An area scan of surface 4108 is produced by introducing relative linear scan movement between system 4100 and scanned surface 4108 along axis 4112 or arrow 4110. Moving plate 4146 or cylinder 4184 along axis 4112 or arrows 4110 produces the relative linear scan movement.

FIG. 35a is a general illustration of how the use of scan-device system, including two scan devices 4102 and 4104, can produce a proper inner drum scanning when using scan devices, none of which is individually suitable for producing proper inner drum scanning. Each of scan devices 4102 and 4104 causes unwanted spinning of rotating scan beams 4106 around axis 4176, which rotates with beams

4106. The scan-device system is designed to integrate scan devices, such as 4102 and 4104, in a way so that they cancel the unwanted spinning of scanning beams 4106 around axis 4176. Axis 4176 rotates with rotating scanning beams 4106 around axis 4121.

B. Without Rotating Optical System

FIG. 35*b* illustrates scan system 4200 which is similar to system 4100 of FIG. 35*a*. Thus the same numeral is used to indicate the same components shown in both of the systems. Most of the description and the explanations to FIG. 35*a* apply to FIG. 35*b* and will not be repeated. Only the functions by which system 4200 differs from system 4100 are explained.

System 4100 is converted to system 4200 by the following:

1. Replace two-sided scan device 4102 that is capable of producing a periodic scan along 180° by one sided scan device 4101 that is capable of scanning a complete circle periodically.
2. Remove the rotating optical system including lenses 4116 and 4118.
3. Replace supporting plate 4120, that supports scan device 4102 and the rotating optical system of system 4100 with much smaller plate 4121 that supports only scan device 4101 in system 4200.

The rotating optical systems illustrated and described above are used for producing high scan resolution. Such high resolution is limited only by the diffraction limit. On the other hand, this causes some mechanical complexity.

To achieve high scan resolution, by a pre-focusing method and without the use of a rotating optical system, the radiation spots projected, by the radiation beams, on the scan device should be large. The scan devices illustrated in FIGS. 3*a* to 3*d* have the advantage that they are of the type that is suitable for being used individually for inner drum scanning. They can be used individually because they preserve the relative orientation between the scanning beams and the direction of the relative linear scan movement. On the other hand these scan devices have the disadvantage of a large footprint. The Devices of FIGS. 3*a* to 3*d* must be much bigger than the radiation spots produced, on them, by the radiation beams. The size of these scan devices goes up with the width of the scanning beams and the size of the scanning angle. Accordingly, in order to achieve high resolution scans at wide scanning angle in a configuration of pre-focusing method, the scan devices, such as those shown in FIGS. 3*a* to 3*d*, must be very big.

The scan devices illustrated in FIGS. 2, 29*a*, 29*b*, 35*a*, and 35*b* have a disadvantage in that they are unsuitable for use individually for inner drum scanning. This is because they cannot preserve the relative orientation between the scan beams and the direction of the relative linear scan movement. On the other hand, these devices are capable of producing a proper inner drum scan when they are combined with an additional scan device in a scan-device system as shown in FIGS. 35*a* and 35*b*. Such combined scan devices have the advantage of a small footprint. The size of the devices shown in FIGS. 2, 29*a*, 29*b*, 35*a*, and 35*b* is about the same as the size of the radiation spots produced on them by the beams. The size of these scan devices is independent of the scanning angle. Accordingly, scan devices, such as those shown in FIGS. 2, 29*a*, 29*b*, 35*a*, and 35*b*, when are used in a scan-device system, have a small footprint, even when they are used for prefocusing in order to achieve high resolution scans at a wide scanning angle.

Thus FIG. 35*b* illustrates produce inner drum scan can be produced with with compact scan device 4101, even when the following is required:

1. Scaning with multiple beams.
2. High scaning resolution.
3. No rotating optical system
4. Scaning along a complete circle.

Device 4101, rotating round rotational axis 4112, receives beams 4106 while they spin around axis 4112 and reflects them out through hole 4170 as rotating scan beams 4106. For any scan position the spin of beams 4106 around axis 4176, produced by device 4104, is cancelled by the opposite spin produced by device 4101. Thus scanning beams 4106 are emitted from the device system that includes devices 4101 and 4104 without any spin around axis 4176. Axis 4176 rotates with scan beams 4106 around axis 4112. Beams 4106 are directed by device 4101 to project spots 4114 on surface 4108. Device 4101 has one side and thus it scans a complete circle. At the period of time that device 4101 completes a scan of a whole circle, device 4101 rotates 180° and brings beams 4106 to their initial position around axis 4126. Thus devices 4101 and 4104 complete their scan period at the same time and are synchronized.

Beams 4106 are focused by lens 4124 into scanning spots 4114 using a prefocusing method in which the focusing lens is positioned before the scan device. The distances between lens 4124, radiation source 4122, and surface 4108 are adjusted to produce optimal focus conditions in which the size of spots 4114 on surface 4108 is minimal. Since the optical length of lens 4124 from surface 4108 via device 4101 is large, a high scan resolution would require the use of wide beams 4106. Unlike the scan devices illustrated in FIGS. 3*a* to 3*d* that receive the beams when they are oriented off the rotational axes of these devices and toward the sides of these devices, device 4101 receives beam 4106 along its rotational axis 4112. The sizes and the positions of the spots that beams 4106 produce on device 4101 are about the same for any position of device 4101. Accordingly, the size of device 4101 in the direction of axis 4112 is about the width of beams 4106. This size is much smaller than the size in which the devices of FIGS. 3*a* to 3*d* would be if they were used to scan beams 4106 instead of device 4101. When beams 4106 are wide enough to produce high scan resolution, the size of device 4101 remains relatively small. On the other hand, the size of the devices of FIGS. 3*a*–3*d*, if used under the same conditions, would be so large that it would be impractical to use.

While scan device 4104 is illustrated as Dove prism, it can be of other types, as explained. For example, to spin converging beams 4106 projected by lens 4124, it is even better to use a Pechan prism instead of a Dove prism as the optical element of scan device 4104.

The compactness of scan device 4101, the use of multiple beams, and the lack of a rotating optical system enable the use of a very high scan speed. The ability to produce inner drum scanning at high speeds and resolution without the use of a rotating optical system makes system 4200 very attractive.

The option to produce high speed scans with wide beams yet high scan resolution with a compact scan device, such as device 4101, also makes the use of such devices very attractive for planar scans. Such devices can produce a high scan resolution even when using a rotatable optical system, including a static reflector in which the optical length between the focusing lens and the scanned surface is large. The attraction of the use of devices, such as device 4101, becomes even stronger when considering that it does not produce a non-uniform overlap of the planar scanned area.

FIG. 36—Planar Scan with Rotatable Optical System

FIG. 36 illustrates a scan system 4300 similar to system 3000 of FIG. 25. Thus the same numerals are used to indicate the same components in both of the systems. Most of the description and the explanations of FIG. 25 apply to FIG. 36 and will not be repeated. Only the functions by which system 4300 differs from system 3000 are explained.

System 3000 is converted to system 4300 by making the following changes:

1. Replace scan device 3016 of system 3000 by two-sided scan device 3015.
2. Add folding mirror 3013 to system 3000 to direct beams 3008 toward device 3015 along the direction of axis 3004.

Folding mirror 3013 receives beams 3008 from focus lens 3012 and directs them toward device 3015, having sides 3009 and 3011, and along a direction parallel to axis 3004. Device 3016, rotating around rotational axis 3004 along arrow 3005, reflects beams 3008 as scan beams 3008 that rotate together with it at the same speed and direction around axis 4004. Rotatable reflector 3002, in a static position, receives scanning beams 4008 and reflects them toward scanned surface 3024 to form, on surface 3024, scanning spots 3026. The distances between source 3006, lens 3012, and surface 3014 are adjusted to produce spots 3026, which have minimal size.

Each side of device 3015 produces a periodic scan of spots 3026 on surface 3024 along a scan angle of 180° around axis 3004 and along arrow 3001. Spots 3026 rotate around axis 3004 along arrow 3001 in the same way as they do in system 3000 of FIG. 25, but with an additional spin around axis 3007 and along arrow 3003. Axis 3007 rotates around axis 3004 and is an axis along which a scanning beam would propagate toward surface 3024 if it were launched toward scan device 3015 along axis 3004. The superposition of the rotation around axis 3004 and the spin around axis 3007 causes spots 3026 to preserve their orientation with respect to the direction of arrow 3028 in which the relative linear scan movement is applied between system 4300 and surface 3024.

The configuration of scan system 4300 produces an area scan of the type that is illustrated in FIG. 34, without the non-uniform overlap illustrated in FIG. 28.

System 4300 ia illustrated as writing and reading system but can be configured for reading where beams 3008 propagate along the same optical path but in a reverse direction from spots 3026 via device 3015, mirror 3013, lens 3012, and splitter 3010 to sink 3030.

FIG. 37—Scan of Rotating Region

FIG. 37 is a schematic illustration of scan system 4400 that scans rotating region 4402. Region 4402 of object 4422 is placed on a movable carrying plate 4404 that slides on a stage 4406. Motor 4408 spins stage 4406 by shaft 4410 that is attached to both of them. Shaft 4410 and stage 4406 spin together around rotational axis 4414, along arrow 4412, at angular velocity $2\omega$. Plate 4404 and weight 4416 can slide on stage 4406 along guide groves on stage 4404 (not shown). Plate 4404 and weight 4416 move in opposite directions along the radial orientation (normal to axis 4414) and in the directions of arrows 4418 and 4420, respectively. The centrifugal force of weight 4416 is equal and opposite to the total sum of the centrifugal forces of plate 4404 and object 4422. When plate 4404 moves together with object 4422 along arrows 4418, weight 4416 moves along arrows 4420 in the opposite direction. This motion of weight 4416 maintains the total centrifugal force, act on stage 4406, to be zero.

Thus for any radial position of plate 4402, object 4422, and weight 4416, stage 4406 is in a balanced state. Plate 4404 is coated by a high friction layer, such as, silicon rubber (not shown), which avoids any movement between plate 4404 and object 4422, even when a centrifugal force acts on object 4422. Stage 4404, weight 4416, plate 4404, and object 4422 are all rotate at the same angular velocity around rotational axis 4414.

Radiation sources 4424 and 4426 are mounted on plate 4428. Sources 4424 and 4426 emit multiple radiation beams 4430 and 4432 directed toward lenses 4434 and 4436, respectively. Lens 4434 receives beams 4430 and directs them toward rotating scan device 4438. Similarly, lens 4436 receives beams 4432 and directs them toward rotating scan device 4440. Beams 4442 and 4444 (parts of beams 4430 and 4432) are illustrated by broken lines and are directed toward optical axes 4472 and 4474 of scan devices 4438 and 4440, respectively. Device 4438 is a Dove prism mounted in cylinder 4446 that is inserted into ball bearings 4448 and 4450. Similarly, device 4440 is also a Dove prism mounted in cylinder 4452 that is inserted into ball bearings 4454 and 4456. Motor 4460 is attached to plate 4428 by post 4458. Motor 4460 spins wheel 4464 by its shaft 4462. Wheel 4464 is coupled to wheels 4466 and 4468 by belt 4470. Wheel 4466 is attached to cylinders 4446 and spins together with it and device 4438 at angular velocity $\omega$ around axis 4472. Wheel 4468 is attached to cylinders 4452 and spins together with it and device 4440 at angular velocity $\omega$ around axis 4474.

Device 4438 transmits beams 4430 from it as spinning beams 4430. Beams 4430 spin around axis 4472, along which beam 4442 is directed, at angular velocity $2\omega$. Device 4440 transmits beams 4432 from it as spinning beams 4432. Beams 4432 spin around axis 4474, along which beam 4444 is directed, at angular velocity $2\omega$. Beams 4430 are directed toward lens 4476 that receives them and projects them onto surface 4402 as scanning spots 4478. Spots 4478 spin around axis 4472, along arrow 4480, at angular velocity $2\omega$. Similarly, spinning beams 4432 are directed toward lens 4482, which receives them and projects them onto surface 4402 as scan spots 4484. Spots 4484 spin around axis 4474, along arrow 4486, at angular velocity $2\omega$.

When surface 4402 rotates around axis 4414, spots 4478 and 4486 produce a line scan on surface 4402. The additional relative linear scan movement along arrows 4418 between scan system 4400 and surface 4402 converts the line scan on surface 4402 into an area scan. The rotation of surface 4402 along arrow 4412 and the spin of spots 4478 and 4484 along arrows 4480 and 4486, respectively, are all in the same direction and at same angular velocity $2\omega$. Accordingly, for any period of time, scanned surface 4402 and scan spots 4478 and 4486 change their orientation by the same amount.

Thus the direction of scan spots 4478 and 4484 with respect to the relative linear scan movement along arrows 4418, as it appears from the rotating coordinate system located in the plane of surface 4402, is preserved over the entire scan range. In other words, the orientation of spots 4478 and 4484 relative to any fixed orientation on scanned surface 4402 is preserved.

This type of scanning produces an area scan of the form illustrated in FIG. 34 and does not suffers from the unwanted non-uniform overlap shown in FIG. 28.

Scan system 4400 is described above as in a static position when only its scan devices 4438 and 4440 are spinning. Scan system 4400 can also be operated as rotating scan system when motor 4488 spins entire system 4400 by its shaft 4490 that is attached to plate 4428. In this case system 4400 rotates around axis 4414 at angular velocity $2\omega1$ along arrows 4492. The relative rotational movement between system 4400 and surface 4402 is equal to 2(ω+/−ω1) when the sign (+ or −) depends upon the direction of ω1. The rotational speed of devices 4438 and 4440 must be half of the above relative rotational movement and thus equals ω+/−ω1).

FIG. 38—Structure of Laser Disk (Prior Art)

FIG. 38 schematically illustrates the structure of an optical storage system in a form of a laser disk 4500. Disk 4500 can represent a Compact Disk (CD), a videodisk, a Digital Video Disk (DVD), a computer disk, a DVR that is similar to the DVD but is with a thiner coating, blue lasers (shorter wavelength), and a grated numerical aperture.

Disk 4500 contains digital information in the form of spots 4502 engraved on its surface 4508. Spots 4502 are distributed along broken line 4506 in a form of cycloid. The ways that spots 4502 are distributed along line 4506 are related to the information that disk 4500 contains. Scanning of disk 4500, for the purpose of writing or reading, is done by an optical head (not shown) that moves along the radial axis of disk 4500 while disk 4500 spins around its rotational axis that passes through center 4504 of disk 4500. This scan is done along cycloid line 4506 along its entire length when it starts with radius R1 and ends with radius R2. The scanning angle of disk 4500 equals to its spinning angle θ. Disk 4500 is illustrated with digital information when the ONE bits (empty spaces) and zero bits (spots 4502) are written alternatively.

Each digital bit has a minimal size according to the scan resolution. This size corresponds to spin resolution Δθ in which disk 4500 spins during a scan along a length equal to the size of digital bit. Since disk 4500 spins at a fixed speed and since the information has to be read at a constant bit rate, disk 4500 spins at the same angular velocity for any scanned radius along line 4506. Accordingly the best angular scan resolution Δθ is determined by the minimal bit side Δ11 in the smaller scanned radius R1 and is given by Δθ=Δ11/R1. For the same angular resolution, bit size Δ12 at the outer and biggest radius R2 is given by Δ12=ΔθR2=Δ11 R2/R1. This means that for maintaining a constant bit rate, the bit size must be varied and is proportional to the scan radii of line 4506 along which this bits are located. Accordingly the number of bits that can be used for any scanned radius is equal to the number of bits that can be used in the smallest radius that is given by 2πR1/Δ11. Thus when line 4506 reaches an outer radius R2, after n turns, and even when R2>>R1, then the number of bits that can be used is determined only by the inner and smallest radius R1 and is given by 2nπR1/Δ11.

The inability to use a minimal bit size Δ11 over the entire scanned surface 4508 wastes space, reduces the amount of information on disk 4500, and also reduces the read or write speed of the disk. FIG. 39 illustrates a way to use the minimal size of the bits over the entire scan range while maintaining a constant bit rate when using a fixed spin or rotational scan speed.

FIG. 39—Writing and Reading Digital Information with Constant Bit Size

FIG. 39 schematically illustrates an optical storage system in the form of laser or digital plate 4600. Plate 4600 has a shape similar to scanned region 4022 of surface 4002 of FIG. 34. Plate 4600 has scanned surface 4612 including empty spaces and spots 4602 that are scanned according to that illustrated in FIG. 34. Spots 4602 are distributed along lines that appear to be circular with radius R2 Parts of these lines are illustrated by broken lines 4604. All lines 4064 that appear circular and have the same radius R2 are also have their centers, such as center 4610, displaced from each other on line 4614. Surface 4612 is illustrated when the digital information written on it is distributed along lines 4604, with the ONE bits (empty spaces) and the ZERO bits (black spots 4602) distributed alternately.

The size of one bit is the resolution of the information. The scan is done at the best scan resolution Δ11 in which it is done when scan disk 4500 of FIG. 38 is scanned at the smallest scanning radius R1. The bit size Δ11 is also the same for FIGS. 38 and 39. R2 in FIG. 39 can also represents, for example, the outer radius size of a laser disk, such as disk 4500 of FIG. 38. Δ11 is the length of the arc between arrows 4606 and 4608. Since all lines 4604 have the same radius and are scanned at the same speed, the same bit size Δ11 can be used for all of them for maintaining a constant bits rate. When the number of periodic scans along lines 4604 is equal to 2n (equivalent to n complete turns of FIG. 38), the number of bits that can be used is 2πnR2/Δ11.

In disk 4500 there is an outer radius R2, with an inner and smaller radius R1. Radius R2 determines the number of used bits in plate 4600. Accordingly the number of used bits in plate 4600 is greater than that which exists in disk 4500, when both of them have outer radius R2, by a factor of R2/R1. This means that even when using a single beam to scan plate 4600, the scan speed in plate 4600 is faster by same factor R2/R1. The use of multiple beams increases that factor by the number of beams used.

The use of plate 4600 is superior to the use of disk 4500 for an additional reason. When using a disk such as disk 4500, the scan is done by rotating the disk. To scan another disk, disk 4500 is replaced by another. Due to manufacturing tolerances, the disks are not perfectly balanced and the mechanical vibrations that they produce during their rotation limit their rotational speed. On the other hand, plate 4600 can be in a static position when the scan system rotates. The moving parts of the scan system are the same for any scanned plate, such as plate 4600. These parts can be balanced once to allow high-speed rotation without mechanical vibrations.

Tolerances Allowed in Scan Systems

The above scan systems, especially those with a rotating optical system, have very high scan performances. These high performances include high scan resolution and projection of the scan beams by the rotating lenses onto the scanned region at a fixed angle all over the scan range. When the rotating and tracked optical system includes additional or other optical components, such as reflectors, all the above regarding the optical aperture of the rotating lenses is also true for the optical aperture of the reflectors, i.e., their field of view.

This high scan resolution is achieved by using wide scanning beams that fill all the effective area of the rotating lens system. In this configuration the scanning beams have to track the rotating lenses without relative translation between the beams and the lenses. Similarly, in order for the rotating lenses to keep the projection angles of the scan beams onto the scanned surface fixed, the beams must to track the lenses without relative translation between the beams and the lenses.

When a very high quality scan is not necessary, there is no need to track the rotating lenses by the scan beams in a way where no relative translation occurs.

If the scan quality can be reduced, lower scan resolution can be used and the projection angles of the scan beams by the rotating lenses onto the scanned surface can be changed. If lower scan resolution is allowed, the system can use scan beams that are narrower than the diameter of the effective area of the rotating scan lenses. The result of allowing a change of the projection angles is the possible use of non-perfect tracking of the rotating lenses by the scan beams. This non-perfect tracking allows relative translation between the scan beams and the rotating focus lenses. The use of scan beams narrower than the optical aperture of the rotating lenses permits the use of non-perfect tracking of the rotating lenses by the scan beams, as long as the scan beams do not exit from the optical aperture of the tracked lenses. This means that the scan beams project spots on the tracked lenses, which slide on the lenses, in a way that the optical aperture of the tracked lenses contains the spots projected by the scanning beams over the entire useable scan range.

This allowance of sliding of the spots provides many advantages that make the scan systems according to the invention much easier to produce. This is because many technical specifications required from the components of the systems and the way in which they are integrated are easier to achieve.

The following list provides several examples of deviations that the present scan systems can tolerate when the beams slide on the rotating lenses:

1. Scan devices such as device 3802 in system 3800 of FIG. 32 can be produced with relaxed tolerances in the angle of their facets and or in the location and angle of their rotational axis.
2. The rotating scan lenses such as lenses 2246 of FIG. 21, lens 2306 of FIG. 22*a*, and lens 2436 of FIG. 22*b*, can be placed at a location that deviates from the UGP (FIG. 21).
3. The ratio between the angular velocities of the rotating optical systems and the scan devices, such as rotating lens 3852 and device 3802 in system 3800 of FIG. 32, can deviate from the ratio of 2:1.
4. The ratio between the angular velocities of the rotating optical systems and scan devices such as rotating lens 2104 and device 2103 in system 3700 of FIG. 31 can deviate from the ratio of 1:1.

The degree of relaxation of the above tolerances depends upon the desired quality of the scan and its range. When the quality of the scan and its range are predefined, the above tolerances should be such that they will assures that the scan beams will point into the optical apertures or fields of view of the optical components of the rotating optical system over the entire chosen scan range.

Conclusions, Ramifications, and Scope

Thus it can be seen that we have provided inner and planar scan systems having the following advantages:

The ability to use multiple beams for high speed scans.

The ability to produce a scan with a balanced rotating optical system for producing high scan speed.

The ability to scan with a high resolution that is diffraction limited.

The ability to ability to scan over a large scan range while maintaining the high resolution.

The ability to achieve a very accurate scan by reducing the influence of the production tolerances of the scan device.

The ability to produce high scan speed with very low radiation loss in a rotating confocal microscope.

The ability to produce a scan with some tolerances in the optical devices and the way in which they are integrated.

The ability to preserve the orientation of the scan spots with respect to the relative linear scan movement between the scan systems and the scanned surface.

The ability to produce a scan that covers the whole scanned area without producing nonuniform overlap between the scanned segments which are joined together to form the complete scanned area.

While the invention has been described with respect to several preferred embodiments, it will be appreciated that they are set forth purely for purposes of examples, and that many other variations, modifications and applications of the invention may be made.

For example, while some of the figures show a writing, printing, or engraving system, such a system can be operated as a reading, inspecting, or viewing system. When replacing the radiation sources with radiation sinks, the propagation of the beams is inverted. The rotating lenses collect multiple beams from their fields of view that they form and move on the scan surface and direct them to the spinning device that reflects them at a fixed orientation toward a mirror or a beam splitter. From the splitter the beams propagate toward the radiation sinks and are collected there.

While for clarity some of the drawings show only one radiation source or only one radiation sink, each radiation source and each radiation sink can represent multiple radiation sources and sinks. In addition, for the same reason some of them do not contain an autofocus unit. Such a unit can be integrated in the systems that are illustrated without it. All the radiation sources in the drawings that are part of writing systems are capable of being modulated to control the information being written.

While some of the scan system illustrated and described include pinhole arrays and operate as rotating confocal microscopes, they can be operated without these arrays as rotating conventional microscopes.

While some of the scanned regions are illustrated as being under the scan lenses, they can be positioned above these lenses.

While the scanning systems are illustrated for high quality scanning, they can be used for lower quality when the scan beams are allowed to slide on the surface of the optical components of the rotating optical system.

While some of the rotatable optical systems of the scan systems are illustrated as being rotating, they can also be static in some situations.

Thus the scope of the invention should be determined by the elements of the appended claims and their legal equivalents, and not by the specifics given.

We claim:

1. A scan system for writing, plotting, engraving, printing, and photolithography, comprising:
   (a) at least one rotatable radiation source having a rotational axis,
   (b) a rotatable scan device having at least one reflecting facet,
   (c) a rotatable medium support,
   (d) a rotatable optical system including at least one optical component having an optical aperture and selected from the group consisting of lenses and reflecting elements, said rotatable optical system being mounted upon rotatable said medium support and
   (e) a moveable and rotatable body having a region,
   (f) said rotatable radiation source being arranged to emit and direct at least one radiation beam,
   (g) said rotatable scan device rotating at first angular velocity about said rotational axis and being arranged to receiving said one radiation beam from said one rotatable radiation source and for reflecting said one radiation beam as at least one rotating scan beam, and for causing said one rotating scan beam to rotate at second angular velocity about said rotational axis of said rotatable scan device, (h) said rotatable medium support being arranged to rotate at a third angular velocity about said rotational axis of said rotatable scan device for carrying said rotatable optical system, (i) said first, second and third angular velocities arranged to cause said one optical component of said rotatable optical system to receive from said rotatable scan device said one rotating scan beam and to cause said one rotating scan beam to be directed into said optical aperture of said one optical element of said rotatable optical system to form at least one focused radiation spot, and for moving said one focused radiation spot over said rotatable and moveable region so that it will move over a scan range on said region, and (j) said rotatable optical system, said rotatable and moveable region on said body, and said one rotatable radiation source being positioned so that they are spaced from said rotational axis and are spaced from each other.

2. The system of claim 1 wherein said rotatable and moveable region is in a form of at least a portion of a cylinder and is centered about said rotational axis.

3. The system of claim 1 wherein said rotatable and moveable region is planar.

4. The system of claim 1 wherein said first, second, and third angular velocities are related by a ratio of 1:2:2.

5. The system of claim 1 wherein said rotatable and moveable region is planar, said one rotatable radiation source emits multiple beams, and said one reflecting facet contains said rotational axis and is oriented at a tilt angle with respect to said rotational axis for receiving said multiple radiation beams, when said multiple radiation beams are oriented in the direction of said rotational axis, and for projecting onto said region, together with said rotatable optical system, multiple focused radiation spots moving on said planar region.

6. The system of claim 5 wherein said first second and third angular velocities are related by a ratio of 1:1:1 and said one reflecting facet together with said rotatable optical system are arranged to cause said multiple focused radiation spots to preserve their relative orientation while moving on said region along said scan range.

7. The system of claim 1 wherein said rotatable and moveable region is planar and said first second and third angular velocities are related by a ratio of 1:1:1.

8. The system of claim 1 wherein said rotatable and movable region and said rotational axis are arranged to cause relative linear movement between them.

9. A scan system for writing, plotting, engraving, printing, and photolithography, comprising:

(a) at least one rotatable radiation source having a first rotational axis, (b) a rotatable scan-device system having first and second rotatable scan devices, (c) said first rotatable scan device having at least one receiving and projecting facet and said second rotatable scan device having at least one reflecting facet, (d) a rotatable medium support, (e) a rotatable optical system including at least one optical component having an optical aperture and selected from the group consisting of lenses and reflecting elements, said rotatable optical system being mounted upon said medium support and (f) a moveable and rotatable body having a region, (g) said one radiation source being arranged to emit and direct multiple radiation beams, (h) said first rotatable scan device of said scan device system rotating at first angular velocity about second rotational axis and being arranged to receive from said one radiation source said multiple radiation beams and to project said multiple radiation beams toward said second rotatable scan device while causing said multiple radiation beams to change their relative orientation, (i) said second rotatable scan device of said scan device system rotating at second angular velocity about said first rotational axis and arranged to receive from said first rotatable scan device said multiple radiation beams and to project said multiple radiation beams, (j) said rotatable scan device system being arranged to receive on said first rotatable scan device said multiple radiation beams from said one rotatable radiation source and to reflect from said second rotatable scan device said multiple radiation beams as multiple rotating scan beams, and for causing said multiple rotating scan beams to rotate at a third angular velocity about said first rotational axis of said second rotatable scan device, (k) said rotatable medium support being arranged to rotate at a fourth angular velocity about said first rotational axis of said second rotatable scan device for carrying said rotatable optical system, (l) said one optical component of said rotatable optical system being arranged to receive from said second rotatable scan device said multiple rotating scan beams and direct them into said optical aperture of said one optical element of said rotatable optical system, (m) said second rotatable scan device of said scan device system receiving said multiple radiation beams while said multiple beams changing their relative orientation being arranged together with said rotatable optical system to project said multiple radiation beams and direct said multiple rotating beams onto said region to form multiple focused radiation spots, and for moving said multiple focused radiation spots over said rotatable and moveable region so that they will move over a scan range on said rotatable and moveable region while preserving their relative orientation, and (n) said rotatable optical system, said region on said body, and said one radiation source being positioned so that they are spaced from said rotational axis and are spaced from each other.

10. The system of 9 wherein said rotatable and moveable region is in a form of at least a portion of a cylinder and is centered about said first rotational axis.

11. The system of claim 9 wherein said rotatable and moveable region is planar.

12. The system of claim 9 wherein said first, second, third, and fourth angular velocities are related by a ratio of 1:1:2:2.

13. The system of claim 9 wherein said rotatable and moveable region is planar and said first, second, third, and fourth angular velocities are related by a ratio of 1:2:2:2.

14. The system of claim 9 wherein said rotatable and movable region and said first rotational axis being arranged to cause relative linear movement between them.

15. A scan system for writing, plotting, engraving, printing, and photolithography, comprising:

(a) at least one rotatable radiation source having a first rotational axis,
(b) a rotatable scan-device system having first and second rotatable scan devices,
(c) said first rotatable scan device having at least one receiving and projecting facet and said second rotatable scan device having at least one reflecting facet, and
(d) a moveable and rotatable body having a region,
(e) said one radiation source being arranged to emit and direct multiple radiation beams,
(f) said first rotatable scan device of said scan device system rotating at first angular velocity about second rotational axis and arranged to receive from said one radiation source said multiple radiation beams and to project said multiple radiation beams toward said second rotatable scan device while causing said multiple beams to change their relative orientation,
(g) said second rotatable scan device of said scan device system rotating at a second angular velocity about said first rotational axis and arranged to receive from said first rotatable scan device said multiple radiation beams and to project said multiple radiation beams,
(h) said rotatable scan-device system being arranged to receive on said first rotatable scan device said multiple radiation beams from said one rotatable radiation source and for reflecting from said second rotatable scan device said multiple radiation beams as multiple rotating scan beams, and for causing said multiple rotating scan beams to rotate at third angular velocity about said first rotational axis of said second rotatable scan device,
(i) said second rotatable scan device of said scan device system receiving said multiple radiation beams while said multiple beams change their relative orientation and being arranged to project said multiple radiation beams and to direct said multiple rotating beams onto said region to form multiple focused radiation spots, and for moving said multiple focused radiation spots over said rotatable and moveable region so that they will move over a scan range on said rotatable and moveable region while preserving their relative orientations, and
(j) said rotatable scan-device system, said region on said body, and said one radiation source being positioned so that they are spaced from said rotational axis and are spaced from each other.

16. The system of 15 wherein said rotatable and moveable region is in a form of at least a portion of a cylinder and is centered about said rotational axis.

17. The system of claim 15 wherein said rotatable and moveable region is at least a portion of a cylinder.

18. The system of claim 15 wherein said first, second, and third angular velocities are related by a ratio of 1:1:2.

19. The system of claim 15 wherein said first, second, and third angular velocities are related by a ratio of 1:2:2.

20. The system of claim 15 wherein said rotatable and movable region and said first rotational axis are arranged to cause relative linear movement between them.

21. A scan system for writing, plotting, engraving, printing, and photolithography, comprising:
(a) at least one rotatable radiation source having a rotational axis,
(b) a rotatable scan device having at least one reflecting facet,
(c) a rotatable reflector having rotational symmetry and centered about said rotational axis, and
(d) a moveable and rotatable body having a planar region,
(e) said rotatable radiation source being arranged to emit and direct at least one radiation beam,
(f) said rotatable scan device rotating at first angular velocity about said rotational axis and being arranged to receiving said one radiation beam from said one rotatable radiation source and for reflecting said one radiation beam as at least one rotating scan beam, and for causing said one rotating scan beam to rotate at second angular velocity about said rotational axis of said rotatable scan device,
(g) said second angular velocity arranged to be linearly proportional to said first angular velocity
(h) said rotatable reflector arranged to receive from said rotatable scan device said one rotating scan beam and to form at least one focused radiation spot, and for moving said one focused radiation spot over said rotatable and moveable planar region so that it will move over a scan range on said region, and
(i) said rotatable scan device, said rotatable and moveable planar region on said body, said rotatable reflector and said one rotatable radiation source being positioned so that they are spaced from said rotational axis and are spaced from each other.

22. A scan system for writing, plotting, engraving, printing, and photolithography, comprising:
(a) at least one rotatable radiation source having a first rotational axis,
(b) a rotatable scan-device system having first and second rotatable scan devices,
(c) said first rotatable scan device having at least one receiving and projecting facet and said second rotatable scan device having at least one reflecting facet,
(d) a rotatable optical reflector having rotational symmetry and centered about said first rotational axis, and
(e) a moveable and rotatable body having a planar region,
(f) said one radiation source being arranged to emit and direct multiple radiation beams,
(g) said first rotatable scan device of said scan device system rotating at first angular velocity about second rotational axis and being arranged to receive from said one radiation source said multiple radiation beams and to project said multiple radiation beams toward said second rotatable scan device while causing said multiple radiation beams to change their relative orientation,
(h) said second rotatable scan device of said scan device system rotating at second angular velocity about said first rotational axis and arranged to receive from said first rotatable scan device said multiple radiation beams and to project said multiple radiation beams,
(i) said rotatable scan device system being arranged to receive on said first rotatable scan device said multiple radiation beam froms said one rotatable radiation source and to reflect from said second rotatable scan device said multiple radiation beams as multiple rotating scan beams, and for causing said multiple rotating scan beams to rotate at a third angular velocity about said first rotational axis of said second rotatable scan device,
(j) said rotatable reflector being arranged to receive from said second rotatable scan device said multiple rotating scan beams and to direct them onto said planar region on said rotatable and moveable body, (k) said second rotatable scan device of said scan device system receiving said multiple radiation beams while said multiple beams changing their relative orientation being arranged together with said rotatable reflector to project said multiple radiation beams and direct said multiple rotating beams onto said region to form multiple focused radiation spots, and for moving said multiple focused radiation spots over said rotatable and moveable region so that they will move over a scan range on said rotatable and moveable region while preserving their relative orientation, and (l) said rotatable reflector, said region on said body, and said one radiation source being positioned so that they are spaced from said rotational axis and are spaced from each other.

* * * * *